United States Patent [19]
Wagner et al.

[11] Patent Number: 4,987,530
[45] Date of Patent: Jan. 22, 1991

[54] INPUT/OUTPUT CONTROLLER FOR A DATA PROCESSING SYSTEM

[75] Inventors: Eric M. Wagner, E. Douglas; Martin Kiernicki, Natick; John L. Freeman, Hopkinton, all of Mass.

[73] Assignee: Data General Corp., Westboro, Mass.

[21] Appl. No.: 798,560

[22] Filed: Nov. 15, 1985

[51] Int. Cl.$^5$ .............................................. G06F 9/06
[52] U.S. Cl. ..................................................... 364/200
[58] Field of Search ... 364/200 MS File, 900 MS File, 364/482, 485, 489, 580; 370/85, 85.1

[56] References Cited

U.S. PATENT DOCUMENTS

| | | | |
|---|---|---|---|
| 4,101,967 | 7/1978 | Hajduk | 364/900 |
| 4,513,174 | 4/1985 | Herman | 178/22.08 |
| 4,625,307 | 11/1986 | Tulpule et al. | 370/85 |

OTHER PUBLICATIONS

The Control Unit and Microprogramming, 1980, pp. 334–336.

Primary Examiner—David L. Clark
Attorney, Agent, or Firm—Jacob Frank; Joel Wall; Irving M. Kriegsman

[57] ABSTRACT

A data processing system having a local memory bus, a main memory coupled to the local memory bus and a host central processing unit coupled to the local memory bus includes a single input/output controller for interfacing a plurality of input/output devices to the local memory bus. The input/output controller includes a plurality of input/output device controllers, each input/output device controller being adapted to be connected to at least one input/output device, a single microprocessor for managing the overall operations of the input/output controller, a single buffer memory for storing a program of instructions for the microprocessor and temporarily storing data received from the input/output devices and a gate array for interfacing all of the input/output device controllers to the local memory bus.

2 Claims, 36 Drawing Sheets

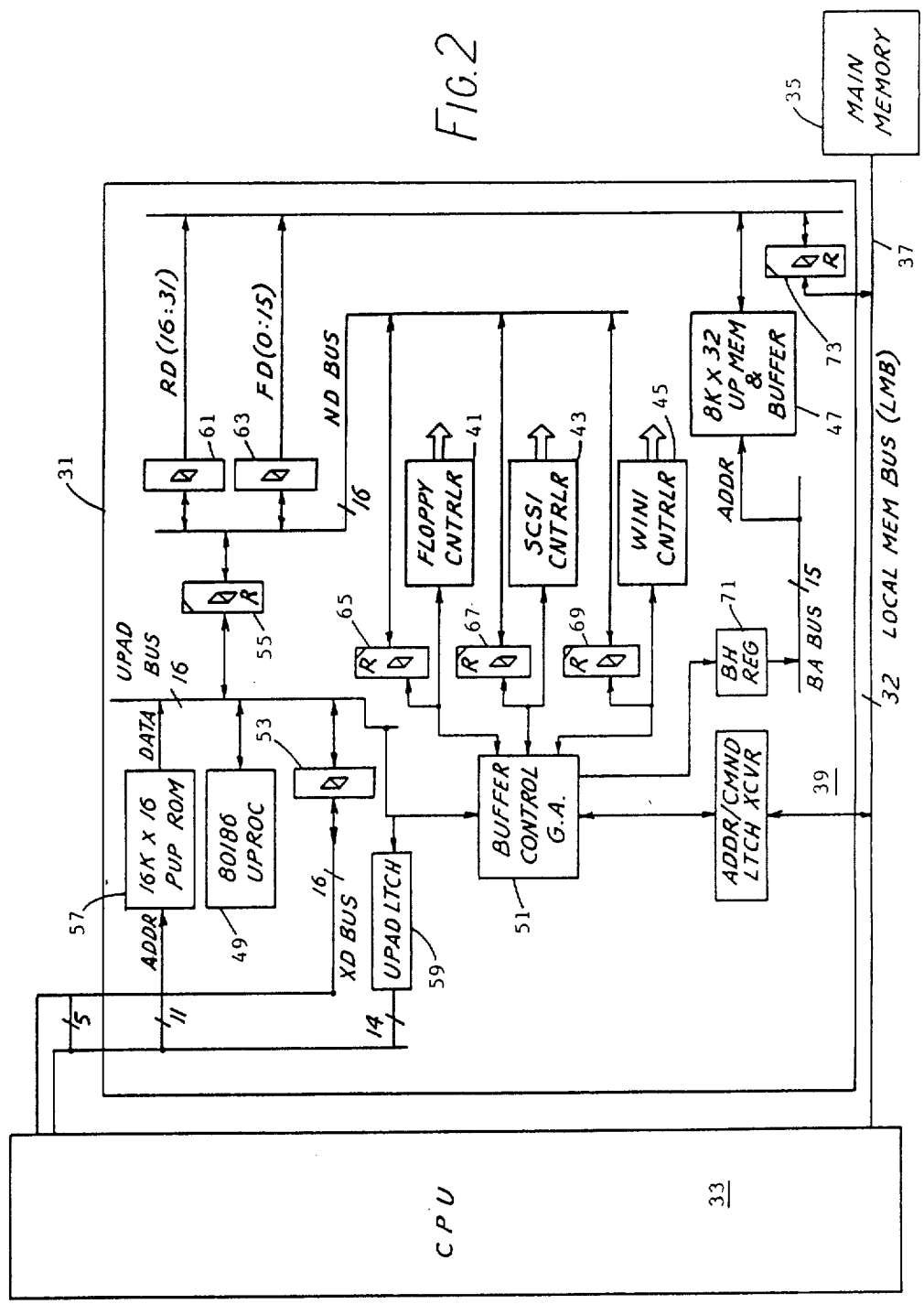

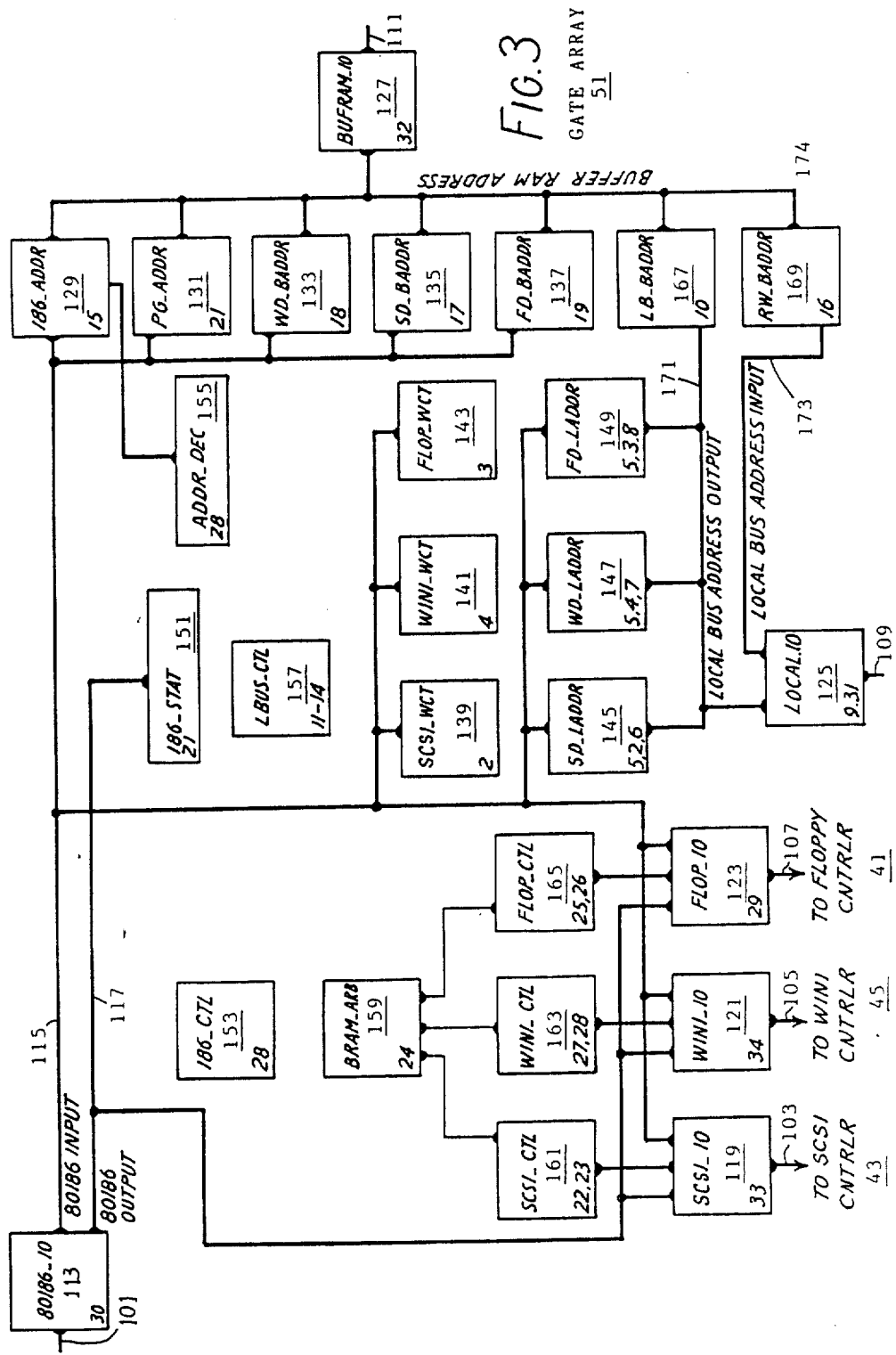

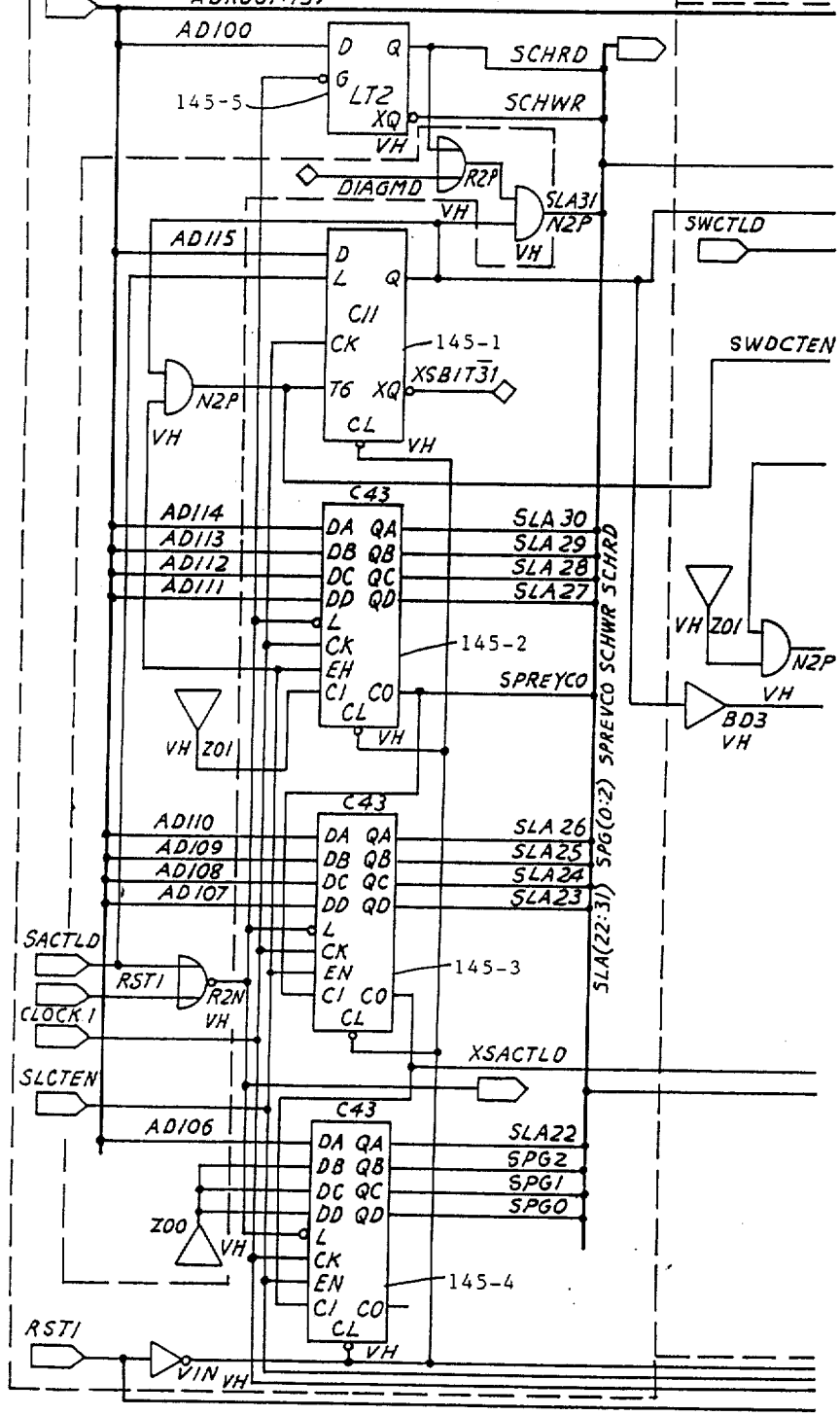

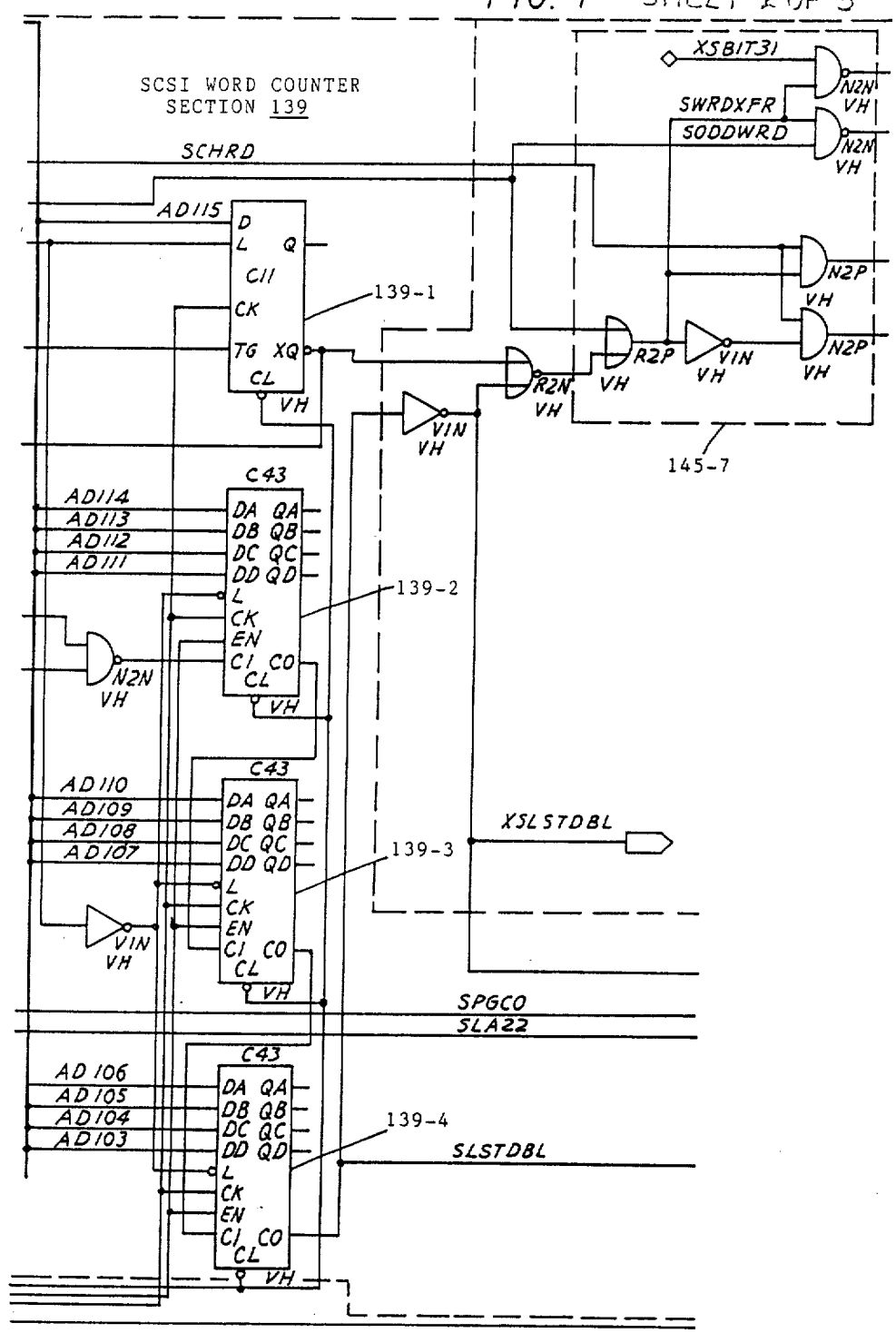
FIG. 4  SHEET 2 OF 3

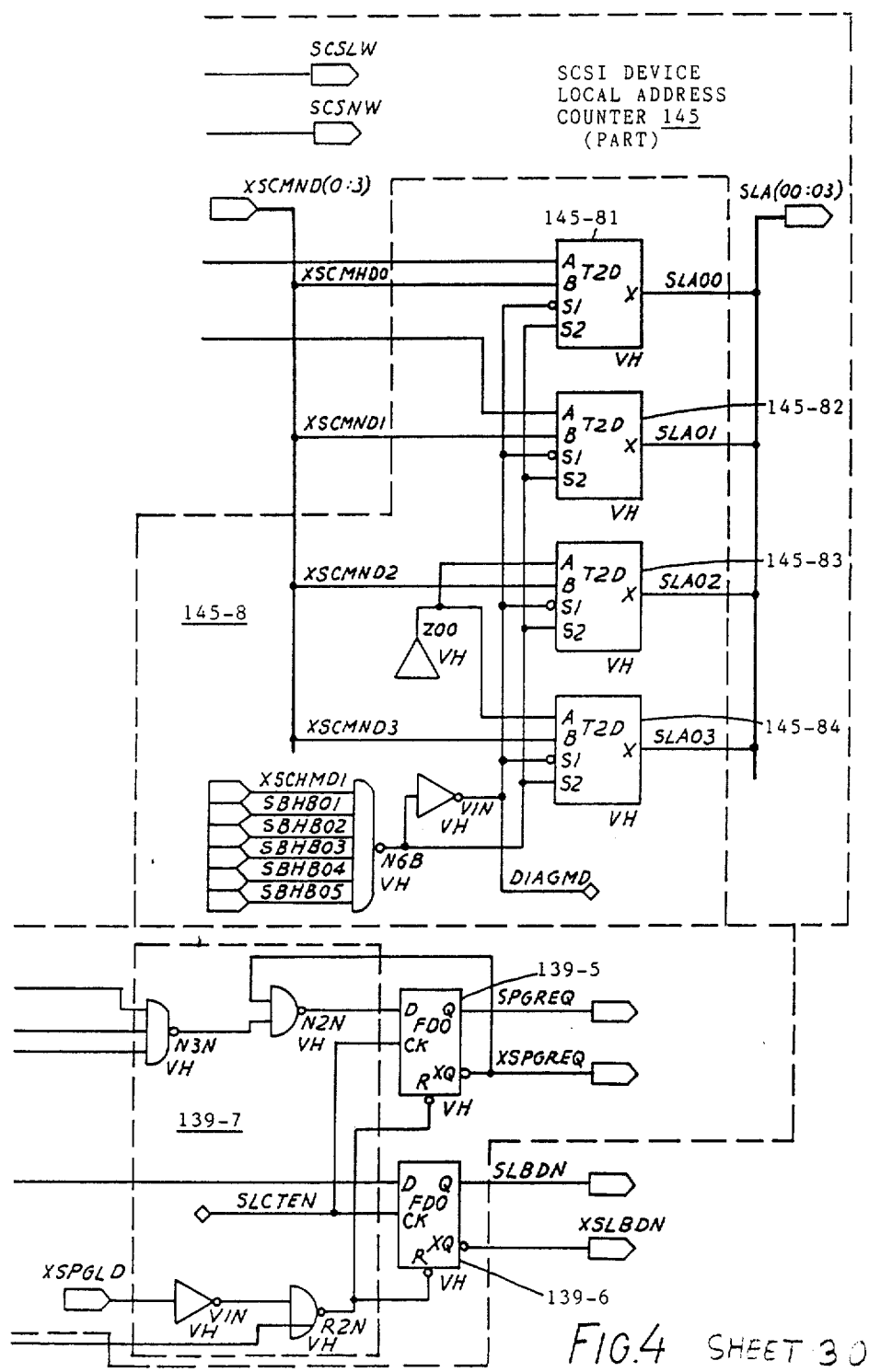
FIG.4 SHEET 3 OF 3

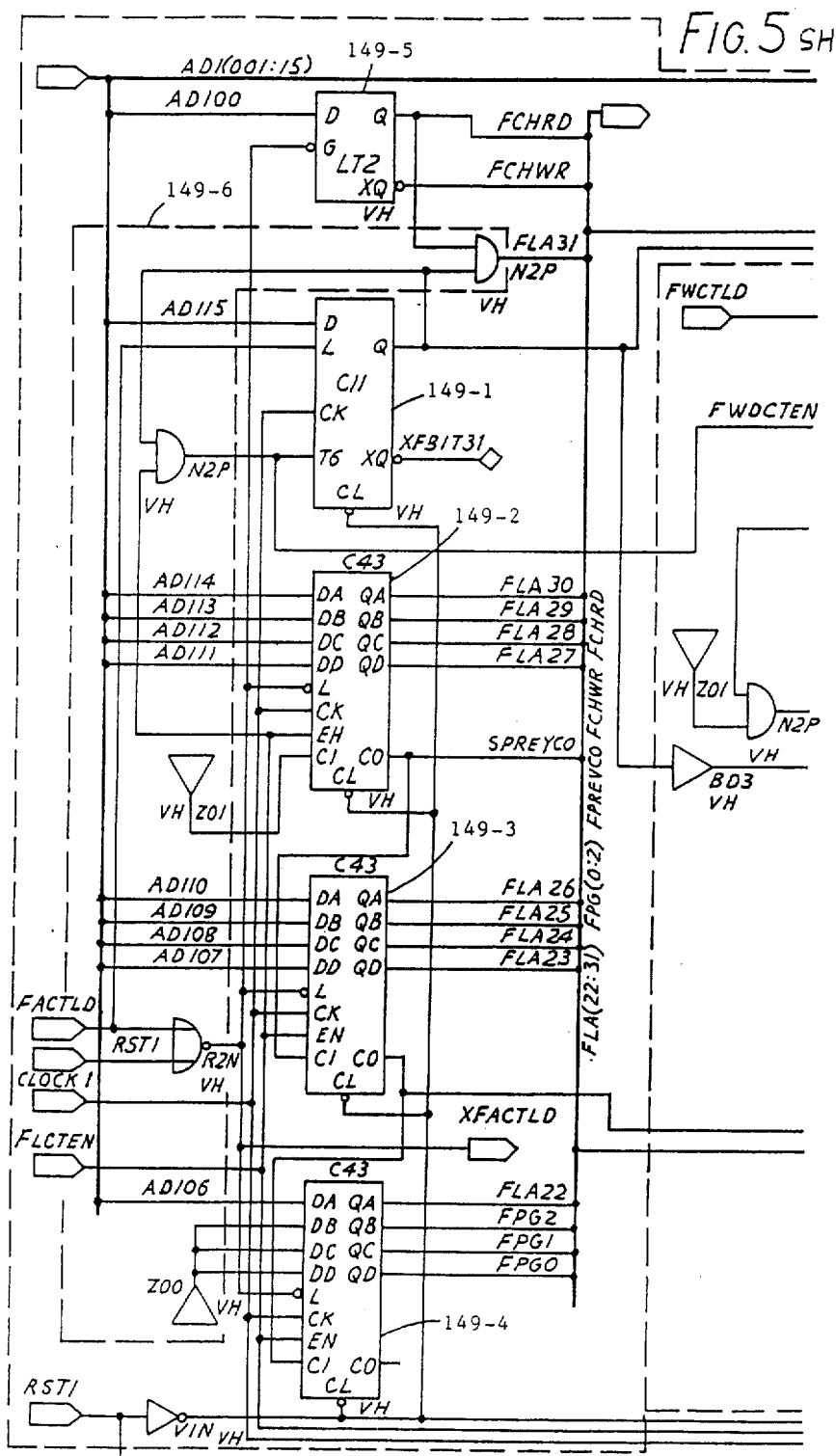
FIG. 5 SHEET 1 OF 3

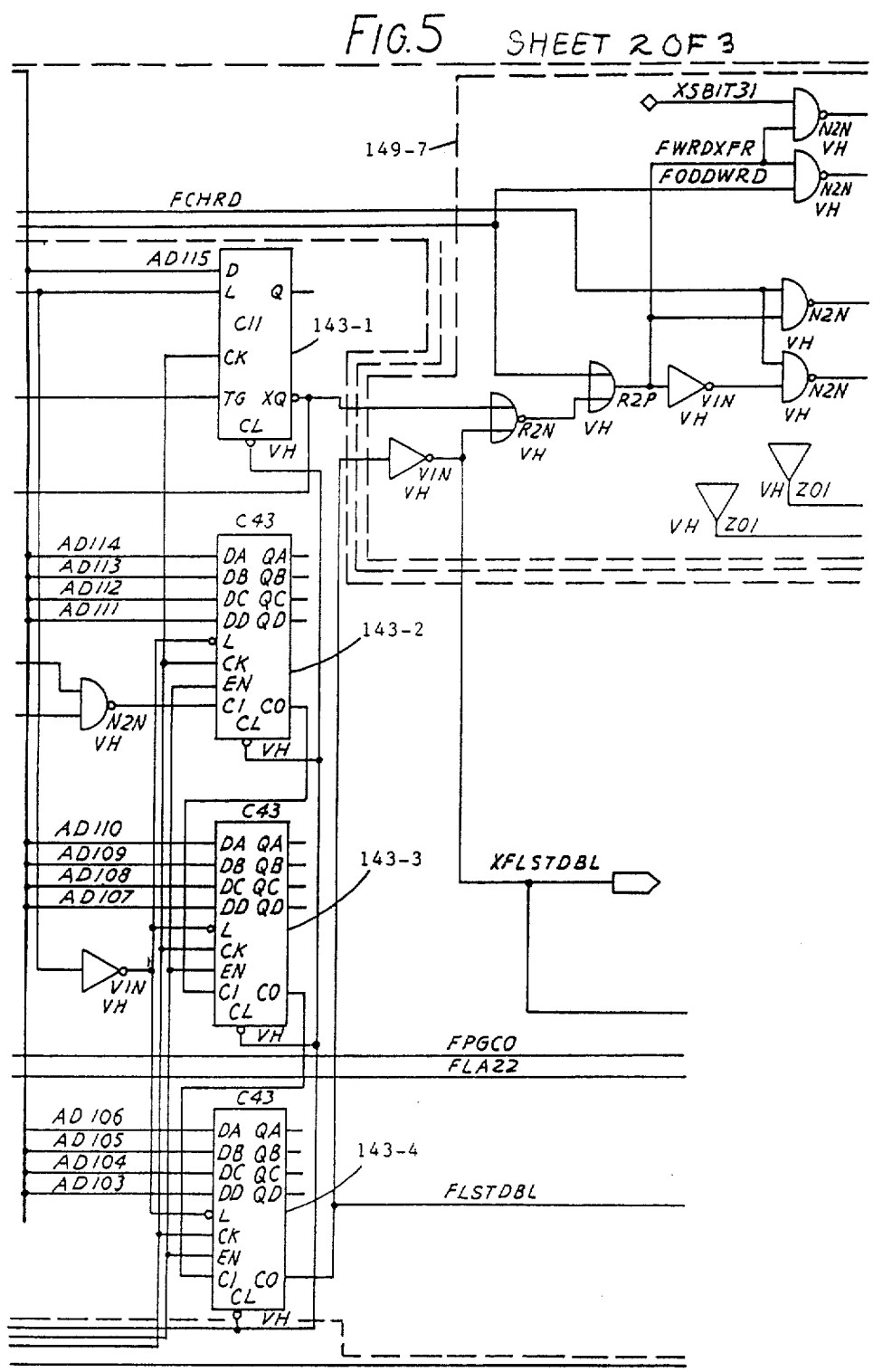

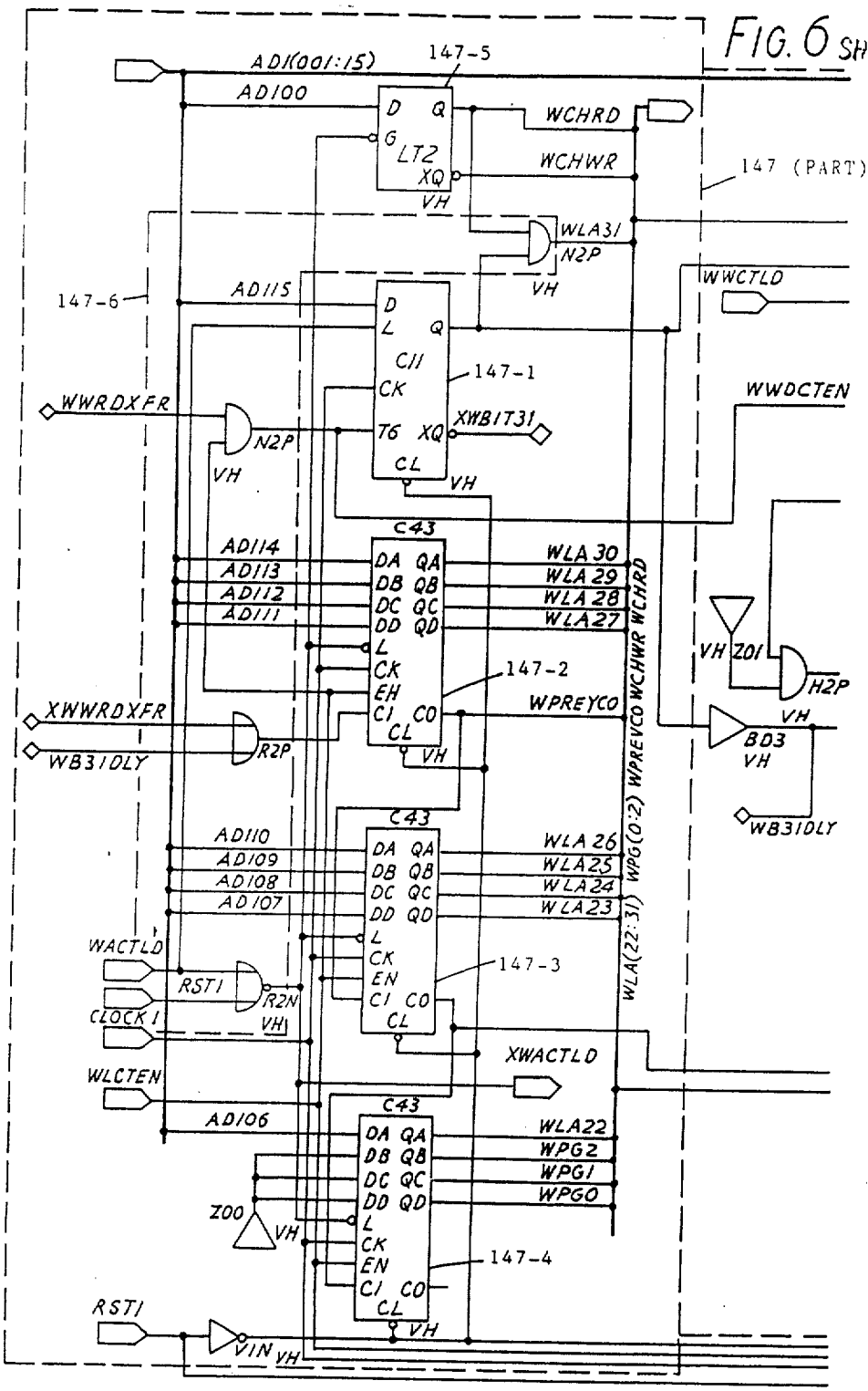
FIG. 6 SHEET 1 OF 3

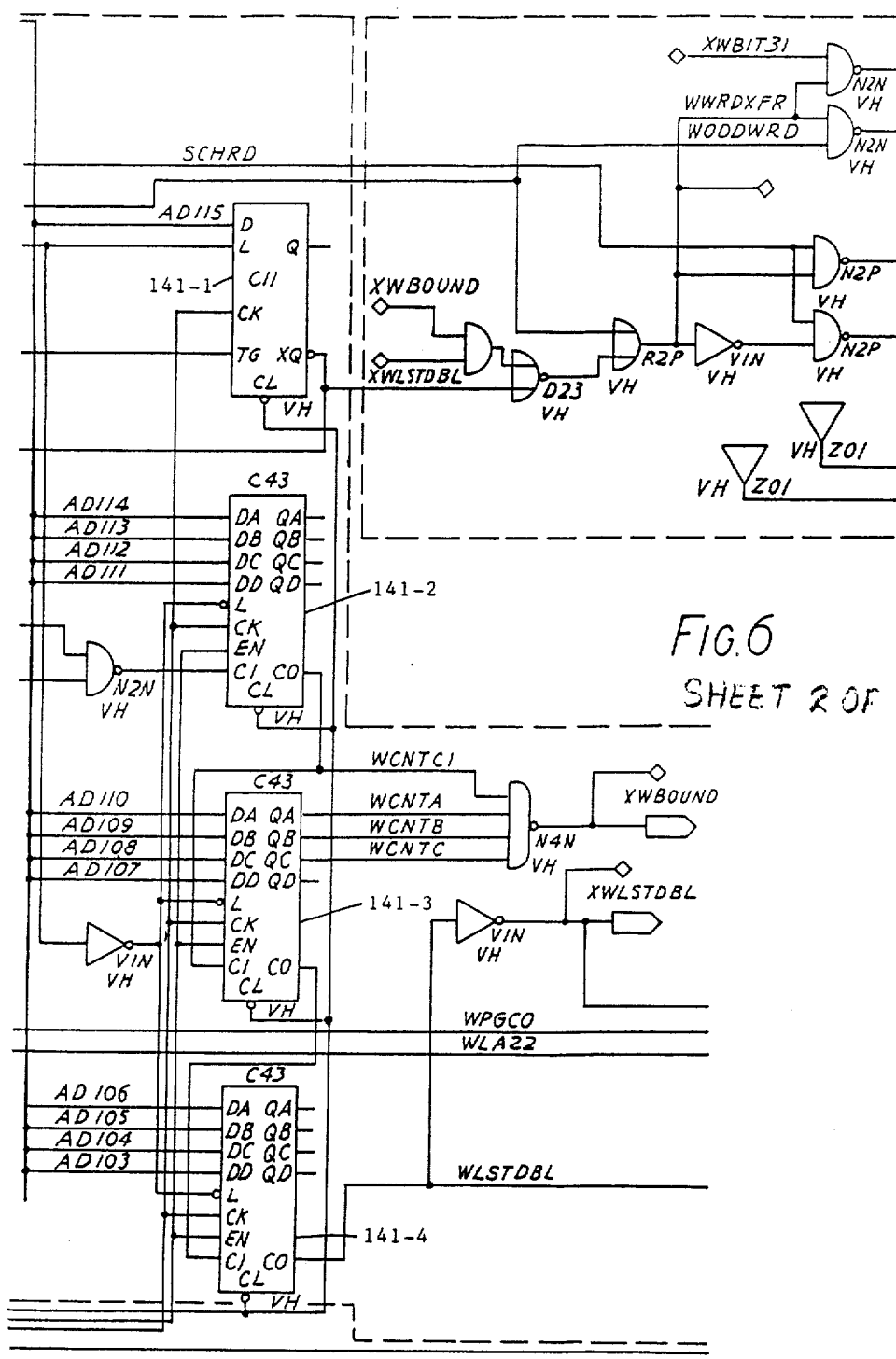

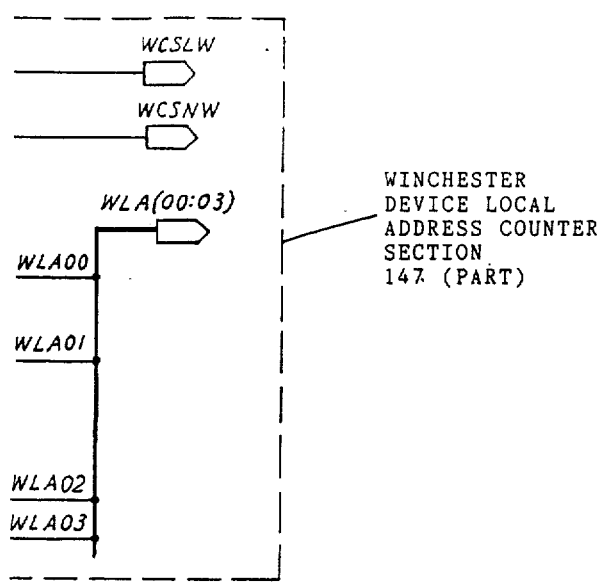
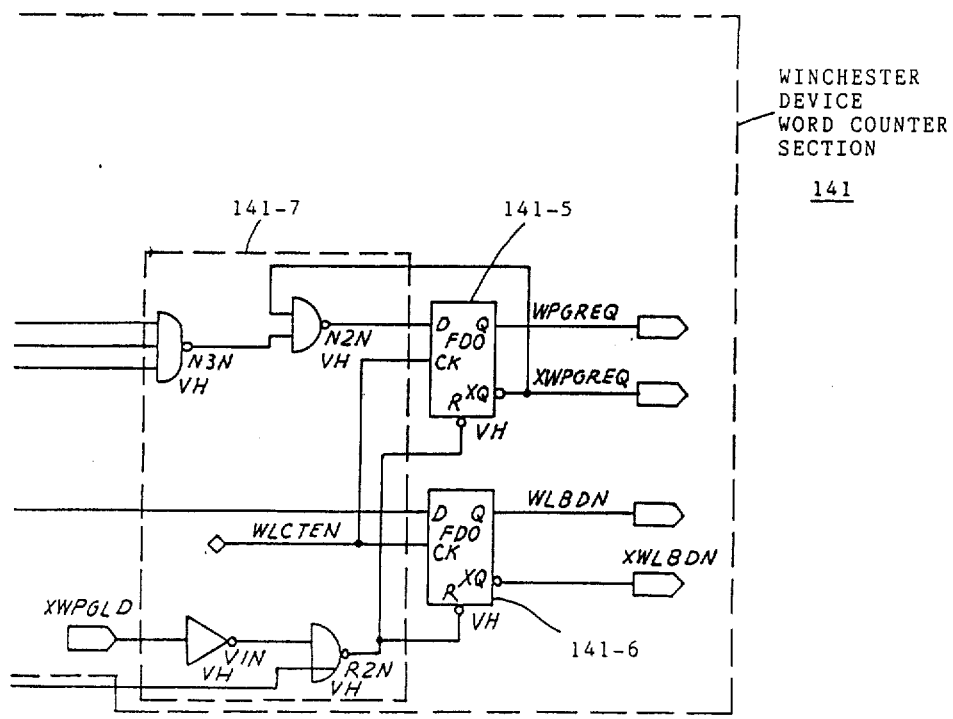
FIG.6
SHEET 3 OF 3

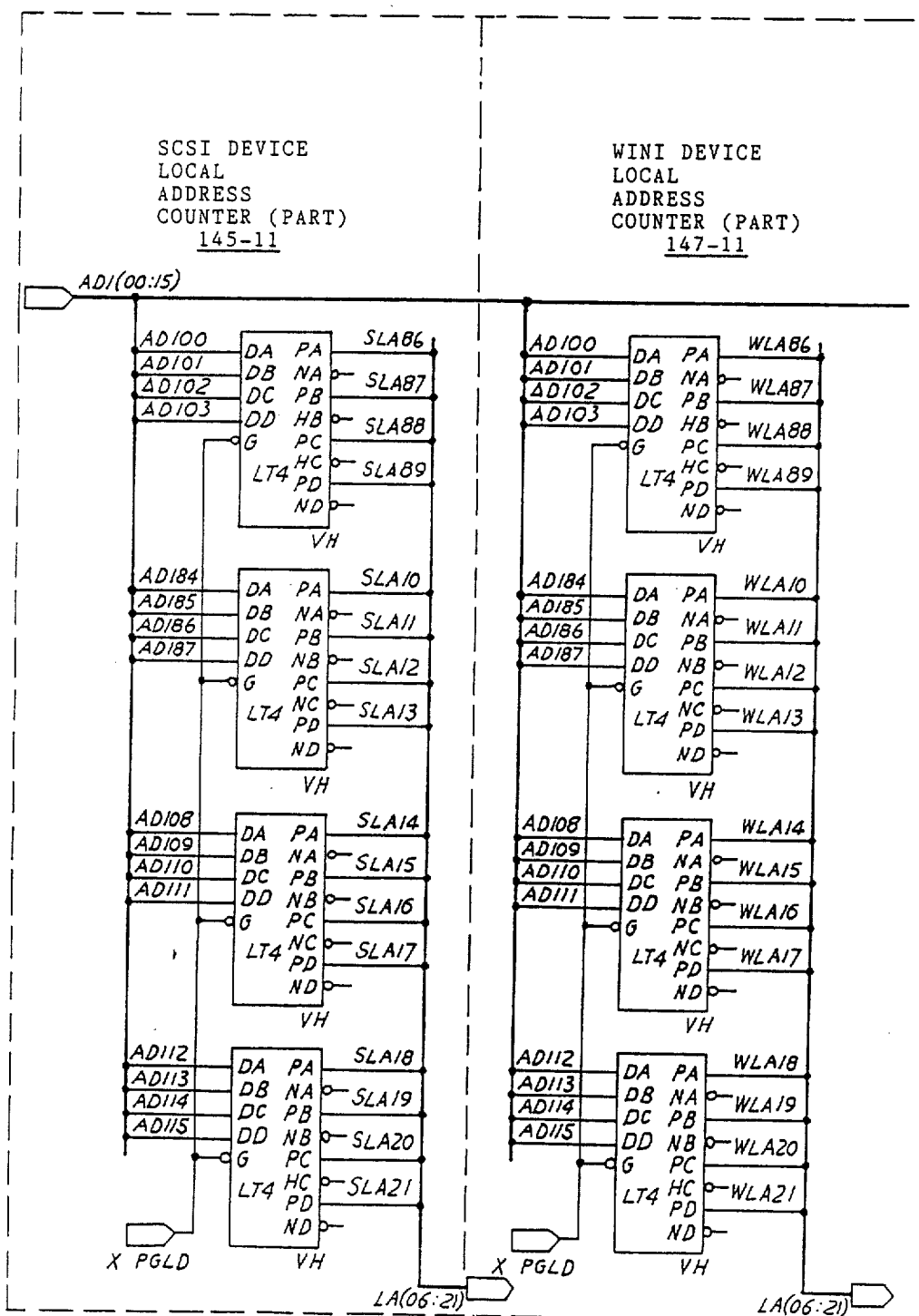
FIG. 7   145 (PART)
        147 (PART)
        149 (PART)
SHEET 1 OF 3

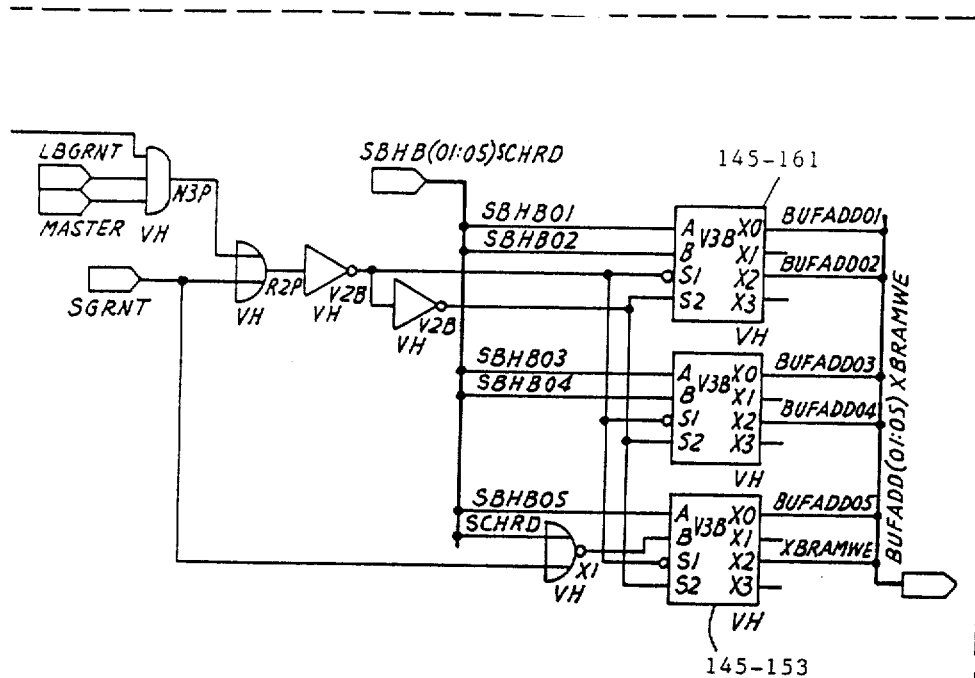
FIG. 8
SHEET 3 OF 3
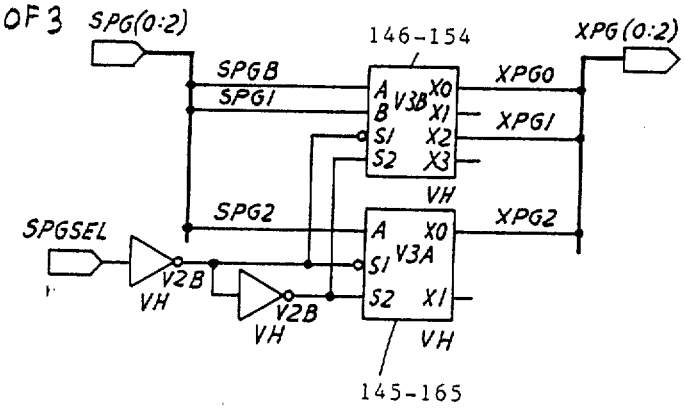

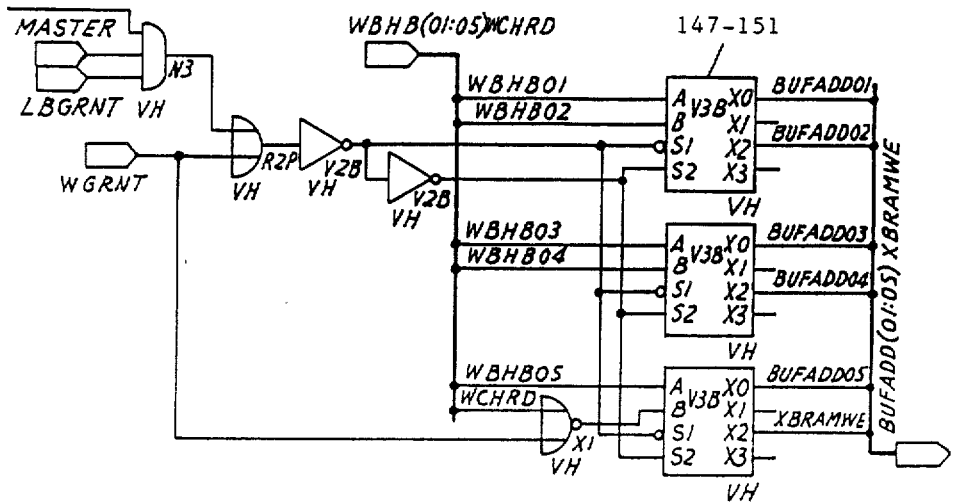
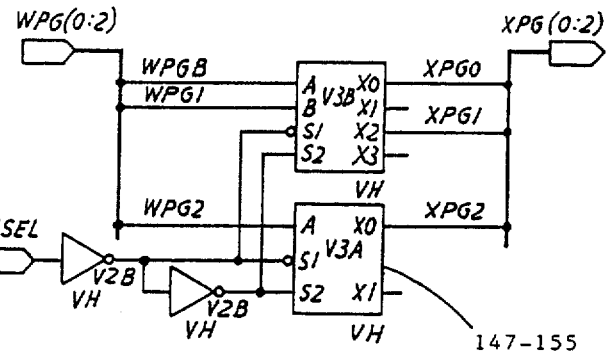
FIG. 9
SHEET 3 OF 3
XLA(00:22) XLA31 XPREVCO LSTDBL XBA(06:13) XBCS(0:3) LCHWR

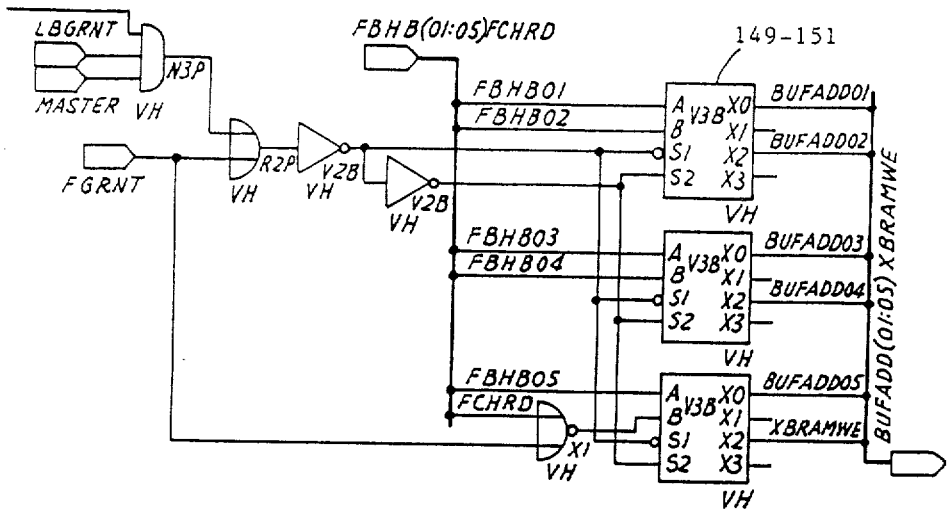
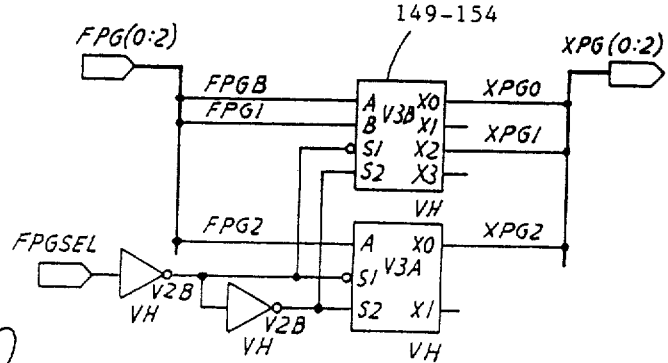
FIG.10
SHEET 3 OF 3
XLA(00:22) XLA31 XPREVCO LSTDBL XBA(06:13) XBCS(0:3) LCHWR

LOCAL BUS INPUT/OUTPUT INTERFACE SECTION 125 (PART)

LOCAL BUS
BUFFER ADDRESS
REGISTER
SECTION 167

FLOPPY CONTROLLER INPUT/OUTPUT INTERFACE SECTION 123

MICROPROCESSOR
INPUT/OUTPUT
INTERFACE
SECTION
113

LOCAL BUS
INPUT/OUTPUT
INTERFACE
SECTION
125
(PART)

BUFFER RAM INPUT/OUTPUT INTERFACE SECTION 127

SCSI INPUT/OUTPUT INTERFACE SECTION 119

WINCHESTER DEVICE
INPUT/OUTPUT
INTERFACE
SECTION
121

LOCAL BUS
CONTROL SECTION
157 (PART)

FIG. 20  LOCAL BUS CONTROL SECTION 157 (PART)

SHEET 1 OF 2 LOCAL BUS CONTROL SECTION 157 (PART

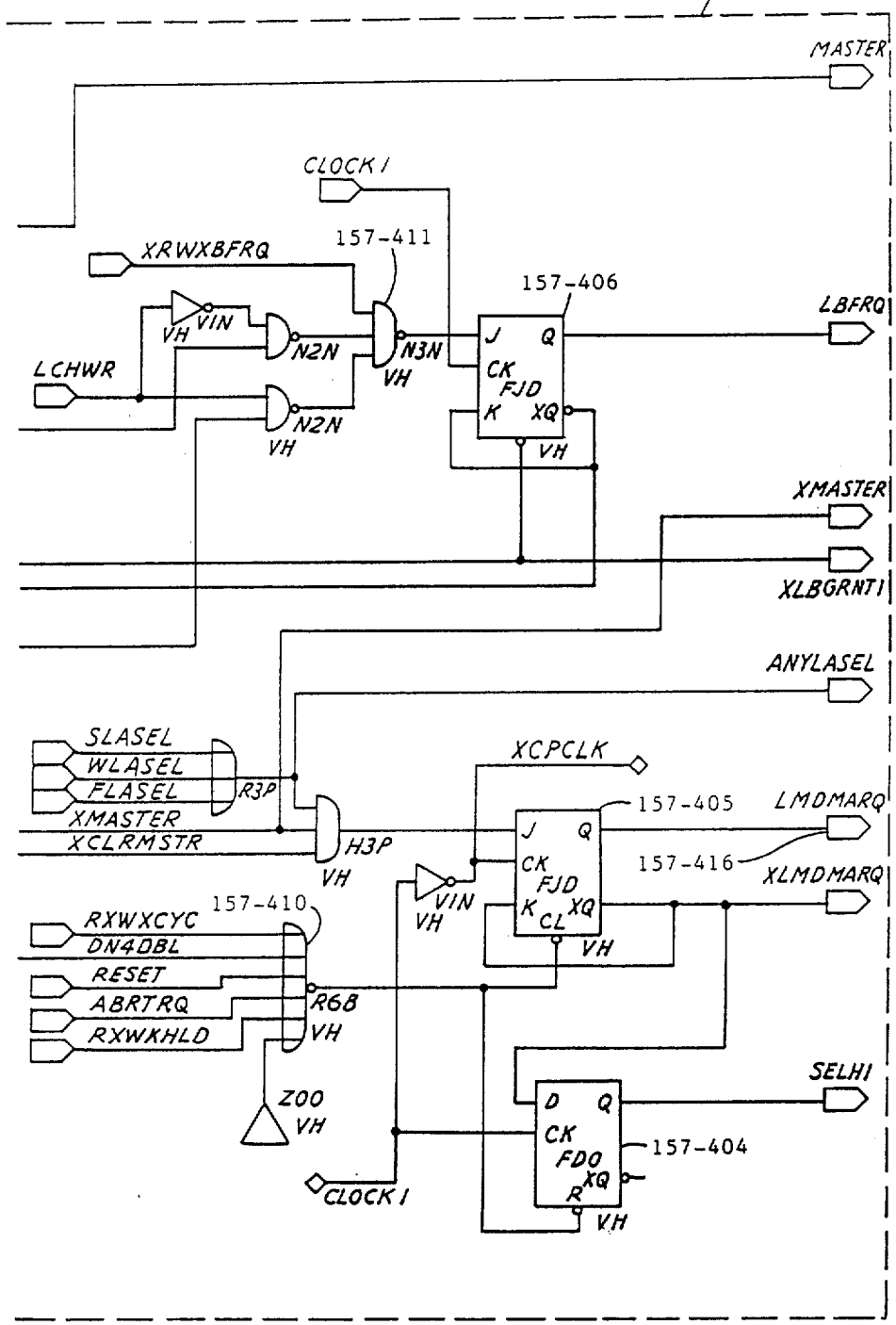
FIG. 21 SHEET 2 OF 2

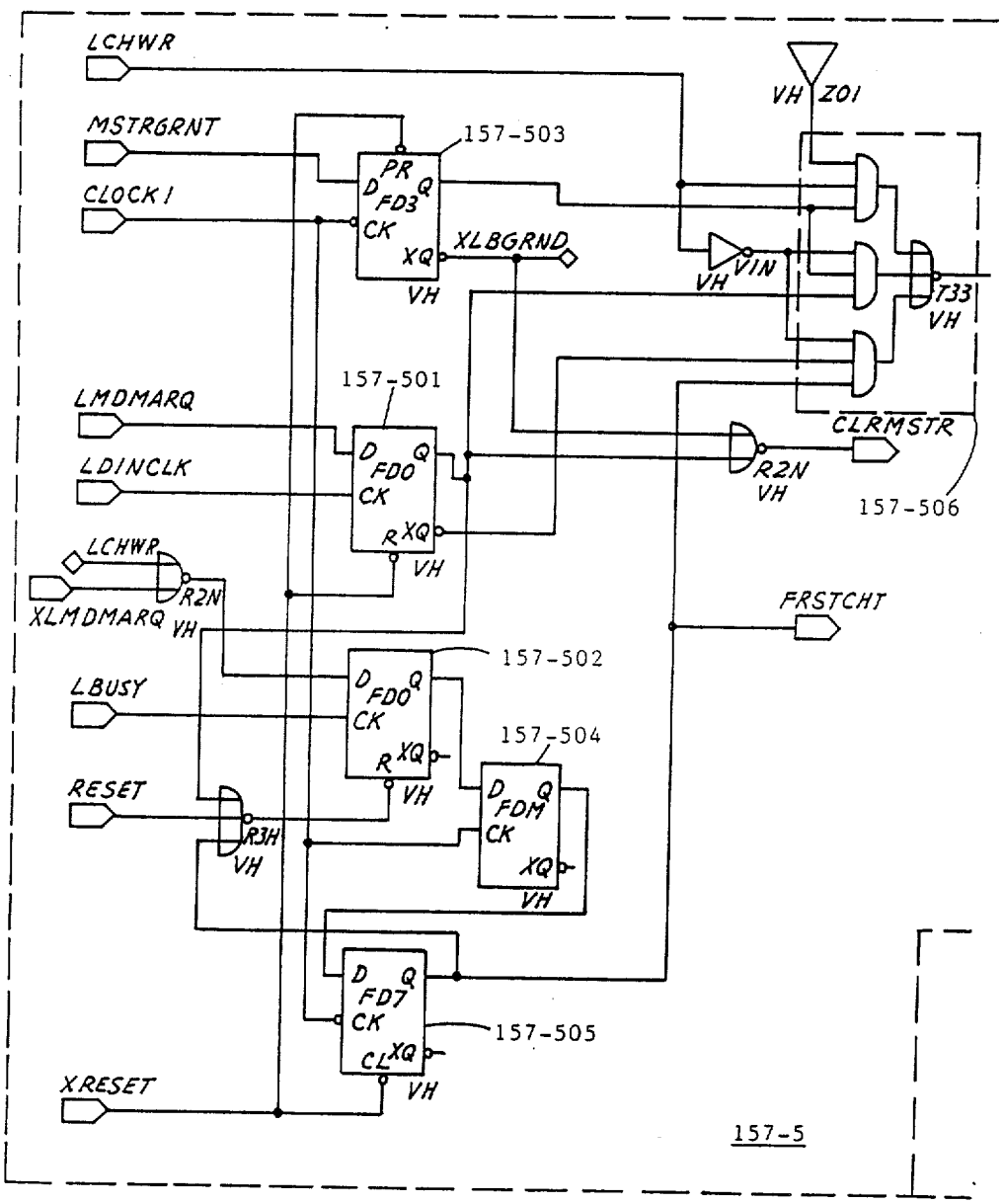
FIG.22 SHEET 1 OF 3
LOCAL BUS
CONTROL SECTION
157 (PART)

MICROPROCESSOR ADDRESS LATCH
129

READ X/WRITE X
BUFFER ADDRESS
LATCH 169

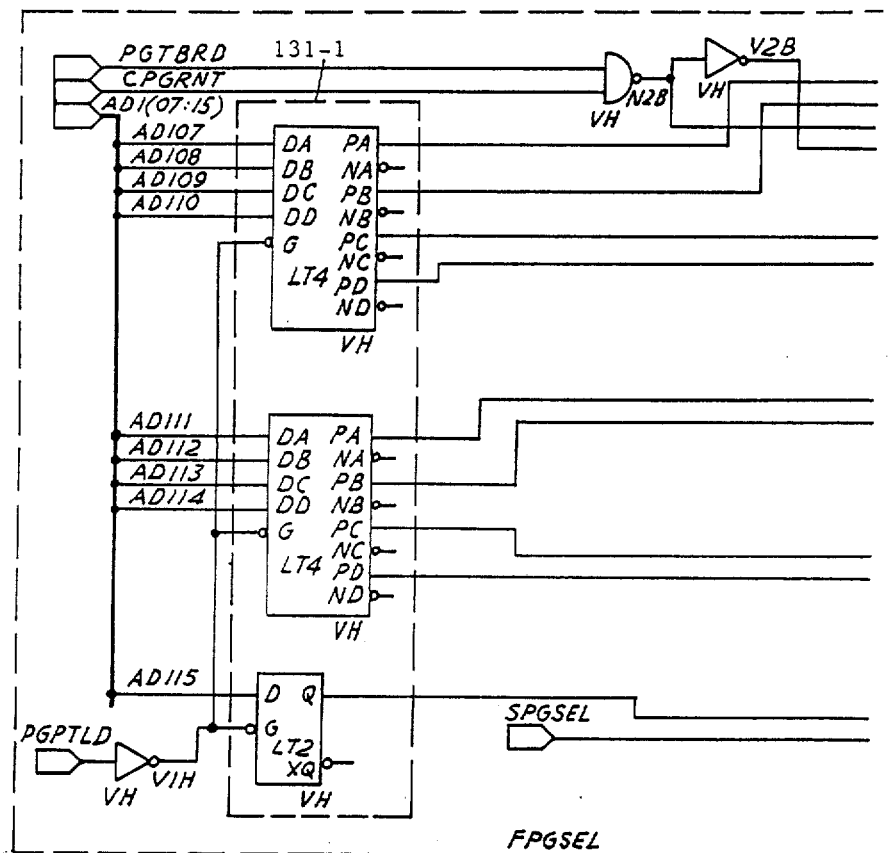
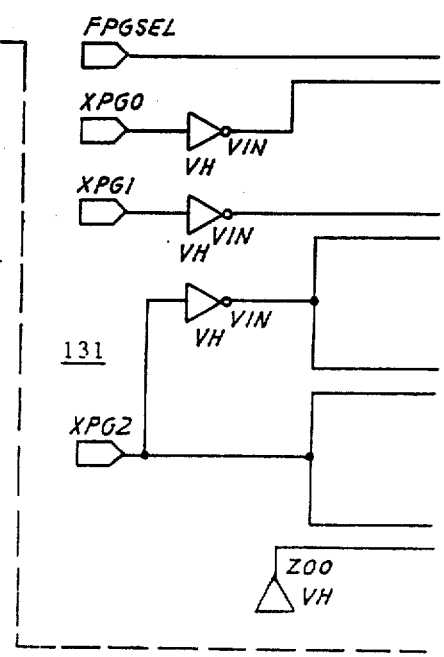
SHEET 1 OF 3
FIG.25
186-STATUS REGISTER SECTION 151
PAGE ADDRESS REGISTER
SECTION 131

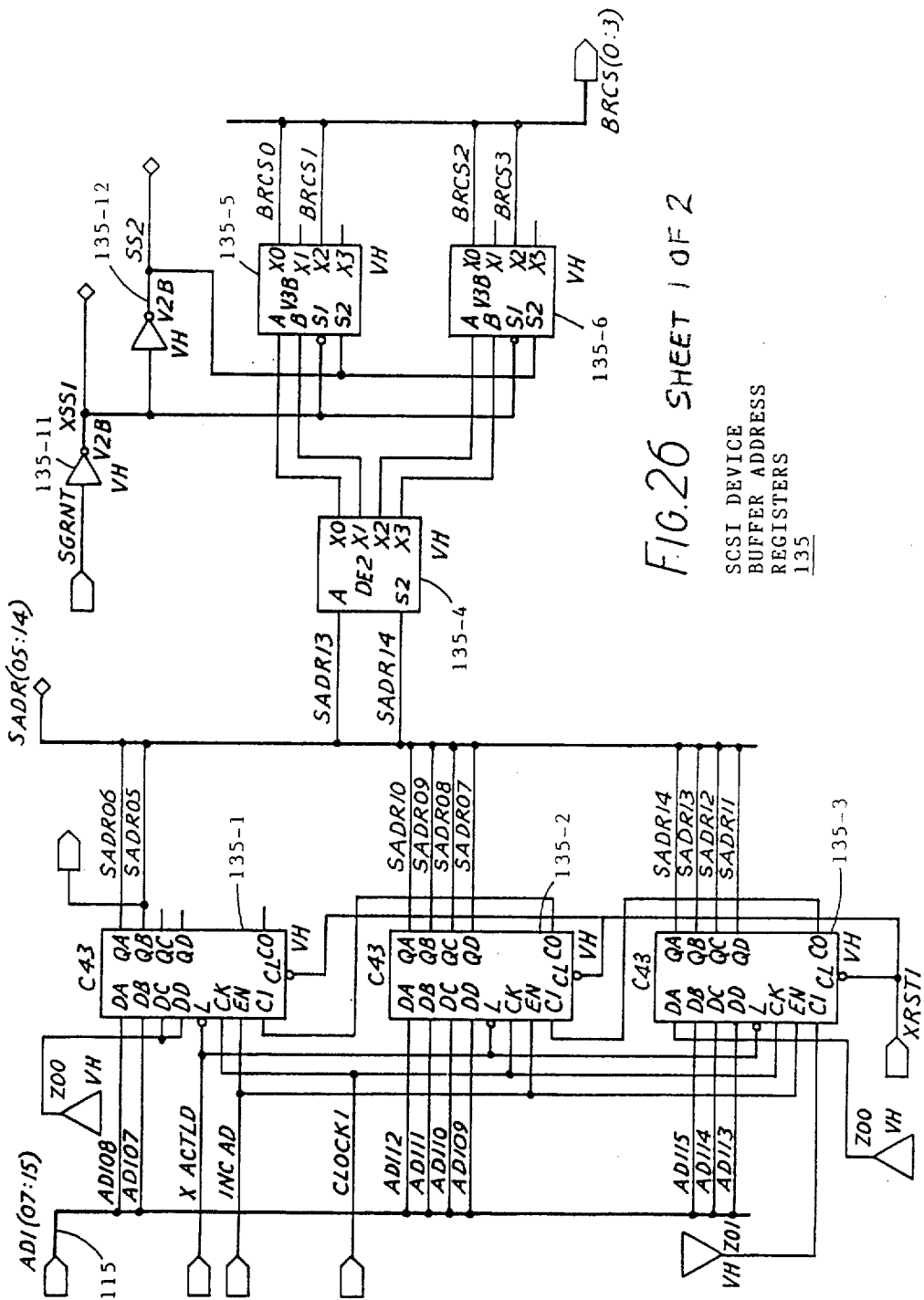
FIG. 26 SHEET 1 OF 2
SCSI DEVICE
BUFFER ADDRESS
REGISTERS
135

WINCHESTER DEVICE BUFFER ADDRESS REGISTERS 133

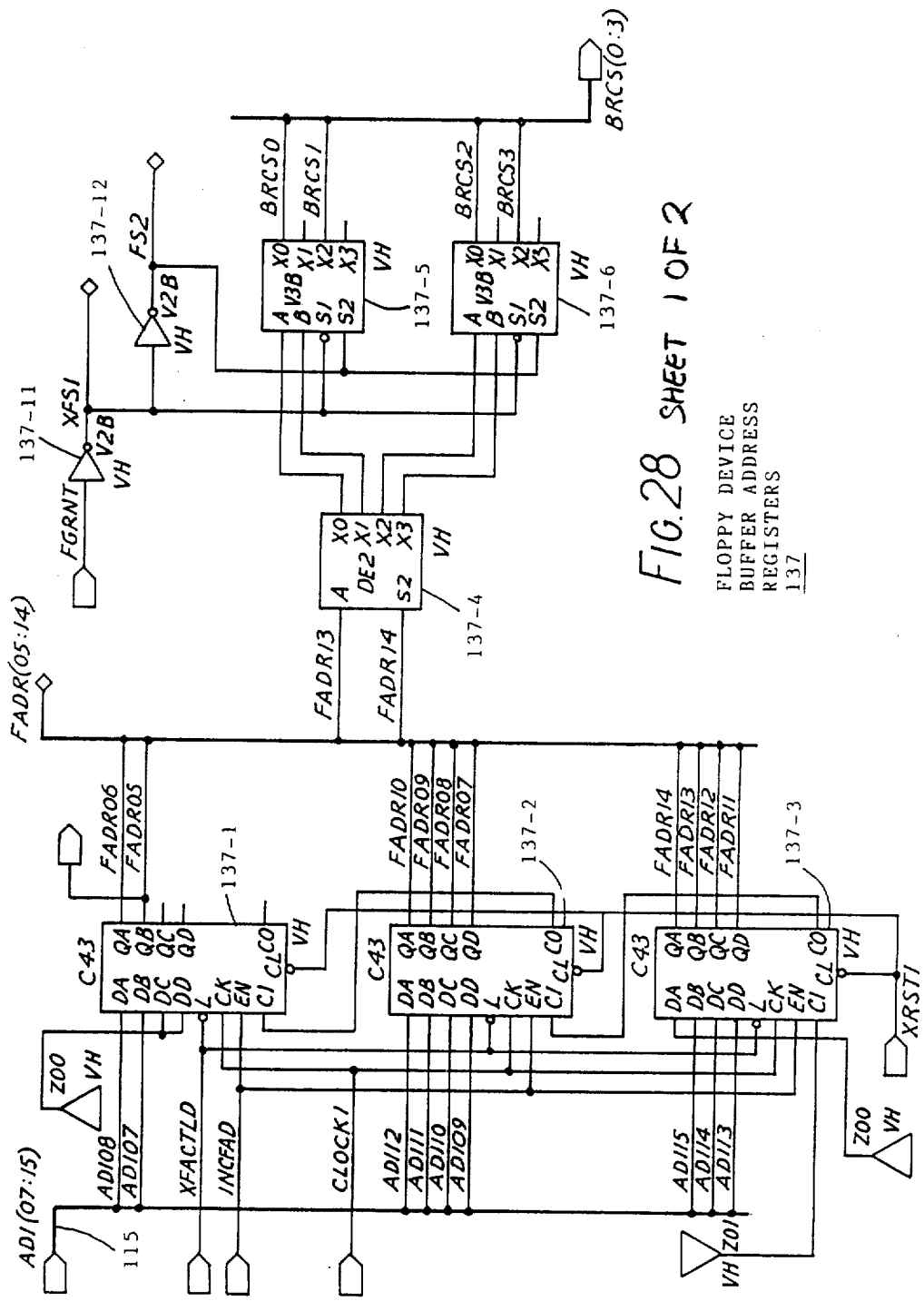
FIG. 28 SHEET 1 OF 2
FLOPPY DEVICE
BUFFER ADDRESS
REGISTERS
137

186- CONTROL SECTION 153
SHEET 1 OF 3

SCSI CONTROL SECTION
(SEQUENCER)
161 (PART)

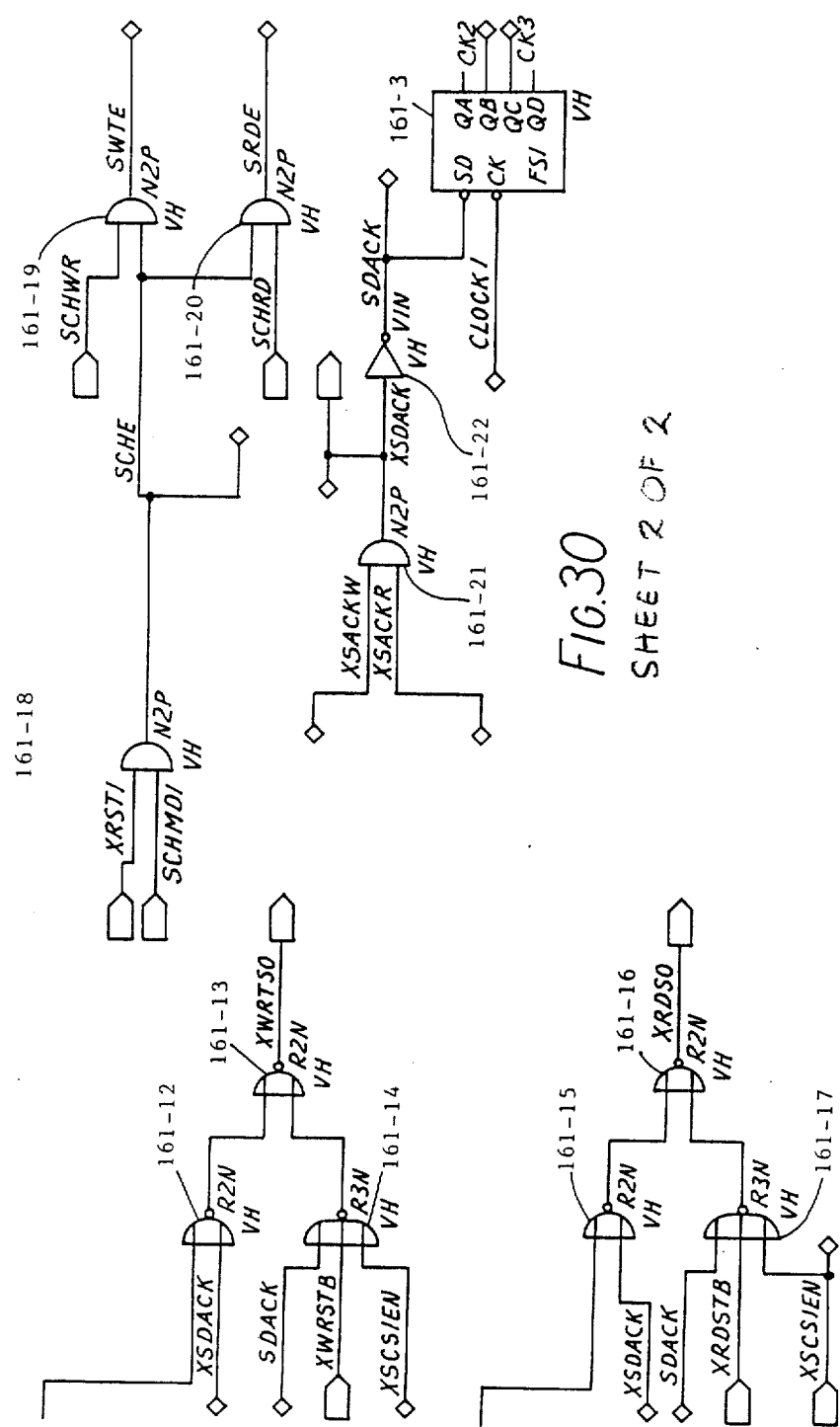

SCSI CONTROL SECTION (SEQUENCER) 161 (PART)

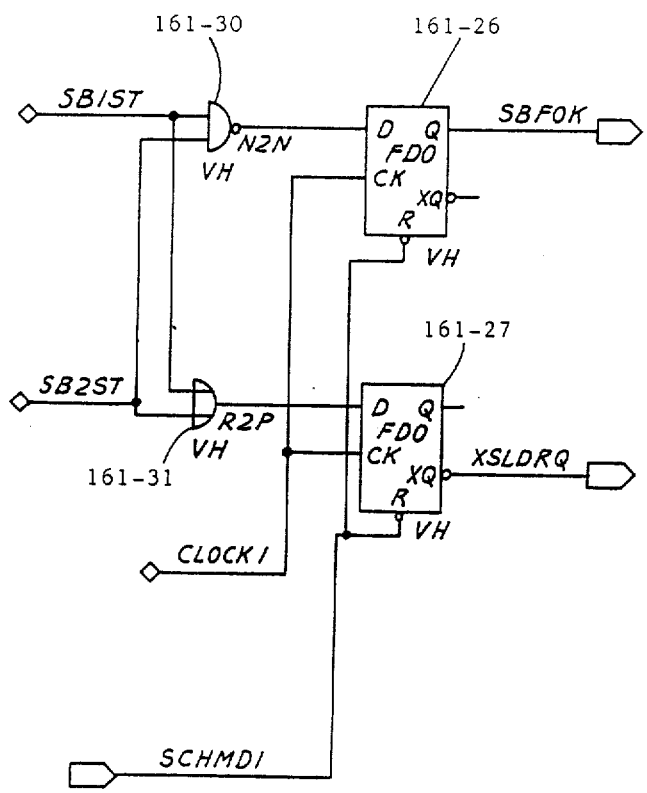
FIG. 31
SHEET 2 OF 2
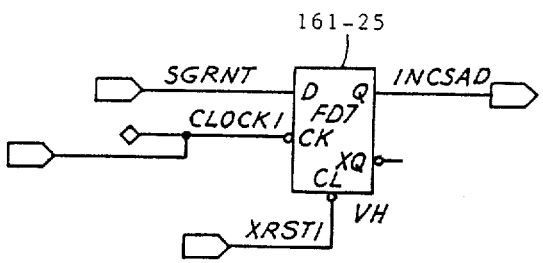

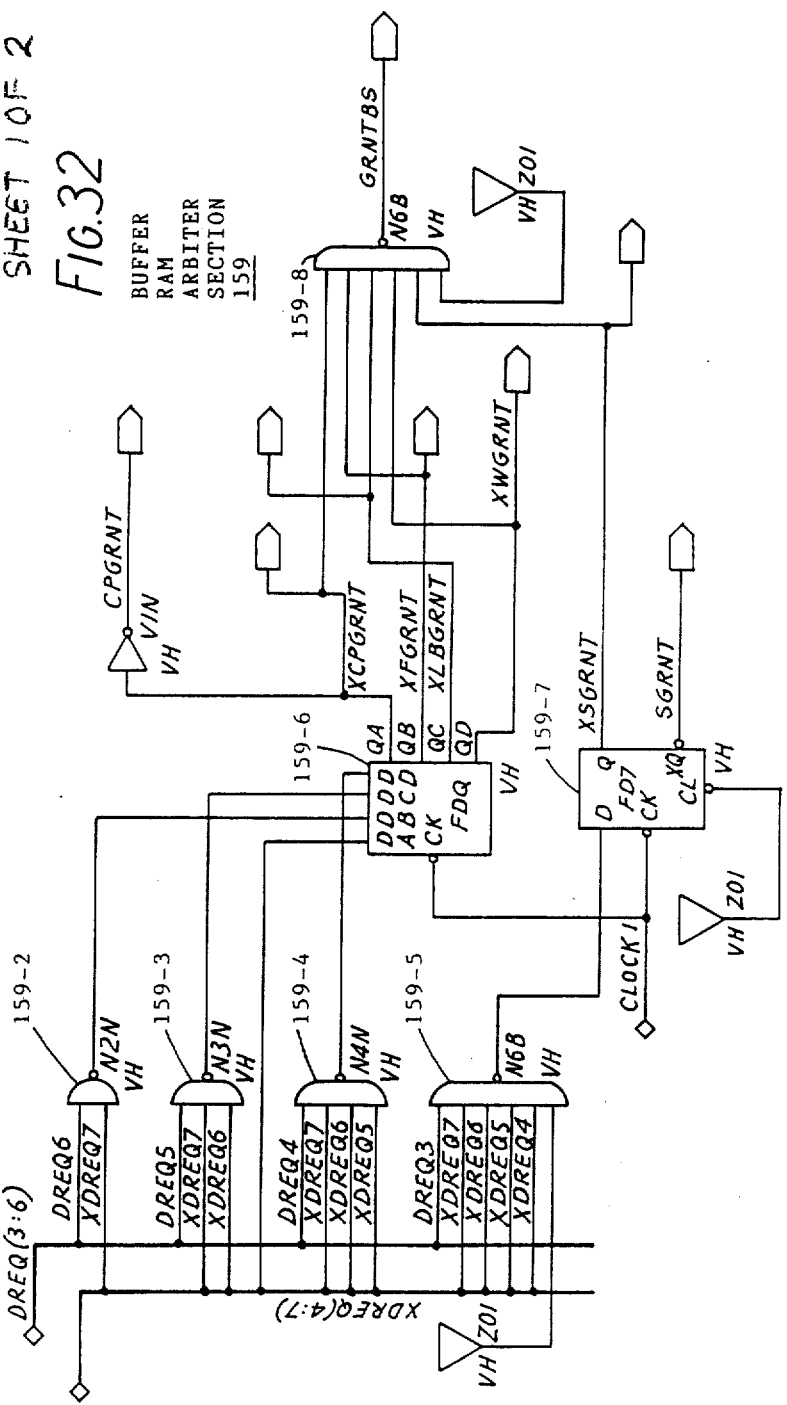

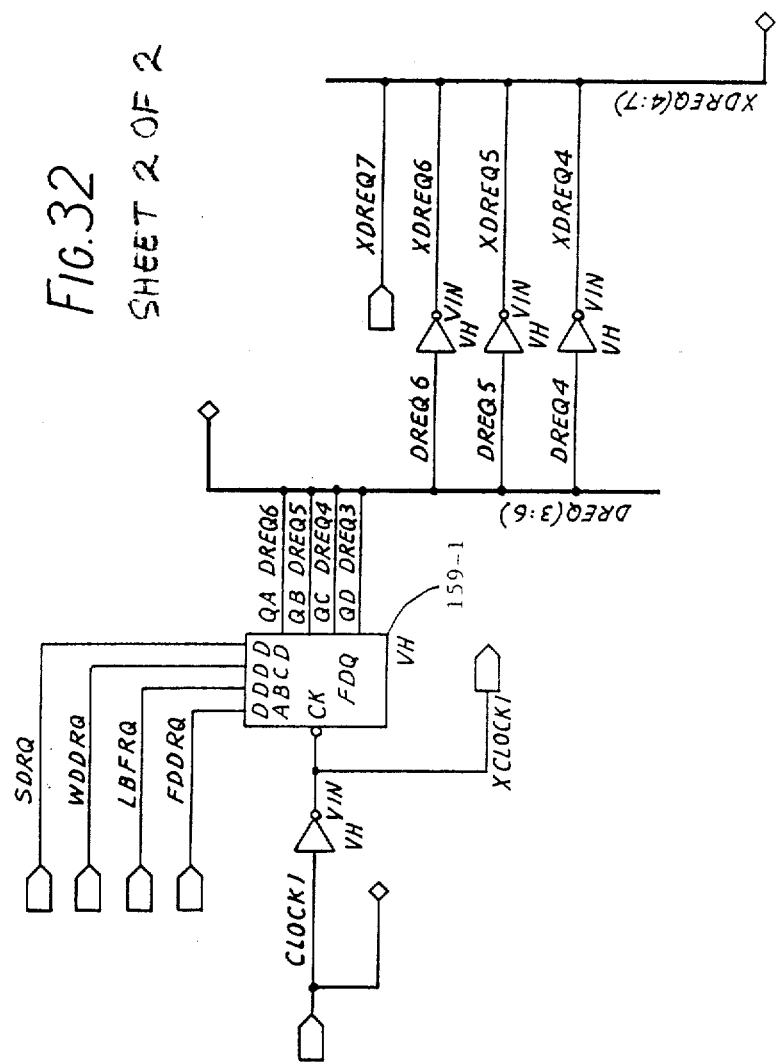
FIG. 32 SHEET 2 OF 2

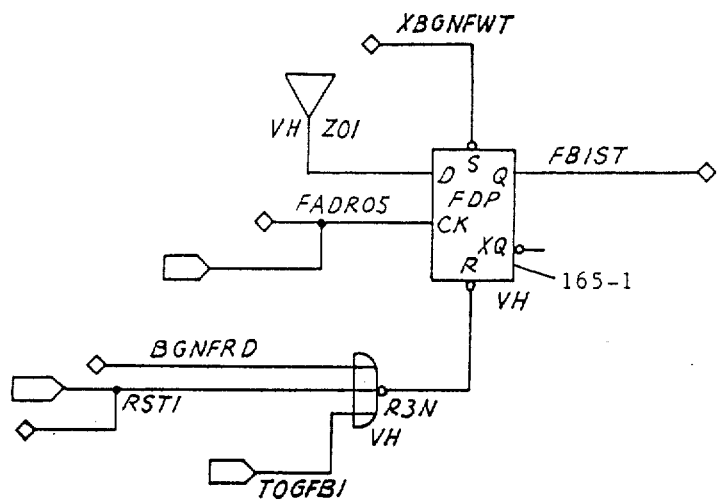
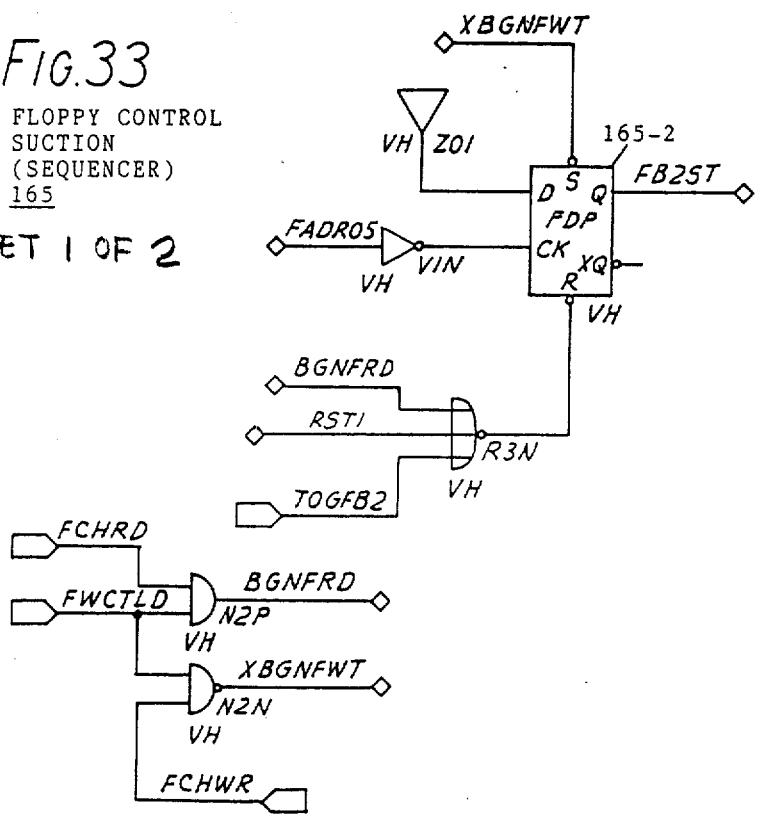
FIG.33
FLOPPY CONTROL
SUCTION
(SEQUENCER)
165
SHEET 1 OF 2

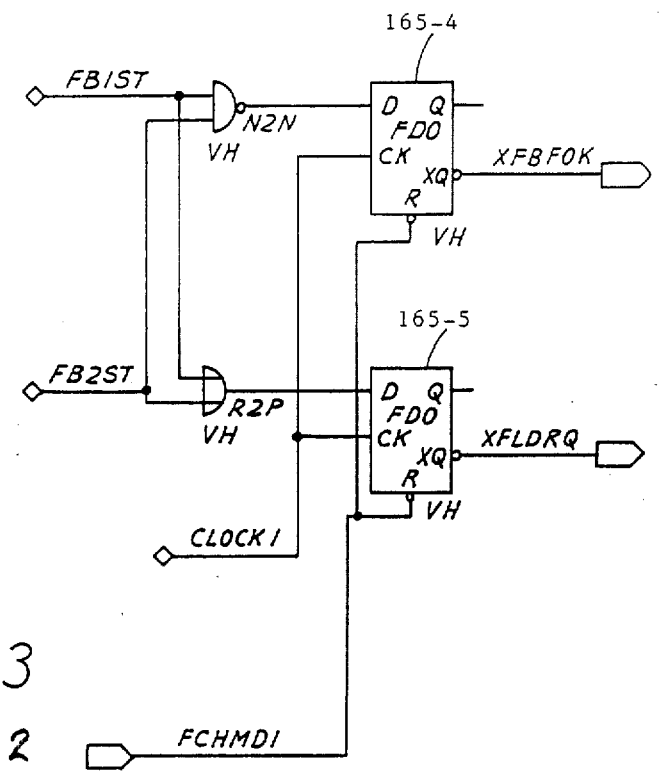
FIG.33
SHEET 2 OF 2
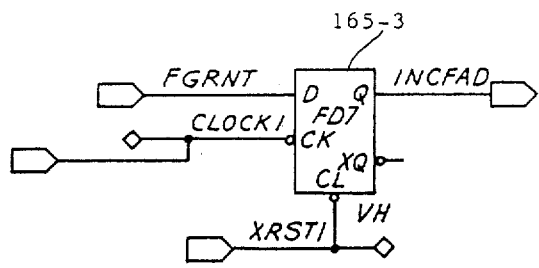

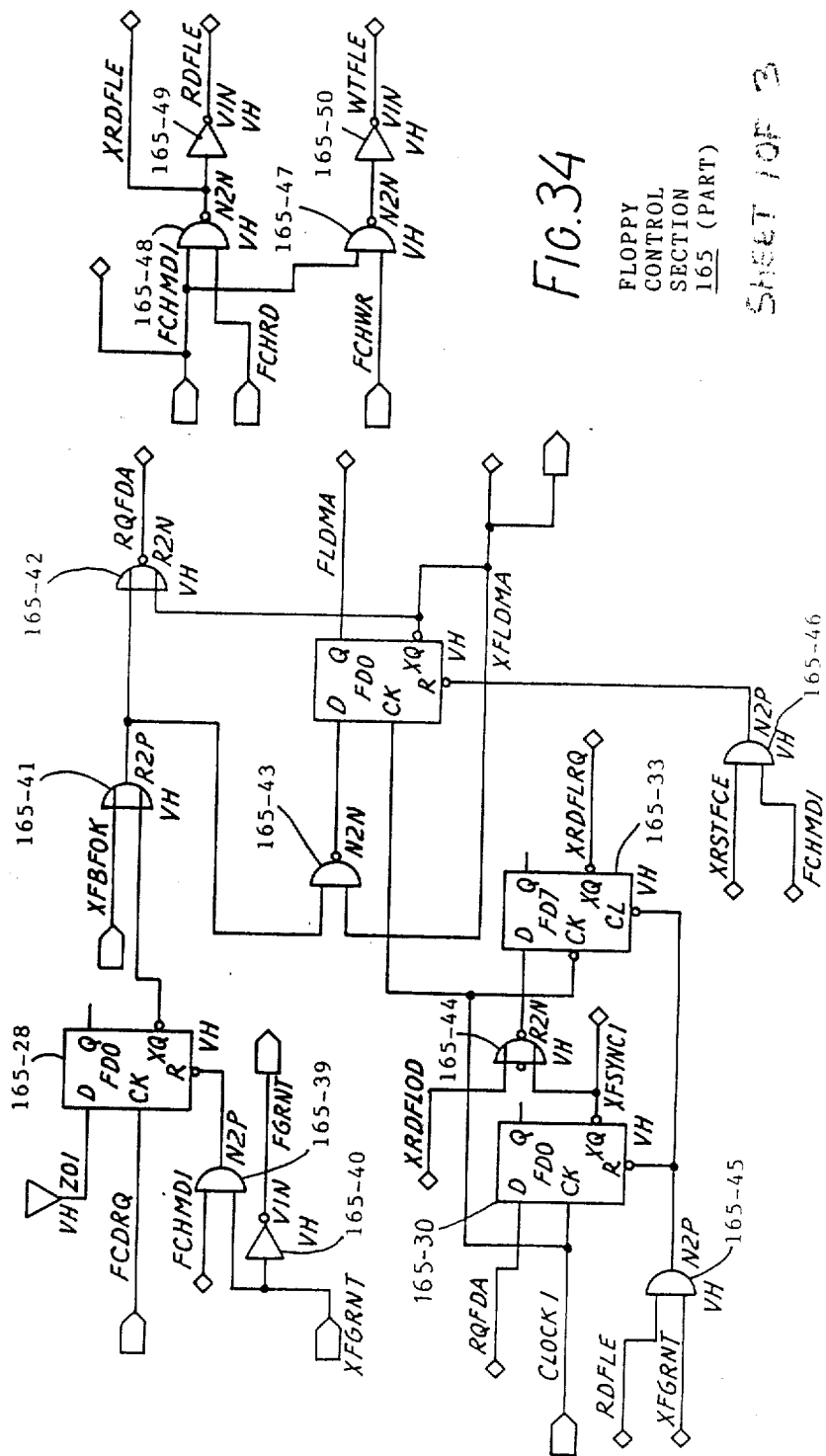
FIG.34 FLOPPY CONTROL SECTION 165 (PART)

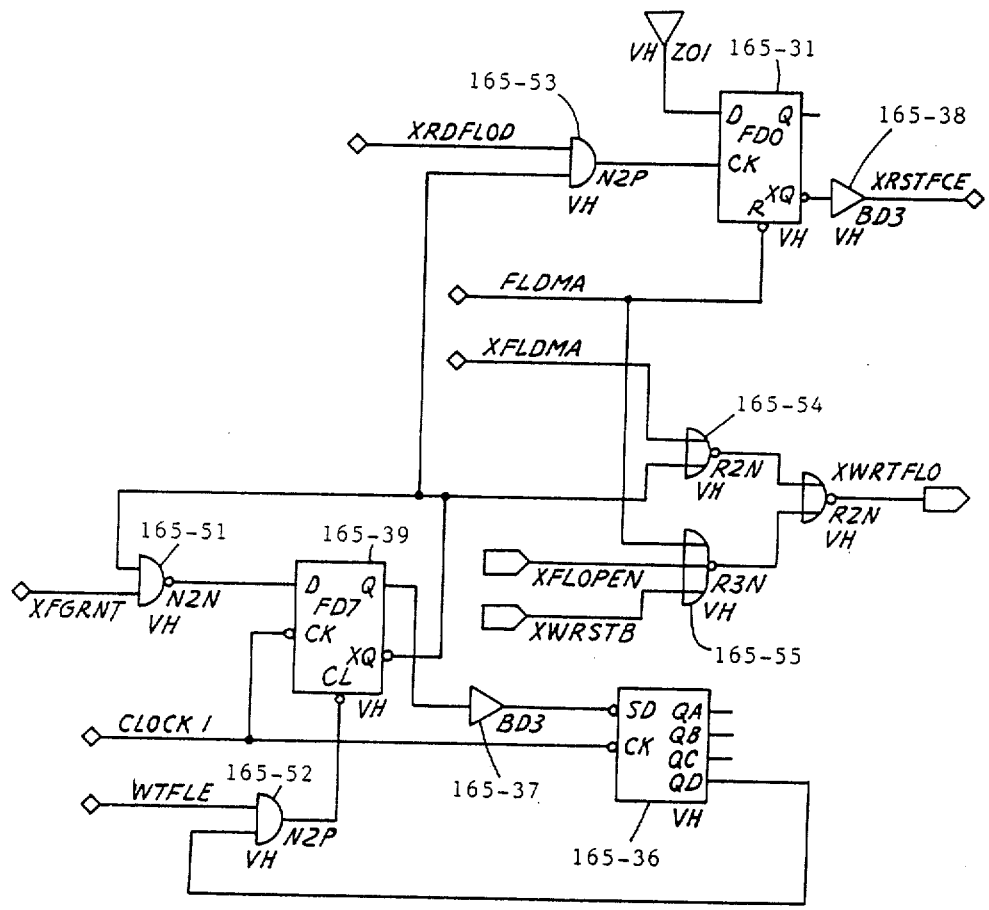
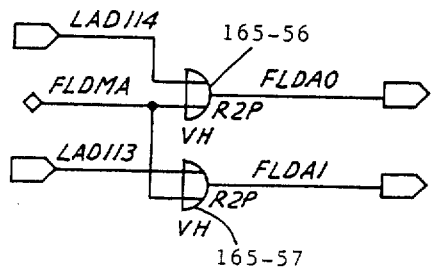
FIG.34
SHEET 3 OF 3

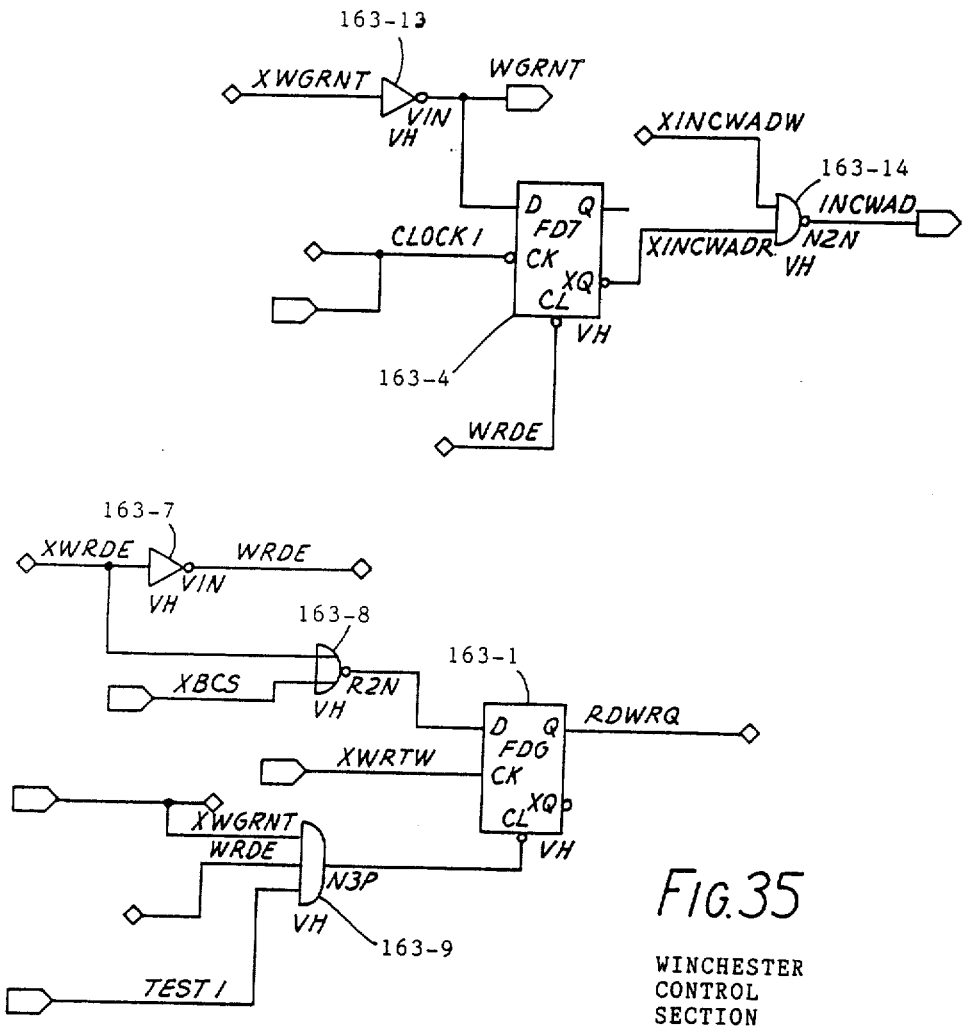
FIG.35
WINCHESTER
CONTROL
SECTION
163 (PART)
SHEET 1 OF 2
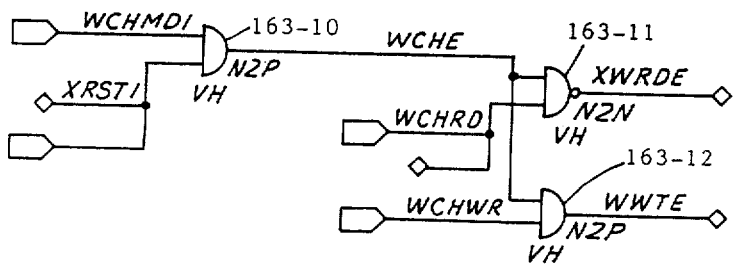

WINCHESTER CONTROL SECTION 163 (PART)

FIG.36
SHEET 2 OF 2
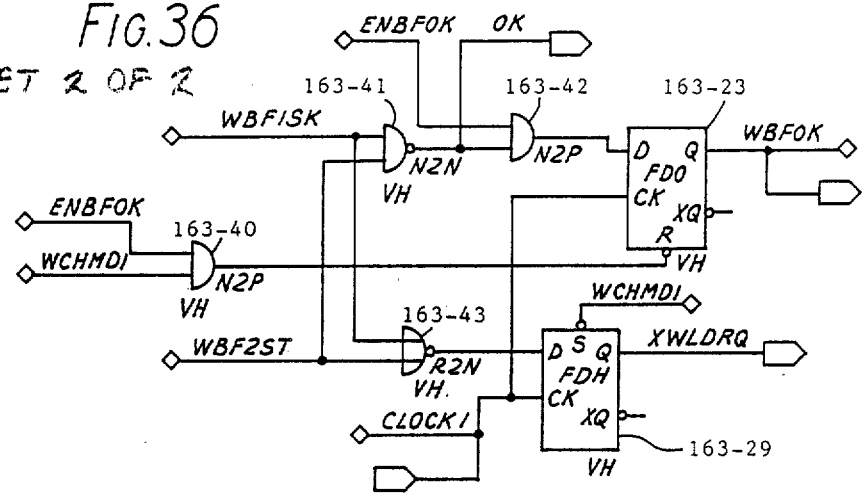
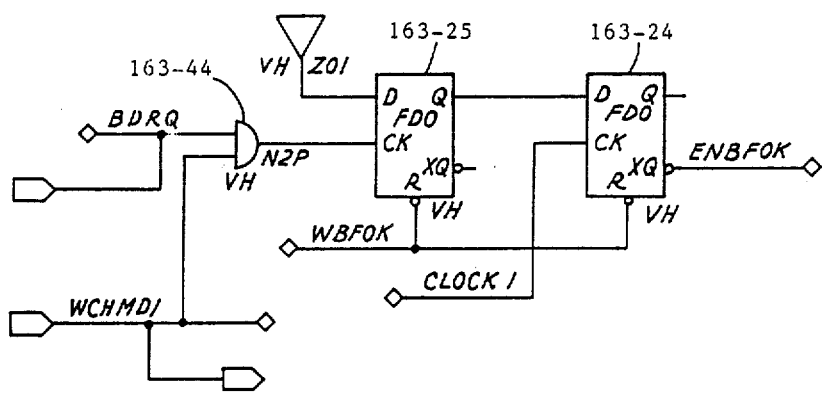
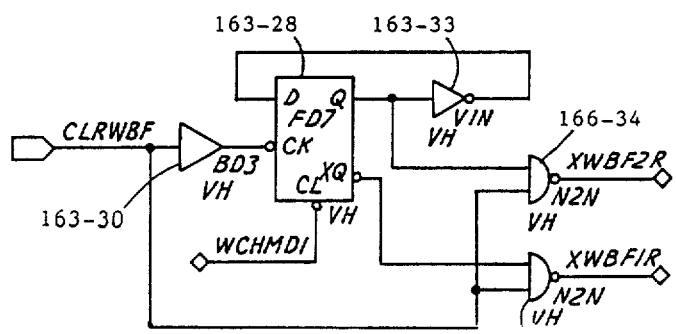

INPUT/OUTPUT CONTROLLER FOR A DATA PROCESSING SYSTEM

BACKGROUND OF THE INVENTION

The present invention relates generally to data processing systems and more particularly to an input/output (I/O) controller for a data processing system.

Data processing systems are known wherein an input-output (I/O) bus and a memory bus are each coupled to a central processing unit (CPU). One or more memory devices are coupled to the memory bus and one or more I/O controllers are coupled to the I/O bus. One or more I/O devices are coupled to each I/O controller. A terminal is coupled to the CPU, generally through an RS232 cable. The I/O controllers generally each include an I/O device controller, a buffer RAM, a first direct memory interface (DMA) section for interfacing the I/O device controller to the buffer RAM, a second direct memory interface (DMA) section for interfacing the buffer RAM to the I/O bus and a microprocessor for managing the transfer of data between the I/O device controller and the I/O bus. Usually, each one of the I/O controllers is implemented on a separate printed circuit board. Other data processing systems are known wherein a single bus, referred to as a system bus or a local memory bus, is used instead of an I/O bus and a memory bus combination and the CPU, the memory devices and the I/O controllers are all coupled to the single bus.

The problem with both of these prior art approaches is that they are relatively expensive, are not very practical and take up a relatively large amount of space.

It is an object of this invention to provide a new and improved I/O controller for a data processing system.

It is another object of this invention to provide a data processing system which includes a single I/O controller having a plurality of I/O device controllers for use with a plurality of I/O devices.

It is still another object of this invention to provide an I/O controller for a data processing system for use in interfacing a plurality of I/O devices which includes a plurality of I/O device controllers, a single buffer RAM which is shared by all of the I/O device controllers and a single microprocessor which manages the transfer of data between the plurality of I/O device controllers and the buffer RAM.

It is a further object of this invention to provide a gate array construction for implementing the logic in a plurality of direct memory access interface sections for a plurality of I/O device controllers.

SUMMARY OF THE INVENTION

In a data processing system having a local memory bus, a main memory coupled to the local memory bus and a host central processing unit coupled to said local memory bus, an input/output controller for interfacing a plurality of input/output devices to said local memory bus, said input/output controller including a plurality of input/output device controllers, each input/output device controller being adapted to be connected to at least one input/output device, a microprocessor for managing the operations of the input/output controller, a buffer memory for storing a program of instructions for the said microprocessor and temporarily storing data received from the input/output devices, means for interfacing the input/output device controllers to the local memory bus.

Various features and advantages of the invention will appear from the description to follow. In the description, reference is made to the accompanying drawings which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts:

FIG. 2 is a block diagram of a data processing system constructed according to the teachings of this invention;

FIG. 3 is a block diagram of the sections of the gate array 51 shown in FIG. 2;

FIG. 4 is a schematic diagram of the details of the SCSI word counter section 139 and a part of the SCSI device local address counter section 145 shown in FIG. 3;

FIG. 6 is a schematic diagram of he details of the WINCHESTER word counter section 141 and a part of the WINCHESTER device local address counter section 147 shown in FIG. 3.

FIG. 32 is a schematic diagram of the details of the buffer RAM arbiter section 159 shown in FIG. 3

FIG. 33 is a schematic diagram of the details of a portion of the floppy control section 165 (sequencer) shown in FIG. 3;

FIG. 36 is a schematic diagram of the details of a portion of another portion of the Winchester control section 163 (sequencer) shown in FIG. 3;

DETAILED DESCRIPTION OF PREFERRED EMBODIMENT

The present invention is directed to a data processing system in which a plurality of I/O device controllers are coupled to a local memory bus through an I/O controller which includes a single buffer RAM, a single microprocessor and a single gate array.

Figure 1:
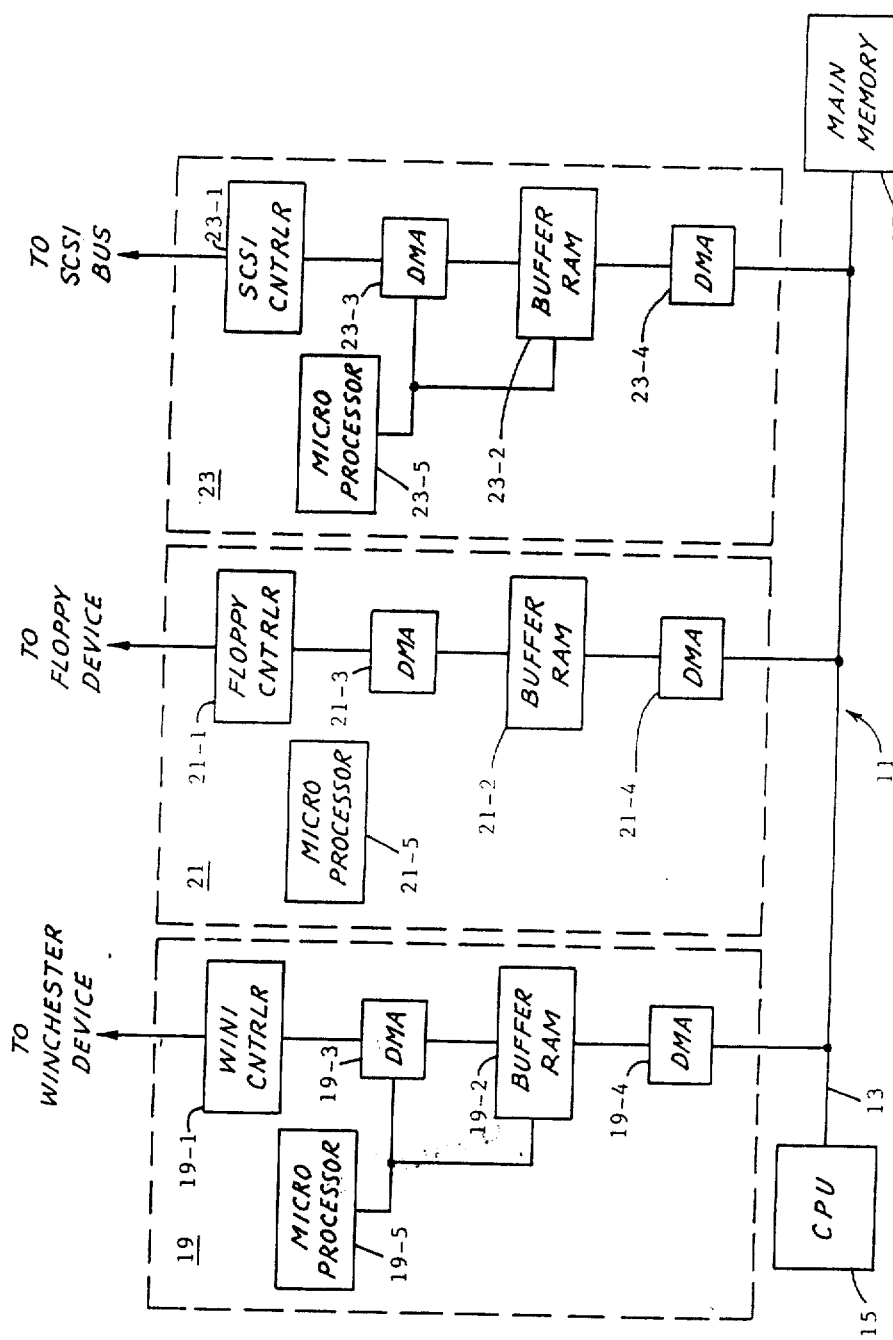
FIG. 1 is a block diagram of a conventional (prior art) data processing system.

Referring first to FIG. 1, there is illustrated a block diagram of a conventional (prior art) data processing system 11.

Data processing system 11 includes a system bus 13 to which are coupled a central processing unit (CPU) 15, a main memory 17 and a plurality of input/output (I/O) controller boards 19, 21 and 23.

Board 19 is for use in connecting a Winchester disc drive to system bus 13 and includes Winchester controller 19-1, a buffer RAM 19-2, a first direct memory access (DMA) interface section 19-3 for interfacing Winchester controller 19-1 to buffer RAM 19-2, a second direct memory access (DMA) interface section 19-4 for interfacing buffer RAM 19-2 to system bus 13 and a microprocessor 19-5 for managing the transfer of data between Winchester controller 19-1 and system bus 13.

Board 21 is for use in connecting a floppy disc drive to system bus 13 and includes a floppy controller 21-1, a buffer RAM 21-2, a first direct memory access (DMA) interface section 21-3, a second direct memory access (DMA) interface section 21-4 and a microprocessor 21-5. Board 23 is for use in connecting a system communications standard interface (SCSI) bus to system bus 13 and includes an SCSI controller 23-1, a buffer RAM 23-2, a first DMA section 23-3, a second DMA section 23-4 and a microprocessor 23-5.

As can be seen, each one of the device conrollers has its own buffer RAM, its own DMA sections and its own microprocessor.

Referring now to FIG. 2 there is illustrated a block diagram of a data processing system constructed according to the teachings of the present invention and identified generally by reference numeral 31.

Data processing system 31 includes a host central processing unit section (CPU) 33 and a main memory section 35. The exact implementations of CPU section 33 and main memory section 35 are not a part of this invention. Consequently, these two sections will be shown and described at the block diagram level only. CPU section 33 and main memory section 35 are each connected to a local memory bus (LMB) 37, which is the main bus for the system 31.

Data processing system 31 further includes a sub-system 39 (i.e. input/output controller) for use in connecting data processing system 31 to a pluralilty of input-/output (I/O) devices.

Sub-system 39 includes a floppy disc controller 41, an SCSI controller 43, a WINI controller 45, a buffer RAM 47, a microprocessor section 49 and a gate array 51.

Floppy disc controller 41 is adapted to be connected to a floppy disc drive (not shown) and serves to control the functions of the floppy disc drive. SCSI (i.e. systems communications standard interface) controller sections 43 is adapted to be connected to a SCSI bus and serves to control the functions of one or more devices which may be coupled to the SCSI bus. WINI controller 45 is adapted to be connected to a Winchester disc drive (not shown) and serves to control the functions of the Winchester disc drive. Associated with each one of controllers 41, 43 and 45 are buffers (not shown).

Buffer RAM 47 is an 8 K×32 bit microprocessor memory and I/O device buffer RAM which stores the I/O control program for microprocessor 49. Buffer RAM 47 contains three 1 kilobyte buffers for the three I/O devices (i.e. the floppy, the WINI and the SCSI bus). Microprocessor section 49 includes an 80186 microprocessor (by INTEL) and associated buffers and is used to control the overall operations of subsystem 39. This includes fielding I/O requests, supervising I/O data traffic and providing I/O status on completion of a data transfer.

Gate array 51, which will be hereinafter described in more detail, performs two basic functions. One function that it performs is that it provides all of the direct memory access interface circuitry for interfacing the I/O device controllers 41, 43 and 45 to buffer RAM 47 and interfacing buffer RAM 47 to main memory section 35. The other function that gate array 51 performs is that it regulates and manages the flow of data signals between each one of the I/O controller devices 41, 43 and 45, microprocessor 49 and main memory section 35 and buffer 47.

Subsystem 39 further includes a host microcode data transceiver 53, an 80186/Buffer RAM data transceiver 55 a power up PROM 57, an 80186 microprocessor address latch 59 and two buffer RAMS 61 and 63.

Host microcode data transceiver 53 is sixteen bits wide, is connected between host CPU 33 and subsystem 39 and transmits data between subsystem 39 and host CPU 33. The 80186/Buffer RAM data transceiver 55 is used to transfer data between buffer Ram 47 and microprocessor 49. Power up Prom 57 is used to hold the initialization program for sub-system 39. The 80186 microprocessor address latch 59 is used to hold the valid address for accessing the host microcode RAM, power-up PROM 57 and the non-volatile RAM. Buffer RAM 61 is a least significant word data transceiver and buffer Ram 63 is a most signifiant word data transceiver Subsystem 39 further includes a floppy direct memory access (DMA) data transceiver 65, and SCSI/DMA data transceiver 67 and a Winchester disc DMA data transceiver 69, a buffer RAM address register 71, a 32 bit wide buffer RAM/local bus data transceiver 73 and a 32 bit wide local bus address/command latching transceiver 75.

Floppy DMA data transceiver 65 is used to transfer data between buffer RAM 47 and the floppy disk drive during DMA transfers. The SCSI/DMA data transceiver 67 is used to transfer data between the buffer RAM 47 and the SCSI bus during DMA transfers. The Winchester disk DMA data transceiver 69 is used to transfer data between buffer RAM 47 and the Winchester disk drive during DMA transfers. Buffer RAM address register 71 is connected between gate array 51 and buffer RAM 47 and is used to hold a valid buffer RAM address from gate array 51 temporarily for buffer access. Buffer RAM/local bus data transceiver 73 is connected between local memory bus 37 memory buffer 47 and transceivers 61 and 63 and is used to transfer data between local bus 37 and buffer RAM 47. Local bus address/command latching transceiver 75 is connected between gate array 51 and local memory bus 37 and is used to hold addresses and local bus command bits for data transfer between the local bus 37 and the buffer RAM 47.

Referring now to FIG. 3 there is illustrated a block diagram of the gate array 51 shown in FIG. 2. Each block represents a function that can be broken down into a block of logic, each block being a discrete subsystem of the entire gate array 51. The lines show how the boxes are interconnected, each line being a bus that carries data signals and/or address signals and/or address signals and/or control signals, Heavy lines constitute buses for carrying data and access signals while light lines constitute buses for carrying control signals (i.e. control signal lines). Heavy lines that extend out from a box i.e. lines 101, 103, 105, 107, 109, 111 and are unconnected at their outer ends are for pin connections that are external to the gate array 51. Thus, for example, line 101 represents pin connections for connecting gate array 51 to microprocessor 49 and line 103 represents pin connections for connecting gate array 51 to SCSI controller 43.

As noted before, the main purpose of gate array 51 is to control a section of sub-system 39 identified as buffer RAM 47, and, in particular, to control the addressing into buffer RAM 47. The devices or sections which may access buffer RAM 47 and which the gate array 51 arbitrates to determine when they may access buffer RAM 47 are microprocessor 49, floppy controller 41, SCSI controller 43, WINI controller 45 and the controller for the local memory bus 37; the controller for gate array 51 being contained within gate array 51, itself.

There is also a priority scheme for enabling these devices or sections to access buffer RAM 47. In the established scheme, microprocessor 49 has the highest priority. The priority scheme, in descending order, is then the floppy controller 41, the local bus controller, the Winchester controller 45 and lastly the SCSI controller 43.

The controller 45 for which the interface section in the following described implementation of gate array 51 is designed to interface with is a Western Digital WD1010 or WD2010 chip. The controller 43 for which the interface section in gate array 51 is designed to interface with is an NCR 5380 chip. The controller 41 for which the interface section in gate array 51 is designed to interface with is the (Western Digital) WD1793 or the Fujitsu 8877.

There is a block 113 labelled 80186 I/O which is the interface section to the microprocessor 49. This block contains the logic circuitry of all of the interconnections between the inside signals of gate array 51 and the external pins of gate array 51 which are connected to the 80186 bus. Basically, block 113 is a logic circuit or a section of logic that functions as a data transceiver and buffer. The transceiver position of block 113 takes the multiplexed address data bus from (the 80186) microprocessor 49 and de-multiplexes it two separate buses; one being input bus 115 and the other being output bus 117. The transceiver portion also transmits external data signals to the control lines of gate array 51.

There is a block 119 labelled SCSI. I/O which is the SCSI interface section. This block contains logic circuitry that performs a function similar to block 113, but for the SCSI controller 43. The section takes external data and control signals from SCSI controller 43. The section takes external data and control signals from SCSI controller 43, buffers them so that they can be used inside gate array 51 and takes internal data and control signals from gate array 51, buffers them and transmits them out to SCSI controller 43 for use by SCSI controller 43.

There is a block 121 labelled WINI I/O which is the section that interfaces gate array 51 to the WINCHESTER controller 45. This block contains logic circuitry that performs a function similar to block 113, but for the WINCHESTER controller 45. The section takes external data and control signals from WINI controller 45, buffers them so that they can be used inside gate array 51 and takes internal data and control signals from gate array 51, buffers them and then transmits them out to WINCHESTER controller 45.

There is a block 123 labelled FLOP I/O which is the interface section for interfacing gate array 51 to the floppy controller 41. This block contains logic circuitry that performs a function similar to block 113, but for the floppy controller 41. The section takes external data and control signals from the floppy controller 41, buffers them so that they can be used inside the gate array 51 and takes internal data and control signals from gate array 51, buffers them an then transmits them out to the floppy controller 41.

There is a block 125 labelled local bus I/O which is the section that interfaces gate array 51 to local memory bus 37. This block contains logic circuitry that performs a function similar to block 113, but for the local memory bus 37. The section takes external data and control signals from the local memory bus 37 buffers them so that they can be used inside the gate array 51 and takes internal data and control signals from gate array 51, buffers them and then transmits them out to the local memory bus 37.

There is a block 127 labelled Bufram I/O which interfaces gate array 51 to the buffer RAM 47. This block contains logic circuitry that performs a function similar to block 113, but for the buffer RAM 47. This section takes internal data and control signals from gate array 51, buffers them and then transmits them out to the buffer RAM 47. Block 127 differs from blocks 113 and 119 through 125 in that all of the signals are output signals. There are no input signals to block 127.

Thus, blocks 113 and 119 through 127 provide all of the input and output interfacing to the gate array 51. All of the other blocks in gate array 51 as shown represent internal sections which communicate only within gate array 51 or only through one of the sections 113 and 119 through 127.

Signals flow from microprocessor 49 through gate array 51 to buffer RAM 42 in the following manner. Address and data signals and control signals from microprocessor 49 enter gate array 51 through interface section 113 where they are sent out over 80186 input data bus 115. Bus 115 is energized any time microprocessor 49 is assembying addressor data and driving the signals to gate array 51. Bus 115 contains 16 bits of address and data and also contains control lines and is the main programming bus for gate array 51.

Bus 115 communicates with block 129 which is labelled 186-ADDR, block 131 which is labelled PG-ADDR, block 133 which is labelled WD-BADDR, block 135 which is labelled SD-BADDR and block 137 which is labelled FD-BADDR. Bus 115 also communicates with a block 139 which is labelled SCSI-WCT, a block 141 which is labelled WINI-WCT, a block 143 which is labelled FLOP-WCT, a block 145 which is labelled SD-LADDR, a block 147 which is labelled WD-LADDR, a block 149 which is labelled FD-LADDR. Finally, bus 115 communicates with previously discussed boxes 119, 121 and 123 which are labelled SCSI-IO, WINI-IO and FLOP IO, respectively.

186-ADDR address section 129 contains the circuitry that stores the current microprocessor address. PG-ADDR section 131 is three page address registers. It is another storage block that holds data written by microprocessor 49 to be used later by gate array 51 for specific buffer RAM addressing.

WD-BADDR section 133 is a buffer address counter for the Winchester device coupled to the WINI controller 45. It is a loadable counter that the microprocessor must load and will store that address for later use. Each time the address is used it gets incremented by one to be used again, subsequently.

SD-BADDR section 135 is a buffer address counter for the SCSI device coupled to the SCSI controller 43. It is a loadable counter that the microprocessor must load and will store that address for later use. Each time the address is used it gets incremented by one to be used again, subsequently.

FD-BADDR section 137 is a buffer address counter for the floppy device coupled to the floppy controller 41. It is a loadable counter that microprocessor 49 must load and will store that address for later use. Each time the address is used it gets incremented by one to be used again, subsequently.

SCSI-WCT section 139 is a word counter for the SCSI device. It contains preloadable registers (i.e. counters) which are used to count the number of words transferred from the SCSI device to the local memory bus 37. It is loadable by the microprocessor through input bus 115.

WINI-WCT section 141 is a word counter for the WINI device. It contains preloadable registers (i.e. counter) which are used to count the number of words from the WINI device to the local memory bus 37. It is loadable by the microprocessor through input bus 115.

FLOP-WCT section 143 is a word counter for the floppy device. It contains preloadable registers (i.e. counter) which are used to count the number of words from the Floppy device to the local memory bus 37. It is loadable through input bus 115.

SD-LADDDR section 145 is the SCSI device local bus address counter. The section contains the address that is used on the local bus when SCSI controller 43 is transferring data to or from local memory bus 37. The section includes a register that gets incremented by either one or two depending on the type of transfer.

WD-LADDR section 147 is the WINCHESTER device local bus address counter. The section contains the address that is used on the local bus when WINCHESTER controller 43 is transferring data to or from local memory bus 37. The section includes a register that gets incremented by either one or two depending on the type of transfer.

FD-LADDR section 149 is the floppy device local bus address counter. The section contains the address that is used on the local bus when floppy controller 43 is transferring data to or from local memory bus 37. The section includes a register that gets incremented by either one or two depending on the type of transfer.

Bus 117, as noted before, is the 80186 output data bus. This bus is connected to SCSI-IO section 119, WINI-IO section 121, FLOP-IO section 123 and a block 151 labelled 186-STAT.

186-STAT section 151 is the status register for the 80186 microprocessor 49. It contains the status of the internal functions of gate array 51. When the 80186 microprocessor 49 executes the instruction to read gate array status, the status will be asserted on 80186 output data bus 117 and driven to 80186-IO interface section 113 where it is then driven to microprocessor 49 for use by microprocessor 49. Similarly, when microprocessor 49 wants to read one of the controllers, such as SCSI controller 43, the data is driven by SCSI-IO to section 119 on to 80186 output data bus 117 and then through 80186-IO section 113 to microprocessor 49. Data is outputted from WINI IO section 121 and FLOP-IO section 123 in the same way as with SCSI-IO section 119.

There is a 186 control block 153 which is labelled 186-CTL. This block has connections to every block in gate array 51. For simplicity and clarity, the lines from block 153 to the other blocks in gate array 51 have been omitted. Block 153 is essentially a decoder. It contains logic that takes all the address and control signals from the 80186 microprocessor 49, decodes them to determine what the 80186 microprocessor 49, is attempting to do (i.e. reading or writing, either internal registers or external buffer RAMS or external device registers) and asserts control signals to the proper block (i.e. section) in gate array 51 or the buffer RAM 47 or an external device register.

There is a block 155 which is labelled ADDR-SEC and which is an address decoder. Block 155 is connected to 186-ADDR block 129. Address decoder 155 and 186-CTL block 153 together provide all of the control signals and address decoding necessary for all the internal functions of gate array 51 to be accessed.

There is a block numbered 157 which is labelled LBUS-CTL and which is the local bus (main memory data and address bus) control block. Block 157 takes some of the input signals from Local-IO section 125, decode them and the timing control signals from them to determine what other blocks (sections in gate array 51 should do. Thus, block 157 is basically a state machine that is stimulated by outside signals which are buffered by block 125. There are a number of functions provided by local bus control block 157. Some of these functions include providing all of the local bus protocol, providing all of the pulses needed to make the local bus address counters and the word counters increment and asserting signals to other blocks within gate array 51 telling these other blocks that services may be needed which are provided by the individual blocks. Section 157 is connected to nearly all of the other blocks in gate array 51. However, for simplicity and clarity, none of the connecting lines are shown.

There is a block numbered 159 which is labelled BRAM-ARB and which is the buffer RAM arbiter section. The buffer RAM arbiter section determines which one of many devices will accces buffer RAM 47 at any one time. It determines which one of the three IO devices may access the buffer RAM 47. It also arbitrates and allows microprocessor 49 to access buffer Ram 47 anad also arbitrates and allows local bus 37 to access buffer RAM 47. This block takes signals from the local bus control block 157, the 186 control block 153, a block numbered 161 and labelled SCSI-CTL and which is the SCSI controller control block, a block numbered 163 and labelled WINI-CTL and which is the WINCHESTER controller control block and a block numbered 165 and labelled FLOP-CTL and which is the floppy controller control block. Buffer RAM arbiter block 159 takes the input signals, the input signals being buffer RAM requests, determines which one of the blocks (devices) has the highest priority and then asserts a signal telling the block with the highest priority that it has the highest priority so that the block can continue to perform its function.

SCSI-CTL block 161 is a section of logic that provides sequencing for SCSI controller 43. It takes signals from the SCSI-IO block 119, determines when the SCSI controller 43 is requesting direct memory access (DMA) and asserts the proper control signal back to the SCSI controller 43 to make SCSI controller 43 sequence properly.

WINI-CTL block 163 is a section of logic that provides sequencing for the WINCHESTER controller 45. It takes signals from the WINI-IO block 121, determines when the WINCHESTER controller 45 is requesting direct memory access (DMA) and asserts the proper control signal back to the WINCHESTER controller 45 to make the WINI controller 45 sequence properly.

FLOP-CTL block 165 is a section of logic that provides sequencing for the floppy controller 41. It takes signals from the FLOP-IO block 123, determines when the FLOPPY controller 41 is requesting direct memory access (DMA) and asserts the proper control signal back to the FLOPPY controller 41 to make FLOPPY controller 41 sequence properly.

In FIGS. 4 through 36 there is illustrated schematic diagrams of the details of the various blocks in gate array 51 shown in FIG. 3

It is to be understood that gate array 51 comprises a plurality of gates arranged in groupings so as to perform various desired logical functions. Gate array 51, as designed, is a product of Fujitsu Microelectronics, Inc. of Santa Clara, Calif. All details concerning the gate array 51 and the arrangement of gates in gate array 51 may be more clearly understood by referring Fujitsu Microelectronics VH series CMOS Gate Array Design Manual copyright 1984, First Edition, as updated on July 19, 1985.

In the drawings, combinations of gates that perform logical functions are shown simply as rectangular boxes or other logic symbols. Each box or logic symbol has a three character name identifying the unit cell represented by the box or logic symbol. The logic function performed by the arrangement of gates in the box or logic symbol may be found in the Fujitsu mamnual noted above. For example, a box having the (Fujitsu) name "C11" is a unit cell made up of a combination of eleven gates arranged according to the unit cell C11 as described in the Fujitsu design manual (section 3) to function as a flip-flop counter. For simplicity, in the following discussion of the several Figures, the items shown will be referred to in most instances in terms of their logical functions (i.e. a flip-flop, a counter, a latch etc.) rather than as combination of gates to produce the particular logical functions. Thus, when an item is referred to as a "counter" it should be understood that there is no discrete items on the gate array that is a counter, per se, but instead there is a group of gates in the gate array that are arranged to collectively function as a counter.

In all of the following schematic Figures, diamond shaped symbols represent connectors. Diamond shapes that are pointed at both ends (i.e. pin AD11 in FIG. 14) represent bi-directional pins (a pin through which signals flow in both directions) where as a pin that is flat on one end (i.e. pin AD07 in FIG. 14) represents a single directional pin (a pin through which signals flow in only one direction). Connectors that appear as dark lines (i.e. connector AD07 in FIG. 14) are connectors that connect to parts outside of gate array 51 while connectors that are light lines (i.e. connector AD107 in FIG. 14) are connectors that connect to parts within gate array 51.

Referring now to FIG. 4 there is shown a schematic diagram of the contents of the SCSI word counter section 139 and a portion of the SCSI device local address counter section 145.

Local address counter section 145 includes four unit cells 145-1, 145-28 145-3, and 145-4. Unit cell 145-1 is made up of 11 basic cells or gates which are arranged to function as a single bit counter. The unit cell is identified by the Fujitsu unit cell name C11. Unit cells 145-2, 145-3 and 145-4 are each unit cells having the Fujitsu unit cell name C43 and as such consist of 48 basic cells arranged so as to define a 4 bit synchronous binary up counter with asynchronous clear. Counters 145-1 through 145-4 (i.e. the unit cells representative of the counters) all receive inputs from the 80186 input bus 115. The outputs from counters 145-1 through 145-4 are used to create an address for a direct memory address transfer. Each time a transfer occurs, these counters are incremented by one or two, depending on the type of transfer (i.e. a single word or a double word transfer).

Section 145 also includes a unit cell 145-5 which is made up of 4 basic cells arranged as in Fujitsu unit cell LT2 so as to function as a 1-bit data latch. Latch 145-5 also receives input from the 80186 input bus 115. Latch 145-5 stores the direction indicator for this channel (i.e. whether we are doing a read or a write to the main memory 35 with counters 145-1 through 145-4). There is also a number of extraneous gates 145-6 surrounding counters 145-1 through 145-4 and latch 145-5 which are necessary to join counters 145-1 through 145-4 together to function as a single counter. There is also a group of gates 145-7 which takes inputs from address counters 145-1 through 145-4 and inputs from the word counter the SCSI word counter section 139 and uses them to assert red and write pulses to the buffer Ram 47. This logic 145-7 also encodes 4 bits of the address to tell the local memory bus 37 the type of transfer that is being performed.

Section 145 also includes a section of logic 145-8 which includes four unit cells 145-81, 145-82, 145-83, and 145-84. Each one of these unit cells 145-81 through 145-84 is made up of two basic cells, each arranged according to the Fujitsu unit cell T2D so as to function as a 2:1 selector. Logic section 145-8 is used for diagnostic purposes. It allows gate array 51 to be programmed for a variety of diagnostic commands for the memory bus 37 to resond to. This allows a diagnostic program to test the main memory bus 37 and the main memory 35 using gate array 51 in a very simple manner.

SCSI word counter section 139 includes four unit cells numbered 139-1, 139-2, 139-3 and 139-4. Unit cell 139-2 is made up of 4 basic cells arranged as in Fujitsu unit cell LT2 so as to function as a 1-bit data latch. Unit cells 139-2, 139-3 and 139-4 are each made up of 48 basic cells arranged so as to define a Fujitsu unit cell C43; which is 4 bit synchronous binary up counter with asynchronous clear. Latch 139-1 and counters 139-2 through 139-4 collectively form a 13 bit cascaded counter and function in a manner similar to latch 145-1 and counters 145-2 thrugh 145-4. Unit cells 145-1 through 145-5 receive inputs from the ADI bus which is 80186 input bus 115.

SCSI word counter section 139 also includes some associated logic, the associated logic including two (representations of) D type flip-flops 139-5 and 139-6 (i.e. two groups of gates arranged to functin as flip-flops) each of which is the Fujitsu unit cell name (label) FDO (designating the particular type of flip-flop). These flip-flops 139-5 and 139-6 receive inputs from the word counters 139-2 through 139-4 and provide outputs that go to a status register in the 186 status register buffer 151. These output indicate when a transfer is complete or when a 2048 word boundary has been reached on local memory bus 37. There is also a set of gates collectively labelled 139-7 at the input side of flip-flops 139-5 and 139-6 which condition the inputs to the flip-flops so that they will be useable.

Figure 5:
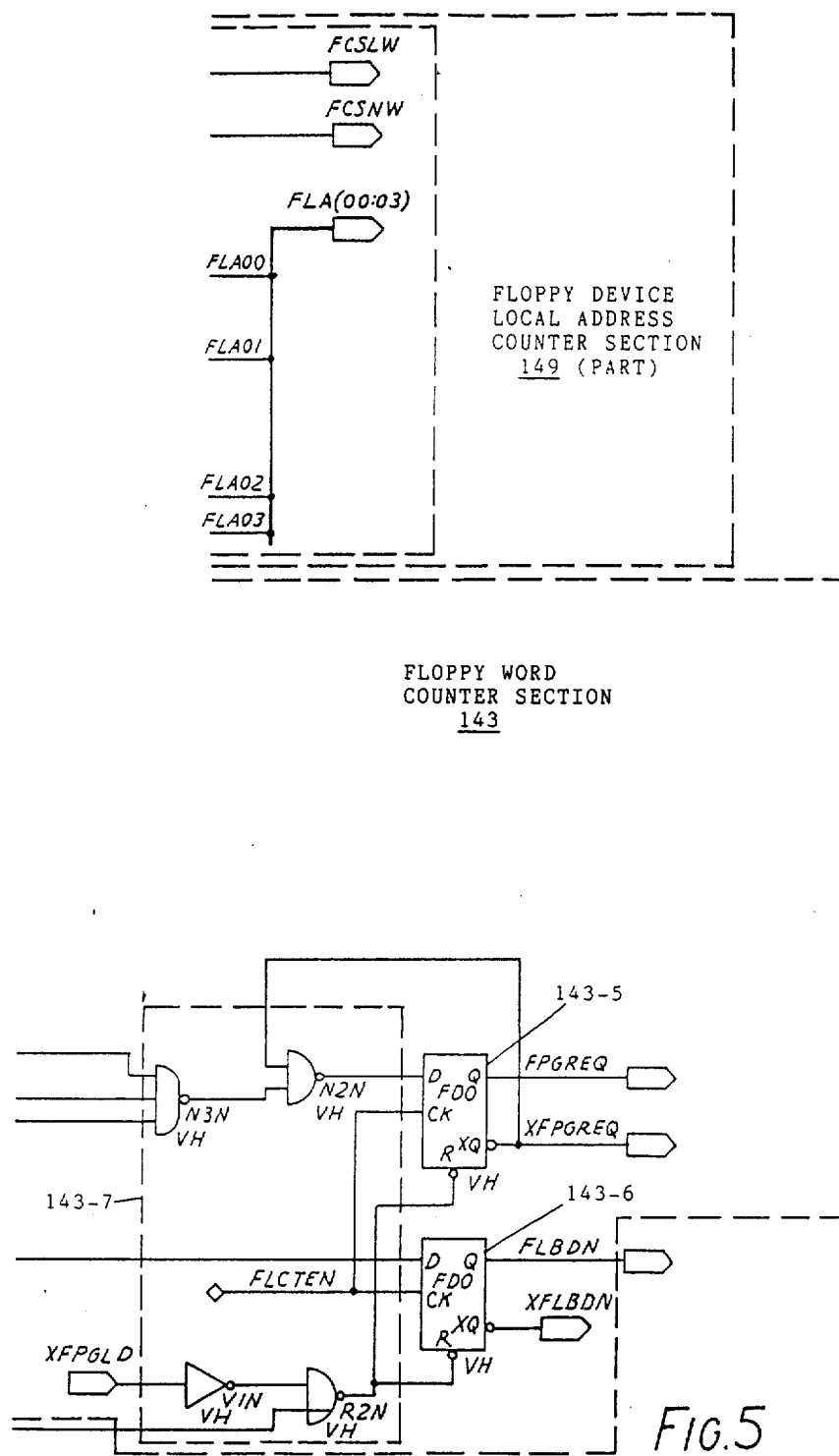
FIG. 5 is a schematic diagram of the details of the floppy word counter section 143 and a part of the floppy device local address counter section 149 shown in FIG. 3.

Referring now to FIG. 5 there is illustrated a schemtic diagram or representation of blocks representing the details of the floppy word counter section 143 and parts the floppy device local address counter section 149. The types of unit cells, the number of unit cells, the arrangement of unit cells and the functions served by the unit cells in section 143 are identical to the types of unit cells, the number of unit cells, the arrangement of unit cells and the functions served by the unit cells section 139, the only difference being that section 139 is for the SCSI device whereas section 143 is for the floppy device. Thus, section 143 contains a flip-flop 143-1 and three counters 143-2 through 143-4 which correspond to flip-flop 139-1 and counters 139-2 though 139-4.

The portions of section 149 shown in FIG. 5 are identical to the portion of section 145 shown in FIG. 4 with the exceptions being that (1) section 149 pertains to the floppy device rather than the SCSI device and (2) section 149 does not have a portion corresponding to the diagnostics section 145-8. Thus, the portion of section 149 as shown on FIG. 5 includes a flip-flop 149-1, three counters 149-2 through 149-4, a latch 194-5, associated logic 194-6 and associated logic 194-7 which correspond to flip-flop 145-1, counters 145-2 through 145-4, a latch 145-5 and associated logic 145-5 and 145-6, respectively.

Referring now to FIG. 6 there is shown a schematic or representation of blocks representing the details of the Winchester drive word counter section 141 and a part of the Winchester device local address counter section 147. Section 141 is identical to section 143, the only difference being that it is used for the Winchester device and thus includes a flip-flop 141-1, three counters 141-2 through 141-4, a pair of flip-flops 141-5 and 141-6 and associcated logic 141-7 which correspond to components 143-1 through 143-7 in FIG. 5. The portions of section 147 are identical to the corresponding portions of section 149 in FIG. 5 and thus include a flip-flop 147-1, three counters 147-2 through 147-4, a latch 147-5 and associated logic 147-6 which correspond to elements 143-1 through 143-6 in FIG. 5.

Figure 7:
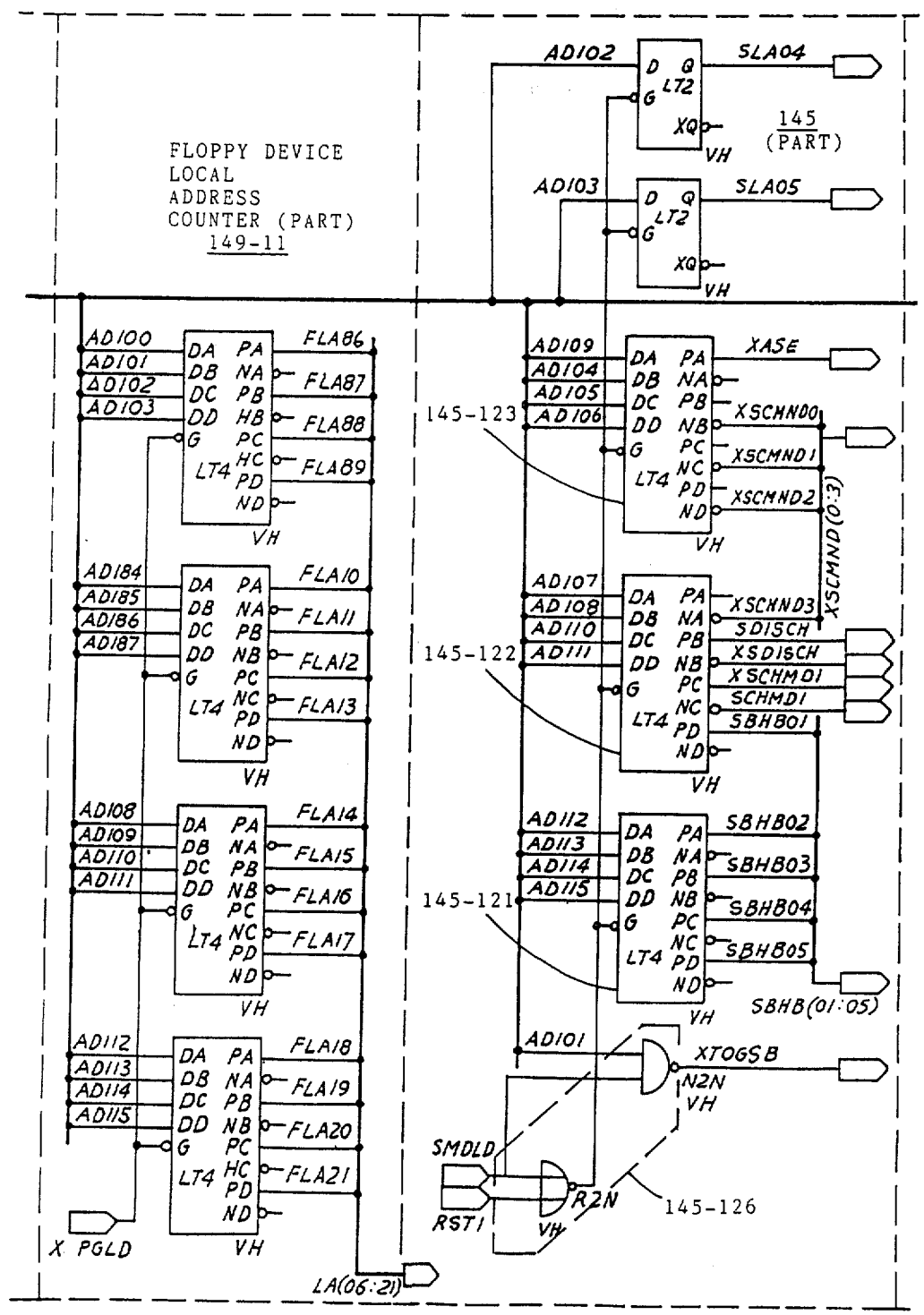
FIG. 7 is a schematic diagram of the details of a portion of the SCSI device local address counter section 145, a portion of the WINCHESTER device local address counter section 147 and a portion of the floppy device local address counter 149 shown in FIG. 3.
Figure 7:
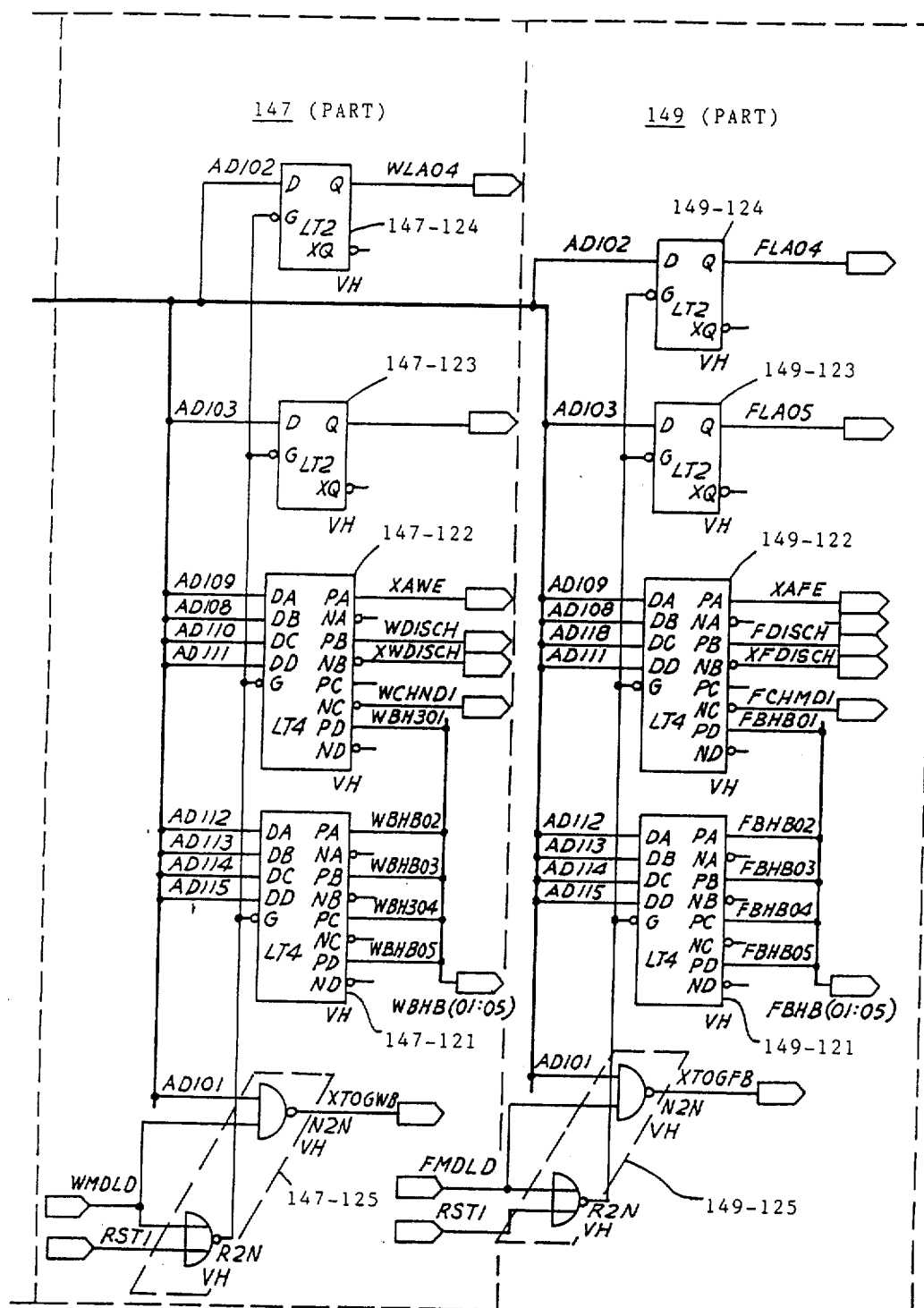

Referring now to FIG. 7 there is shown a schematic diagram of logic corresponding to portions of the SCSI device local address counter section 145, the Winchester device local address counter section 147 and the floppy device local address counter section 149.

There is a section of logic labelled 145-11, a section of logic labelled 147-11 and a section of logic labelled 149-11. These three sections constitute page registers, that is, they hold the page address for main memory 35. Section 145-11 is the page register for the SCSI device, section 147-11 is the page register for the Winchester device and section 149-11 is the page register for the floppy device. The logic in each one of the three sections is identical and comprises four identical 4-bit latches. In section 145-11 the four latches are labelled 145-111 through 145-117, in section 147-11 the latches are labelled 147-111 through 147-117 and in section 149-11 the four latches are labelled 149-111 through 149-11. Each one of these latches holds 4 bits of data. The latches receive the data from ADI bus (i.e. the 80186 input bus 115) and hold the information so received to be used during a data transfer or memory access cycle. The information is loaded by microprocessor 49.

There is also a section of logic labelled 145-12, a section of logic labelled 147-12 and a section of logic labelled 149-12. These three sections constitute mode registers or latches. These sections get their inputs from the data input bus 115. The data is stored in the latches and is then used to control various functions of their respective channels.

The mode register 145-12 for the SCSI device contains 14 bits of data and is made up of three 4-bit data latches 145-121, 145-122 and 145-123, two 1-bit data latches 145-124 and 145-125 and associated logic 145-126. The mode register 147-12 for the Winchester device contains ten bits of data ad is made up of two 4-bit latches 147-123 and 147-124 and associated logic 147-125. The mode register 149-12 for the floppy device is identical to mode register 147-12 and thus contains a pair of 4-bit latches 149-121 and 149-122, two 1-bit latches 149-123 and 149-124 and associated logic 149-125 corresponding to logic 147-121 through 147-125, respectively.

Figure 8:
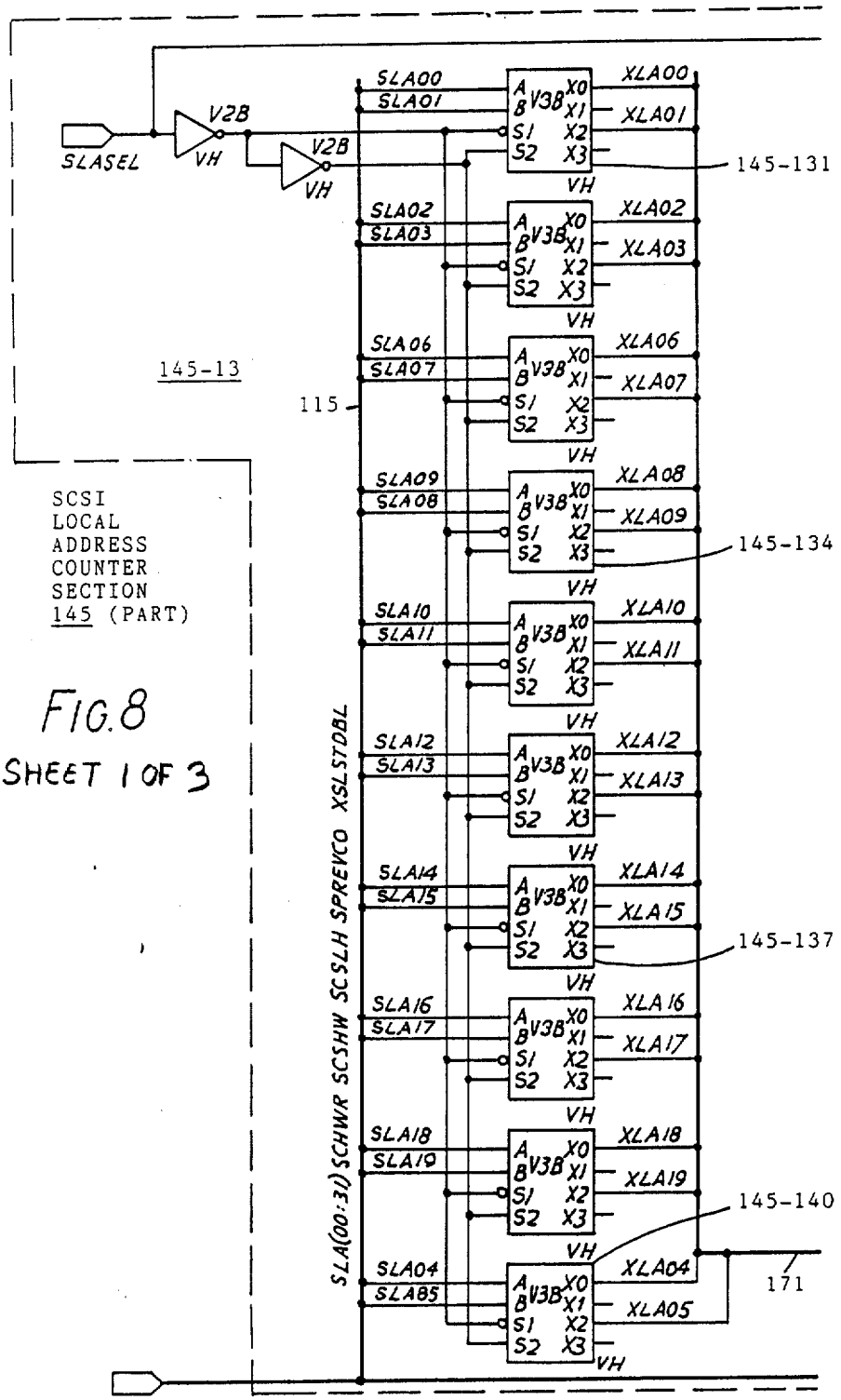
FIG. 8 is a schematic diagram of the details of a portion of the SCSI device local address counter section 145 identified as 145-13 and shown in FIG. 3.
Figure 8:
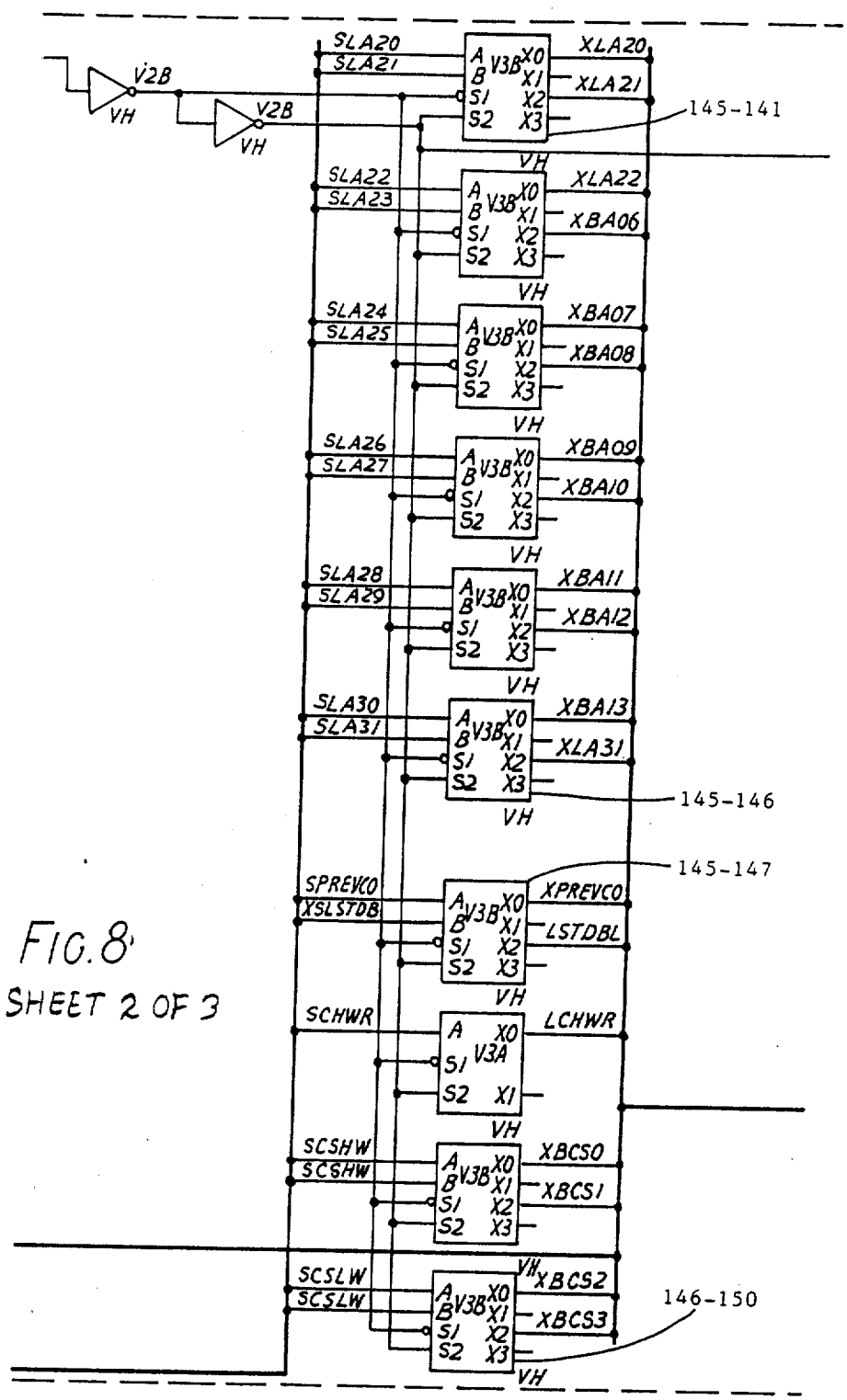

Referring now to FIG. 8, there is shown a schematic diagram of a section of logic corresponding to a portion of the SCSI device local address counter section 145 identified by reference numeral 145-13. Logic 145-13 includes twenty-five transmission gates (also known Dual 1:2 selectors) which are numbered 145-131 through 145-155 and some associated logic (unnumbered but labelled with the Fujitsu unit cell designation). Transmission gates 145-131 through 145-156 receive their inputs from address counters 145-8 (FIG. 4) and transmit these addresses to bus 171 which is a tri-state bus. Bus 171 carries the address information received from transmission gates 145-131 through 145-156, which can be enabled or disabled so that data either passes through or does not pass through, to the output buffers in local I/O section 125.

Figure 9:
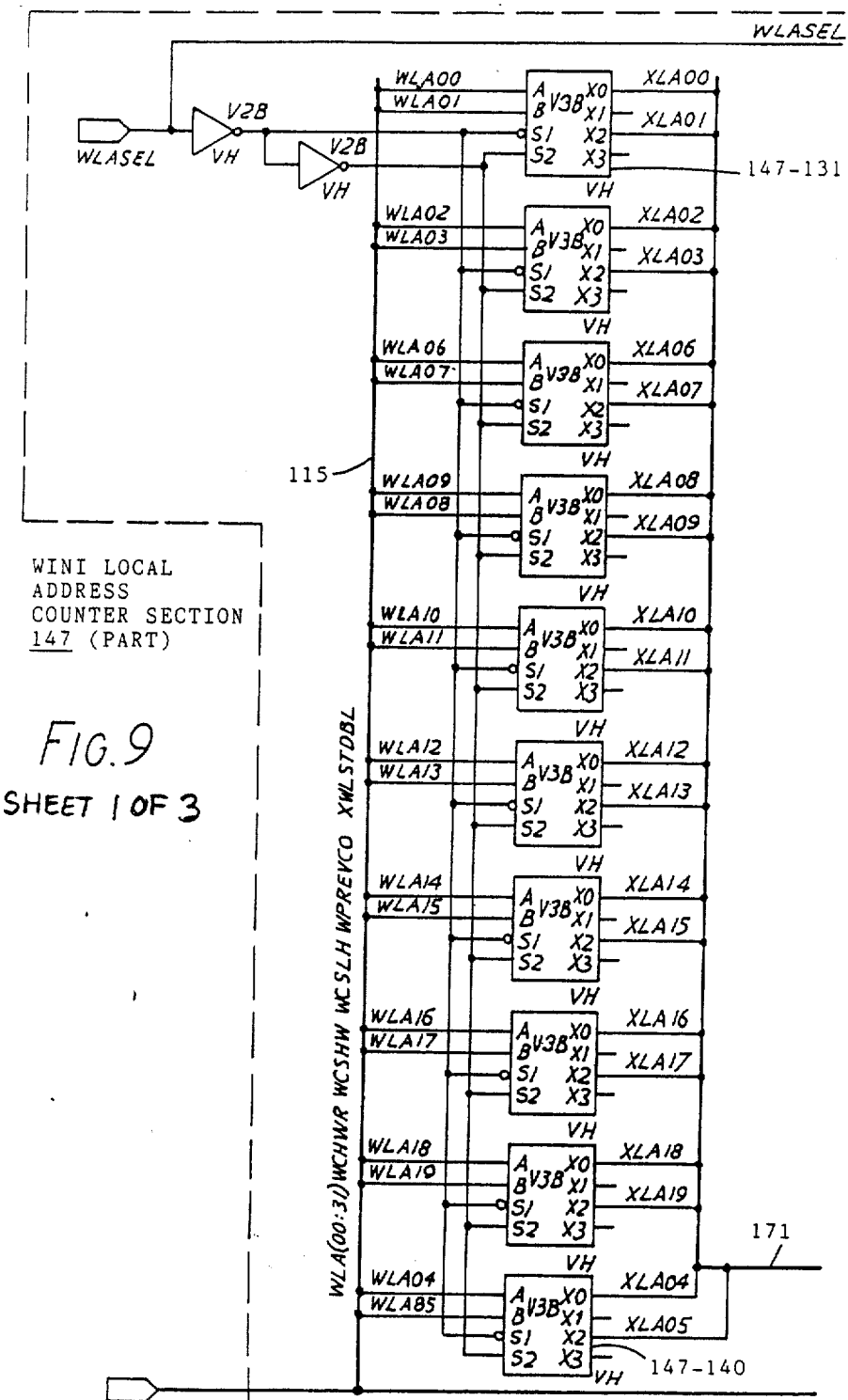
FIG. 9 is a schematic diagram of the details of a portion of the Winchester device local address counter section 147 shown in FIG. 3.
Figure 9:
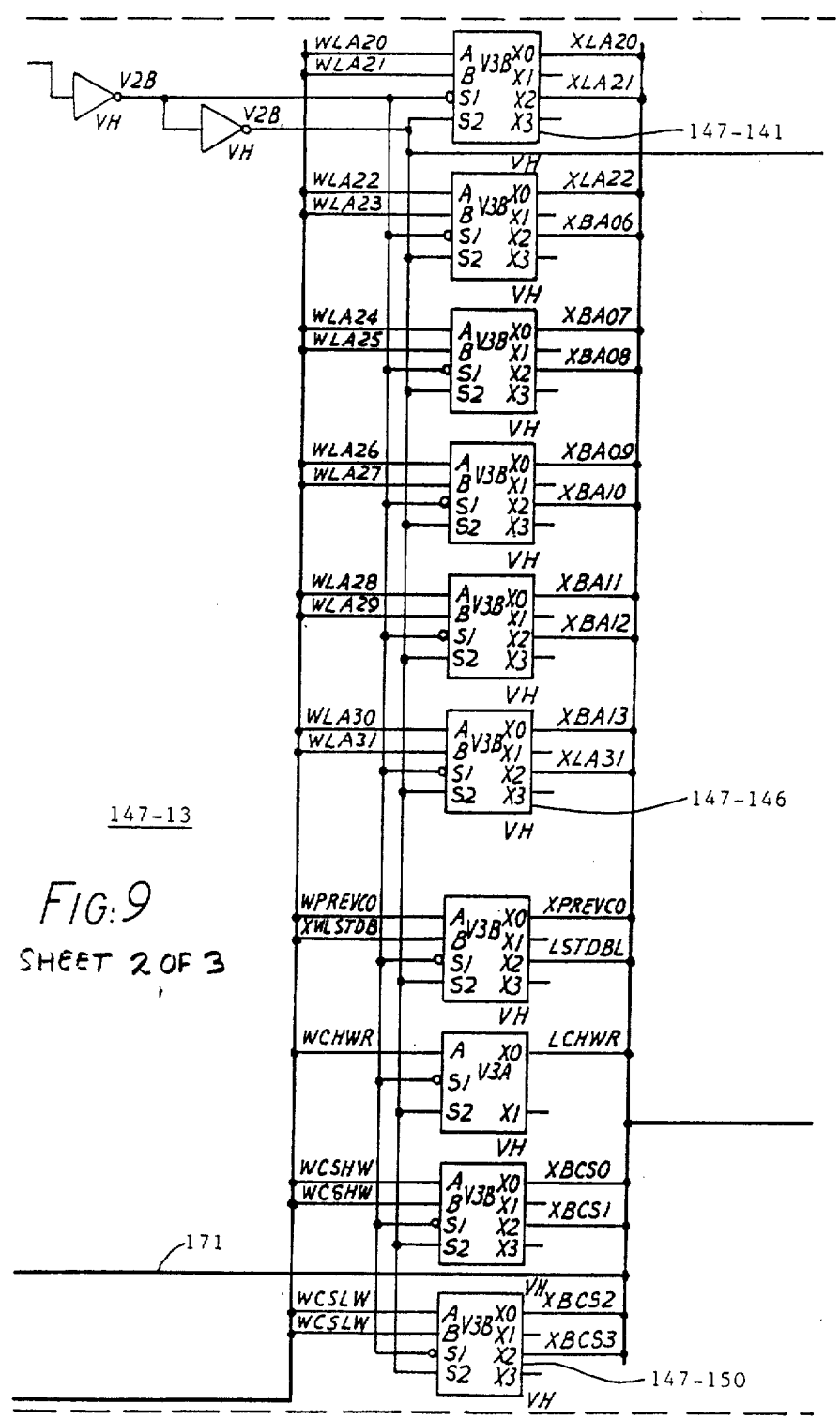
Figure 10:
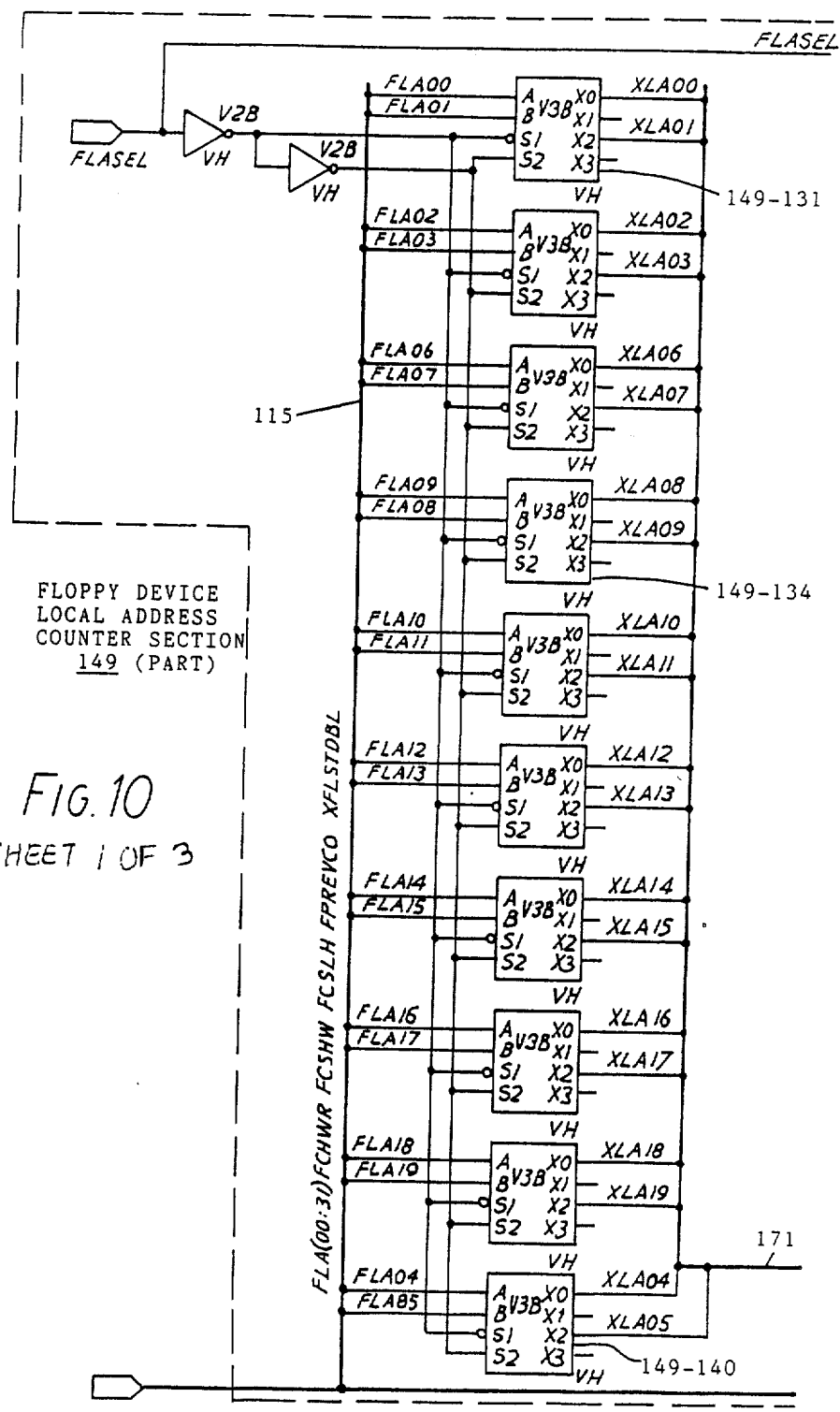
FIG. 10 is a schematic diagram of the details of a portion of the floppy device local address counter section 149 shown in FIG. 3
Figure 10:
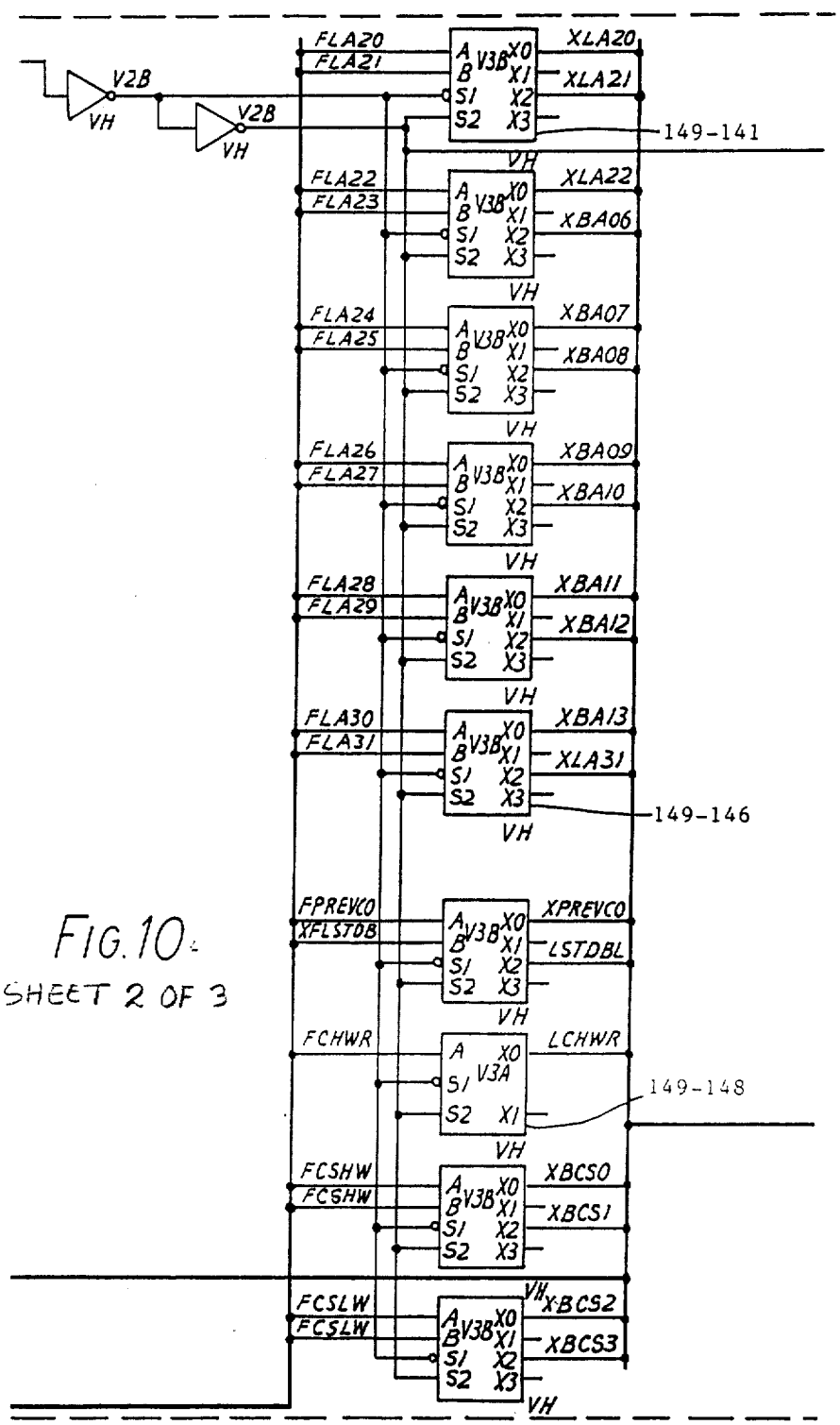

Referring now to FIGS. 9 and 10 there are shown schematic diagrams of sections of logic corresponding portions of the WINI device local address counter section 147 and the floppy device local address counter section 149, respectively, the sections being identified as 147-13 and 149-13, respectively. These sections 147-13 and 149-13 are each functionally and structurally identical to section 145-13, the only difference being that they pertain to the Winchester device and floppy device rather than the SCSI device. In section 147-13 the transmission gates are labelled 147-131 through 147-155 and in section 149-13 the transmission gates are labelled 149-131 through 149-155.

Figure 11:
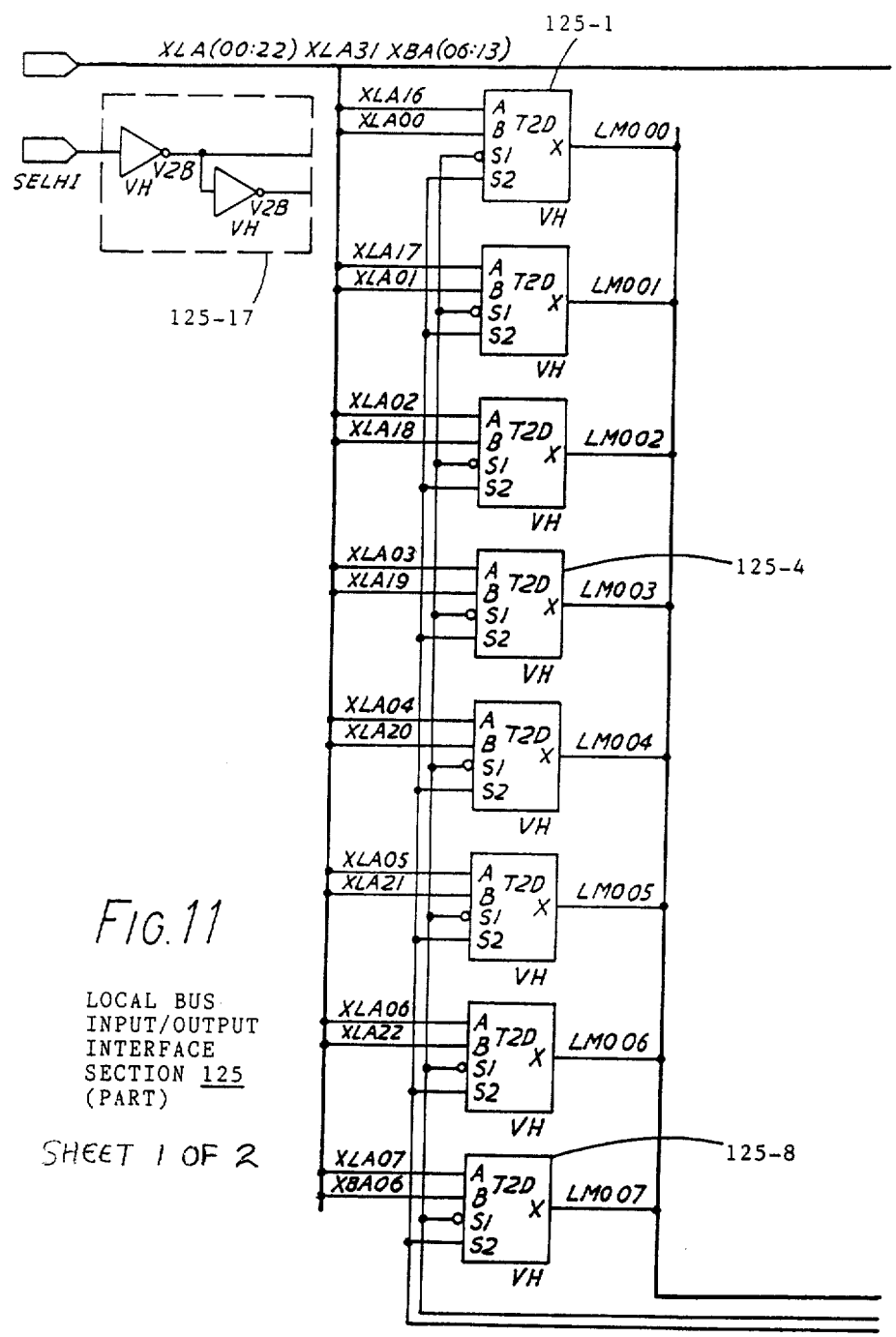
FIG. 11 is a schematic diagram of the details of a portion of the local memory bus input/output interface section 125 shown in FIG. 3.
Figure 11:
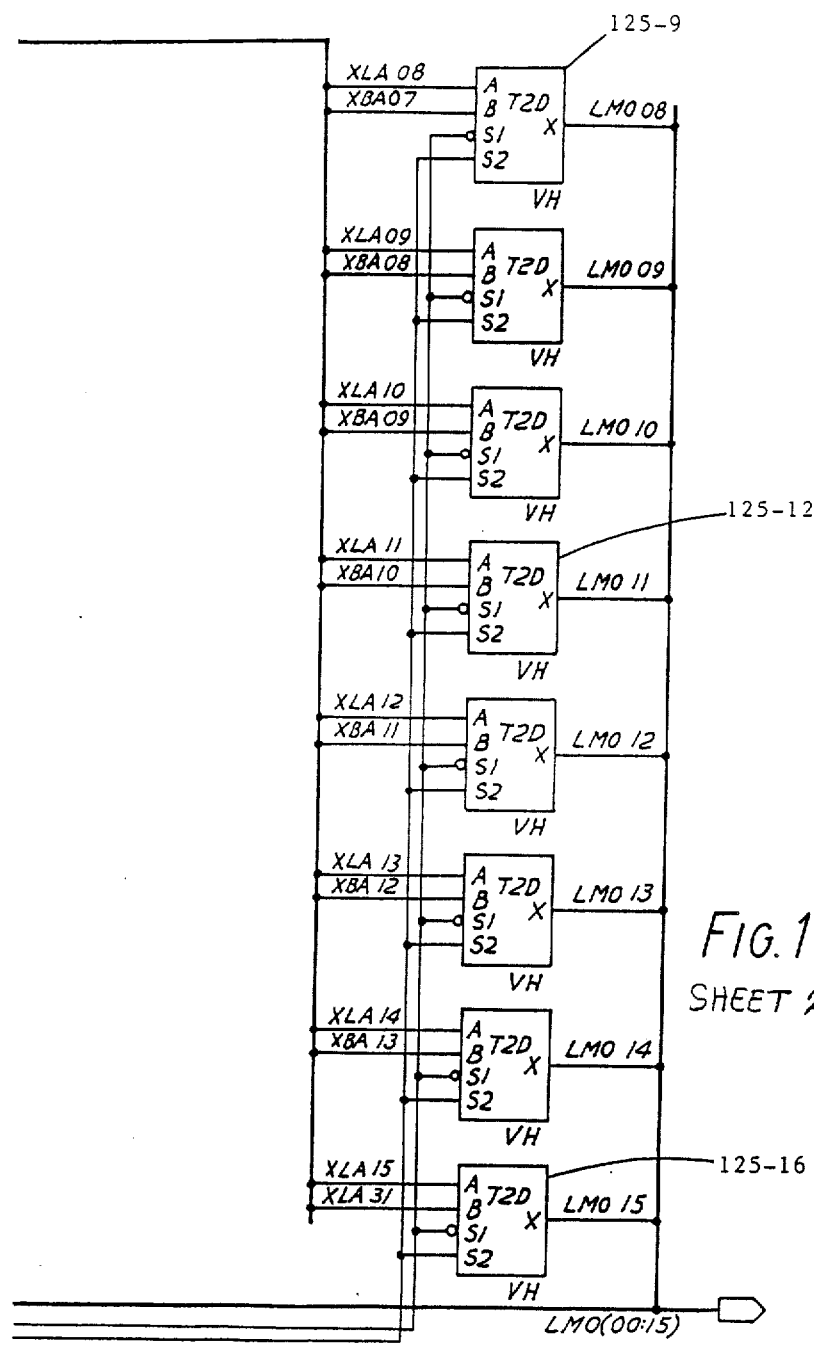

Referring now to FIG. 11 there is shown a schematic diagram of a portion of the local bus I/O interface section 125. The portion of the section shown is essentially a large multiplexor (MUX) that multiplexes 32 bits of information down to 16 bits of information. The portion includes sixteen 2-bit-to 1-bit multiplexors which are labelled 125-1 through 125-16. Each multiplexor (i.e. the Fujitsu unit cell representation of a multiplexor) has a pair of data inputs labelled A and B, a pair of select inputs labelled S1 and S2 and an x output. The multiplexor will invert and transmit either the A input or the B input. Also shown is some associated logic 125-17.

Referring back to FIG. 3, there is a bus numbered 171 and labelled local bus address output. This is the internal gate array bus. It is a tri-state bus which is driven by any one of blocks 145, 147, 149 and 167 which are all registers and/or counters. It is driven only when an address is being driven out of the gate array 51 to local bus 37. There is a bus numbered 173 and labelled local bus address input bus. Bus 173 is connected only to blocks 125 and 169. Bus 173 is connected only to blocks 125 and 169. Bus 173 is driven only when the host CPU 33 is attempting to access buffer RAM 47 through either a Read-X or a Write-X instruction.

There is a block numbered 167 which is labelled LB-BADDR and which is the local bus buffer address register. This register, which is a temporary storage holds the address to be used to access the buffer RAM 47 (see FIG. 2) when data is being transferred from local bus 37 to buffer RAM 47 or from buffer RAM 47 to local bus 37.

There is a block numbered 169, which is labelled RW-BADDR and which is the Read-X, Write-X Buffer Address register section. This section holds a specific local bus address and allows the host CPU 33 to access the buffer RAM 47 which is controlled by a gate array 51. This block contains an address register that holds the address that CPU 33 wants to access in the buffer RAM 47.

Figure 12:
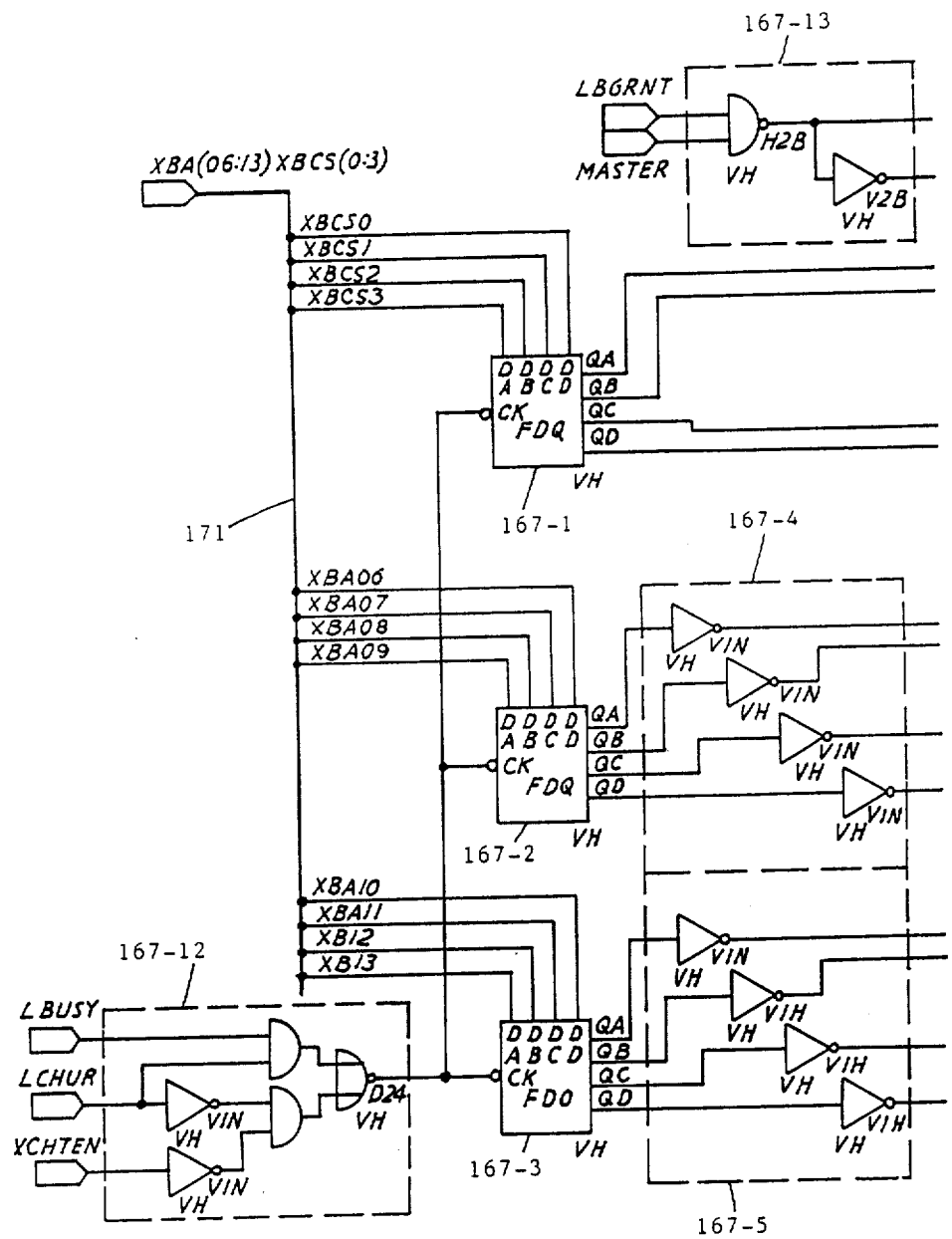
FIG. 12 is a schematic diagram of the details of a portion of the local bus buffer address register section 167 shown in FIG. 3.
Figure 12:
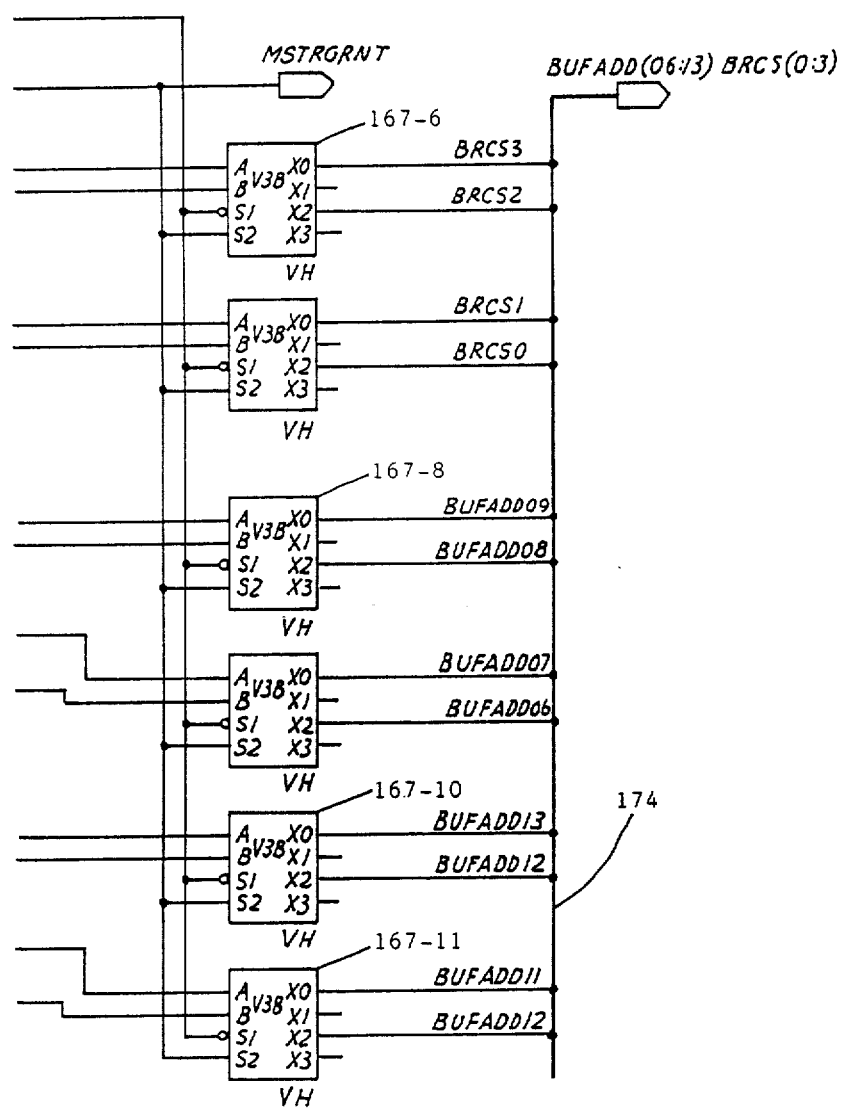

Referring now ahead to FIG. 12, there is illustrated a schematic diagram of the details of local bus buffer address register section 167. This section includes (the Fujitsu unit cell representation of) three 4-bit registers 167-1, 167-2 and 167-3, two set of inverters labelled 167-4 and 167-5, a set of six transmission gates (i.e. dual 1:2 selectors) 167-6 through 167-11, associated logic collectively identified as 167-12 and associated logic collectively identified as 167-13. The 4-bit registers 167-1 through 167-3 are essentially a pipeline mechanism for an address. They receive inputs from bus 171 and hold them for use one cycle later for an address. The outputs of registers 167-2 and 167-3 are passed through inverters 167-4 and 167-5, respectively, to transmission gate 167-8 through 167-11. When these gates are enabled their outputs are passed to buffer RAM address output bus 174 where they are transmitted to buffer RAM I/O interface section 127. The output of register 167-1 passes to transmission gates 167-6 and 167-7 which, when enabled, send the signals to bus 174 for subsequent transmission to buffer RAM I/O interface section 127. Associated logic 167-12 functions as a selector to determine when registers 167-1 through 167-3 should be clocked. Logic 167-13 tells registers 167-7 through 167-11 whether or not they should be turned on.

Figure 13:
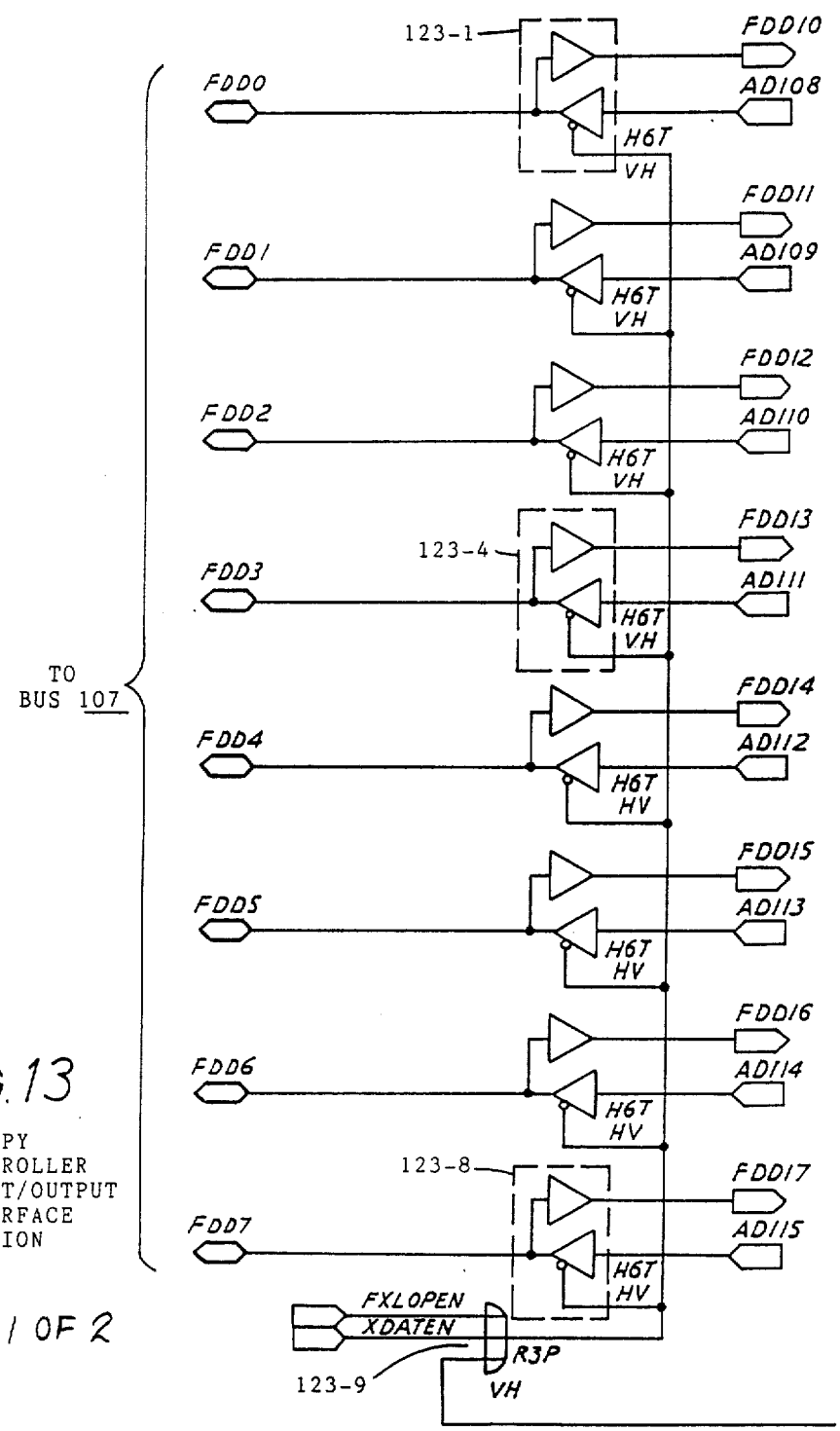
FIG. 13 is a schematic diagram of the details of a portion of the floppy input/output interface section 123 shown in FIG. 3.
Figure 13:
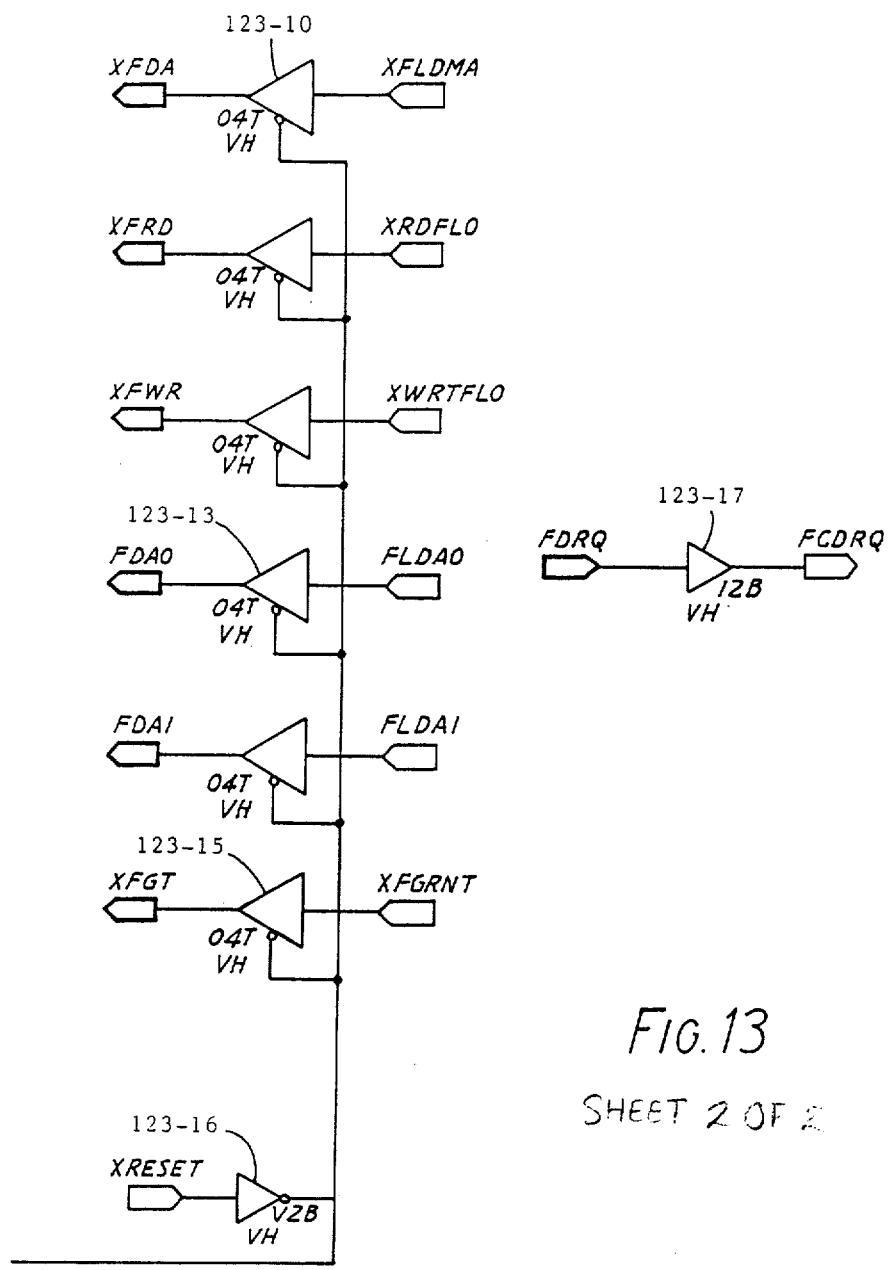

Referring now to FIG. 13, there is shown a schematic diagram of the details of the floppy controller input/output interface section 123. The section includes a set of input/out transceiver cells (tri-State Output and Input Buffers as per Fujitsu terminology) labelled 123-1 through 123-8, an OR gate 123-9, a set of six output drivers 123-10 through 123-15, an inverter 123-16 and an input buffer 123-17. Transceiver cells 123-1 through 123-8 are the input/output buffers for floppy controller 41 and thus serve to transmit data into and out of gate array 51 to floppy controller 41. Specifically, these cells 123-1 through 123-8 connect the floppy controller data bus to the gate array data input bus which is labelled FDDIO through FDDI7. Transceiver cells 123-1 through 123-8 also receive inputs from the 80186 input bus 115 (i.e. through connectors labelled ADIO8 through ADIO15). These signals are transferred to the floppy data bus 107 when a "write data" is being performed. OR gate 123-9 receives three signals labelled XRESSET, XFLOPEN and XDATEN. These three signals determine whether a read or a write is being performed and enable or disable the output drivers accordingly. Drivers 123-10 through 123-15 are output drivers which take signals from within gate array 51 and drive them to output pins on gate arrray 51. The output of inverter 123-16 drives one input to the set of driver cells 123-10 through 123-15 which has the effect of either turning these driver cells on or off. Input buffer 123-17 receives a floppy data request signals from FLOPPY controller 41, buffers it and then brings it into gate array 51.

Figure 14:
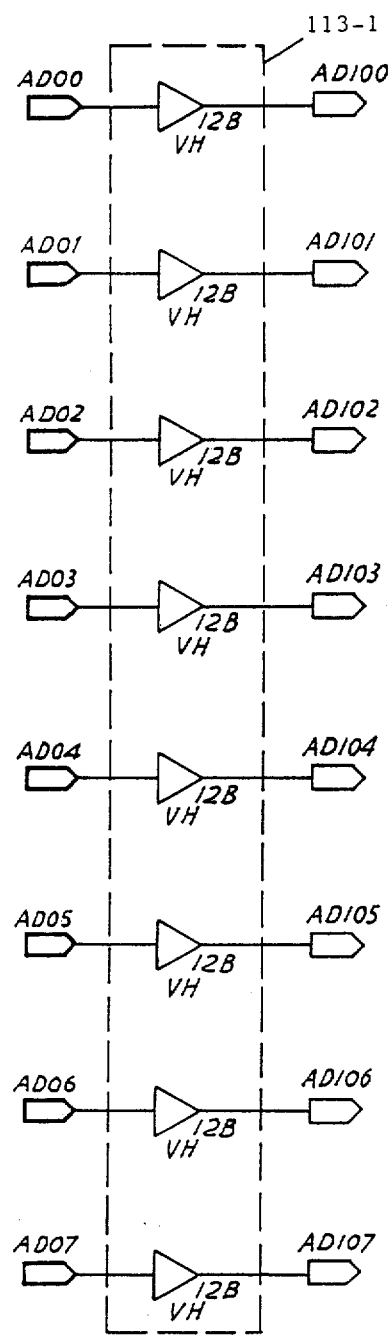
FIG. 14 is a schematic diagram of the details of a portion of the microprocessor input/output interface section shown in FIG. 3.
Figure 14:
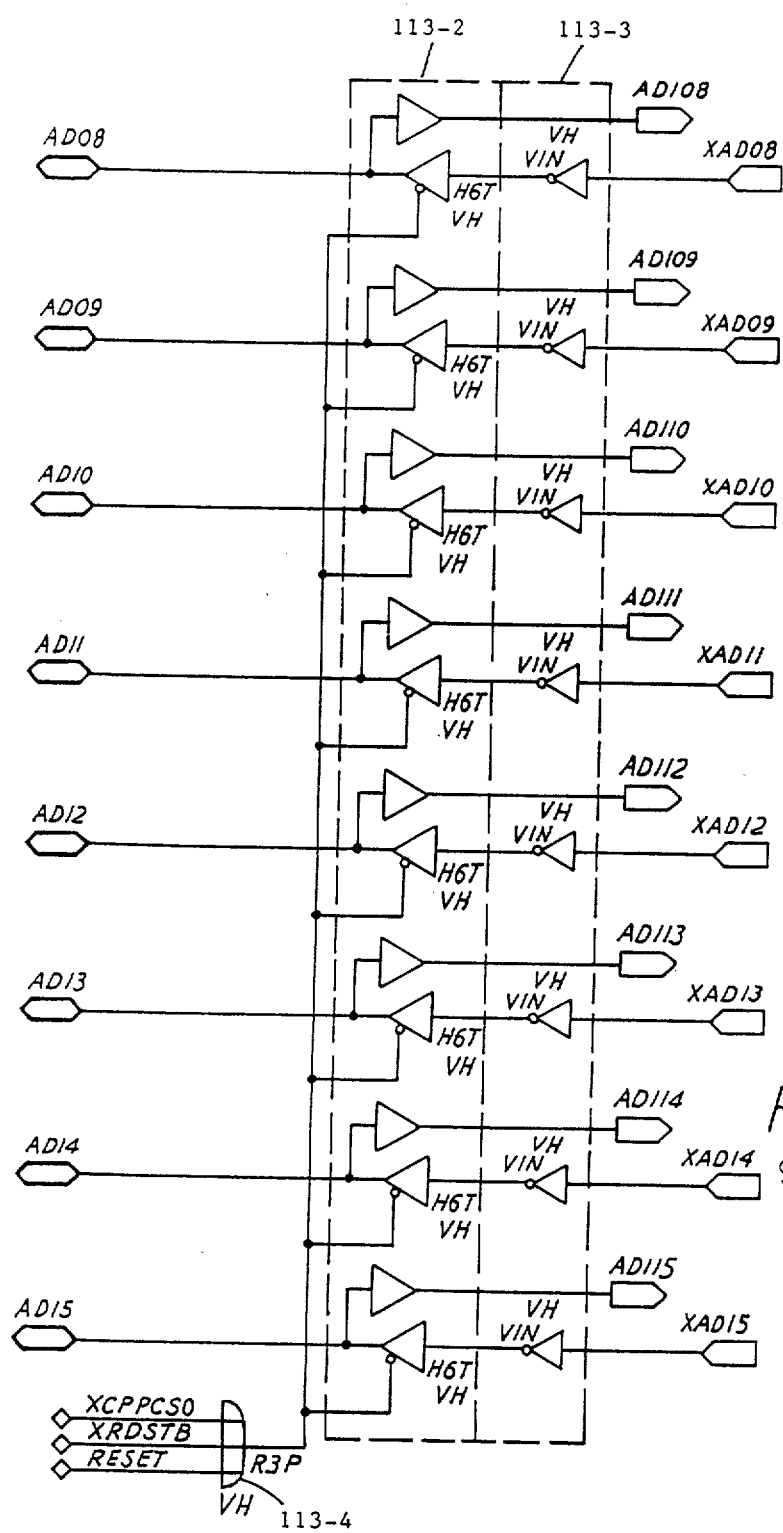
Figure 14:
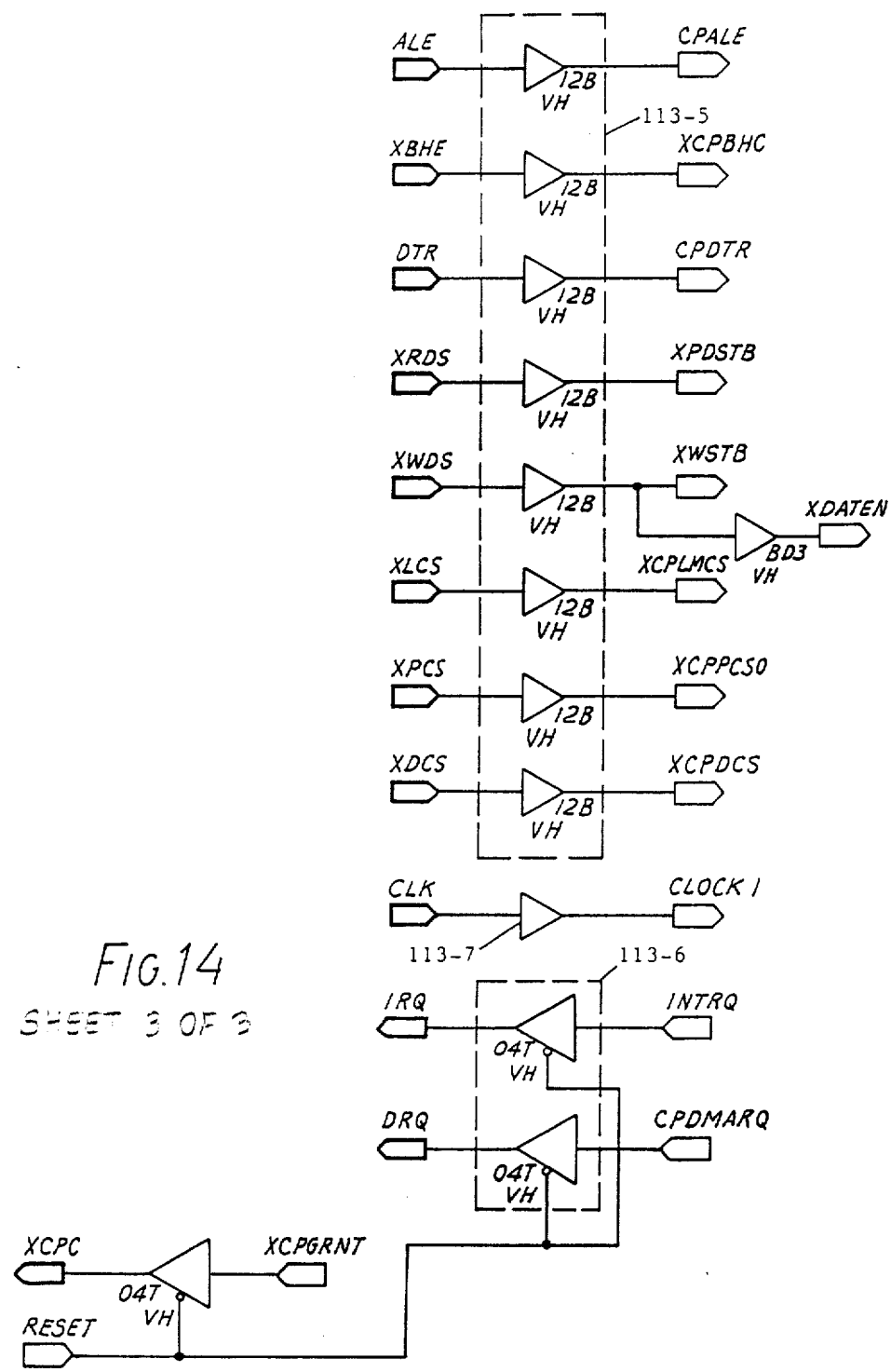

Referring now to FIG. 14, there is illustrated a schematic diagram showing the details of the 80186 microprocessor input/output interface section 113. This section includes a set of eight input buffers collectively labelled 113-1, a set of eight bi-directional input/output buffers collectively labelled 113-2, a set of eight inverters collectively labelled 113-3, an OR gate 113-4, a set of eight buffers, collectively labelled 113-5, a pair of output buffers 113-6 and a clock buffer 113-7. Buffers 113-1 are input buffers. They take pin signals from pins AD00 through AD07 and transfer them to the inside circuitry of gate array 51. Buffers 113-2 are bi-directional input/output buffers. In the input direction, these buffers are used for the same purpose as buffers 113-1. In the output direction they take signals from within gate array 51, buffer them and then send them to their corresponding output pins. The eight buffers 113-2 all connect to the low byte of the 80186 address and data bus 101. The only time buffers 113-2 are turned on is when microprocessosr 49 is accessing internal paths of gate array 51. The signals to and from buffers 113-2 are inverted by inverters 113-3. OR gate 113-4 enables the output buffers 113-2 when instructed to do so by microprocesser 49. Buffers 113-5 are used to buffer the control signals from microprocessor 49 so that they can be used internal to gate array 51. Output buffers 113-6 take two internal signals INTRQ and CPDMARQ and drive them external to gate array 51. Buffer 113-7 is used to buffer the 8 MHZ clock signal.

Figure 15:
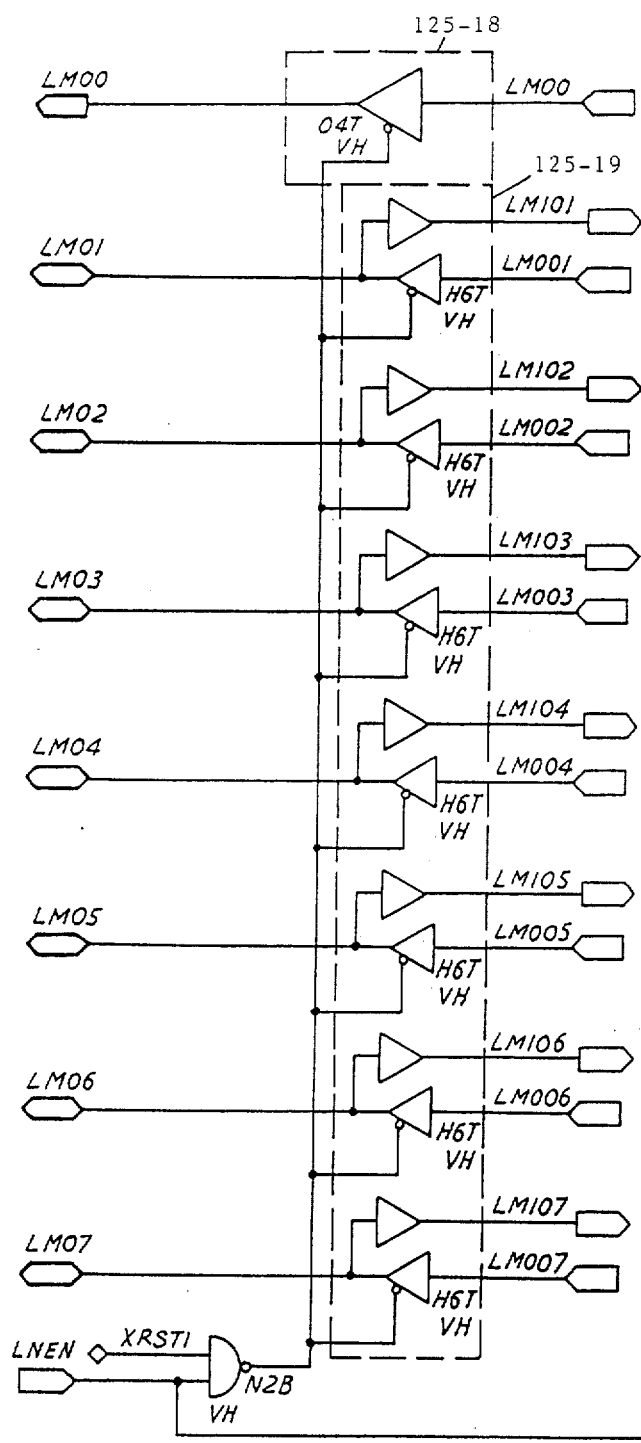
FIG. 15 is a schematic diagram of the details of a portion of the local memory bus input/output interface section 125 shown in FIG. 3.
Figure 15:
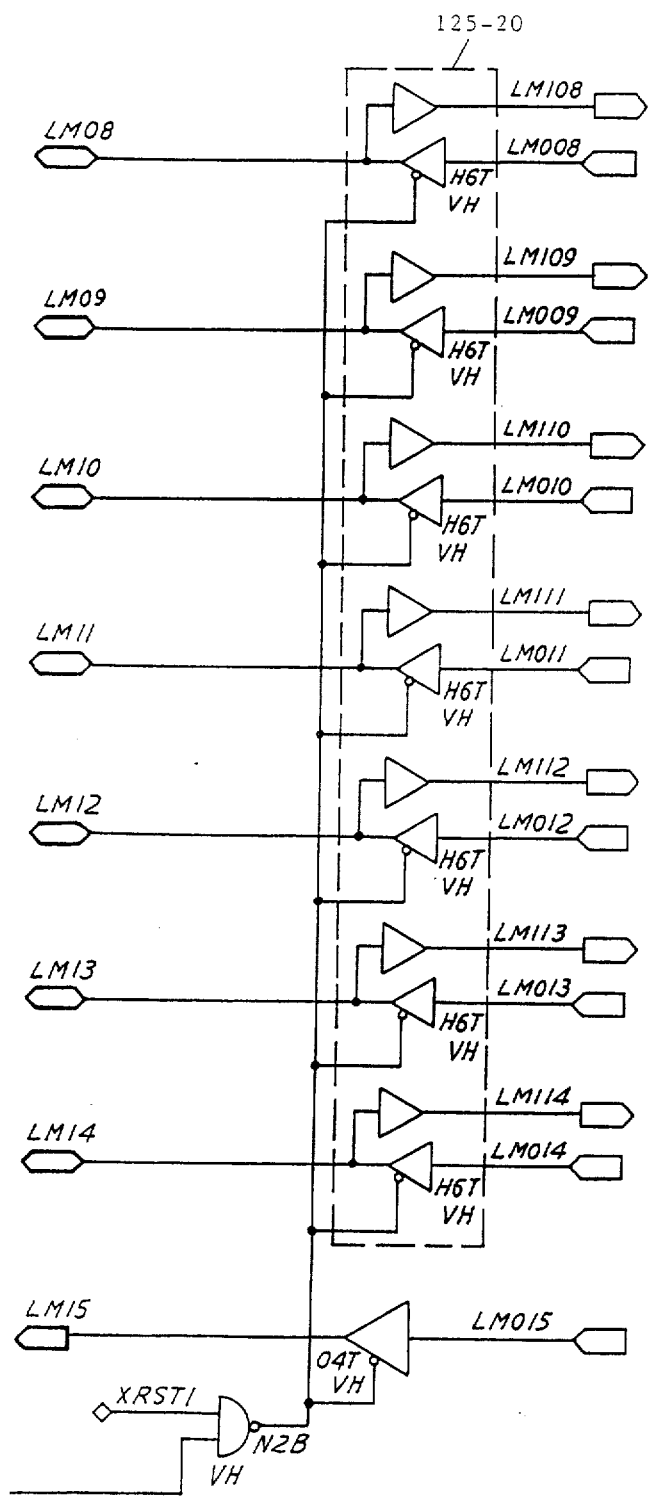
Figure 15:
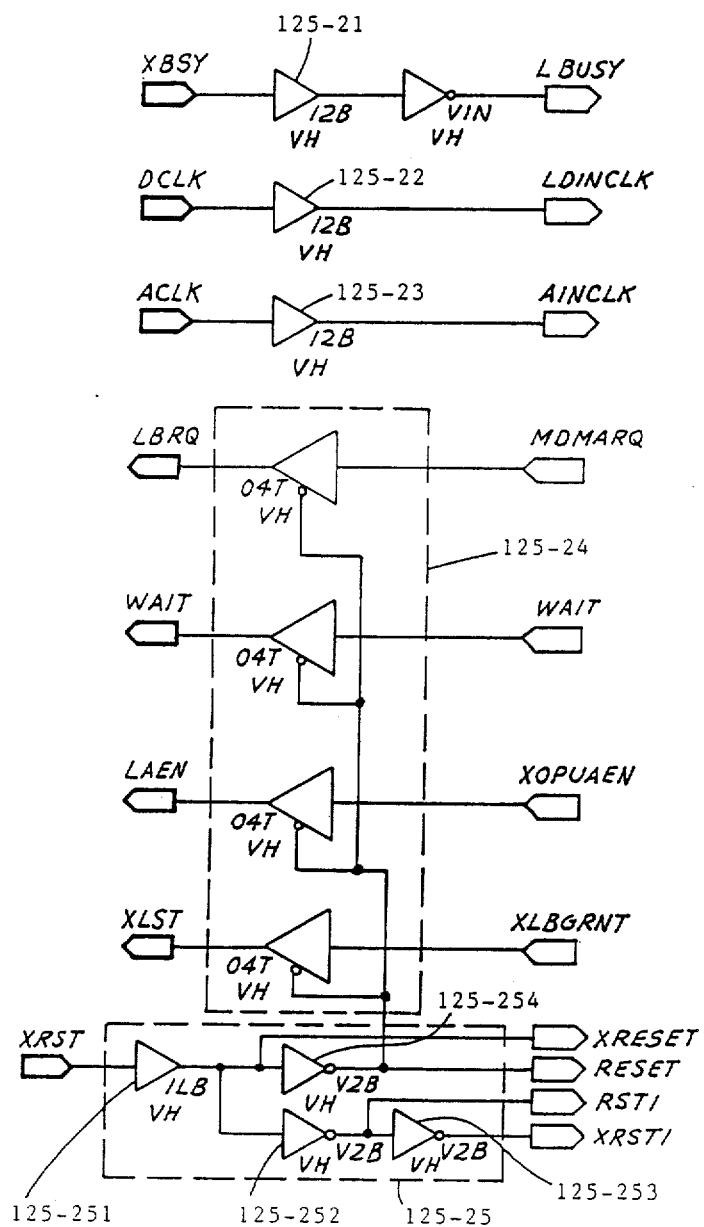

Referring now to FIG. 15 there is illustrated a schematic diagram of the details of another portion of the local memory bus input/out interface section 125. This section includes an output buffer 125-18, a first set of seven bi-directional input/output buffers, labelled collectively 125-19, a second set of seven bi-directional input/output buffers, labelled collectively 125-20, three input buffers labelled 125-21, 125-22 and 125-23, a set of four control signals buffers, labelled collectively 125-24, a system reset buffering system 125-25 and a pair of power 2-input NAND gates 125-26 and 125-27. Input/output buffers 125-19 are used as buffers for the high byte of the local memory bus address while input/output buffers 125-20 are used as buffers for the low byte of the local memory bus address. The system reset buffering system 125-25 is made up of an input clock buffer 125-251 and three inverters 125-252, 125-253 and 125-254. NAND gates 125-26 and 125-27 control the output buffers during reset or during cycles when an address is being read in.

Figure 16:
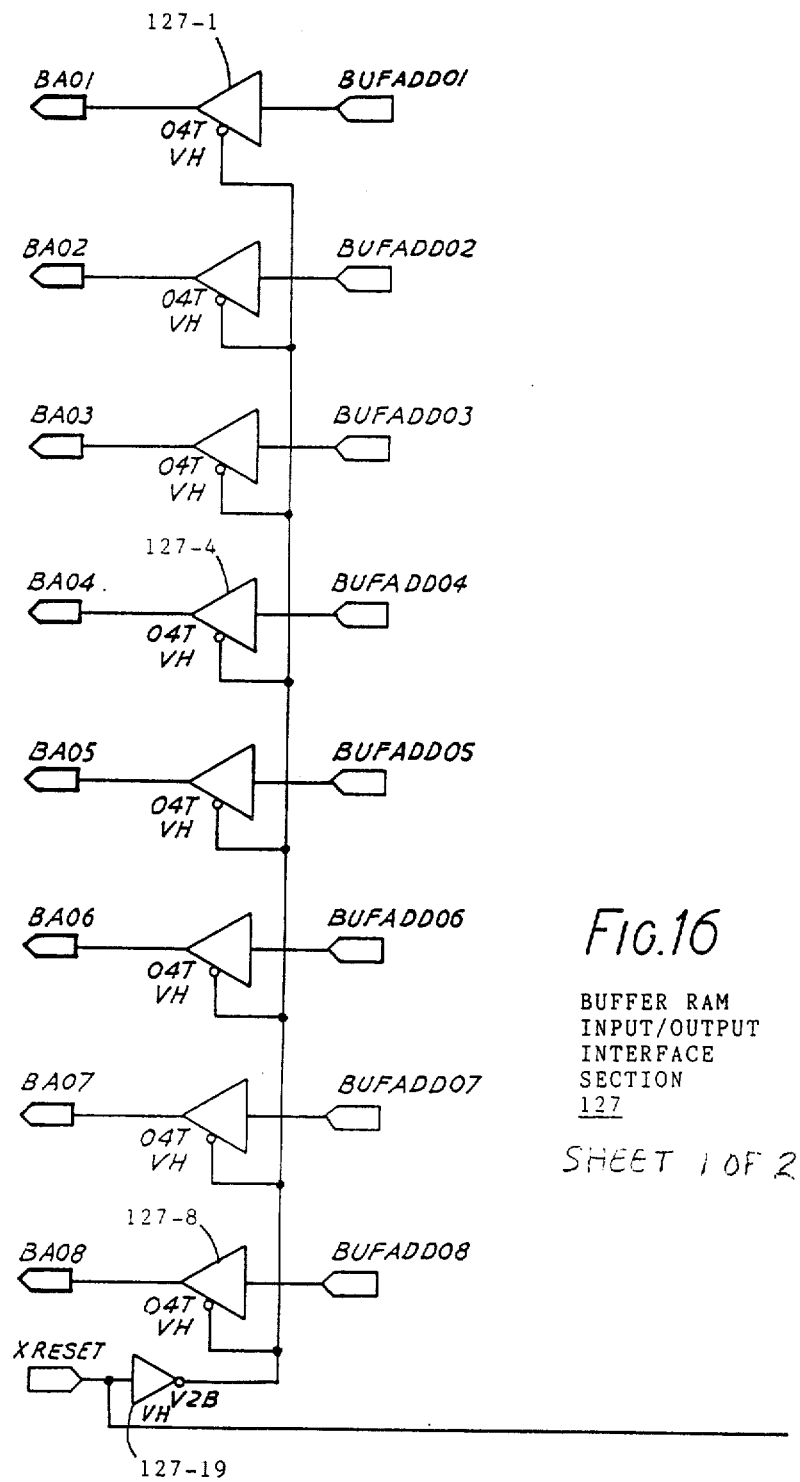
FIG. 16 is a schematic diagram of the details of a portion of the buffer RAM input/output interface section 127 shown in FIG. 3.
Figure 16:
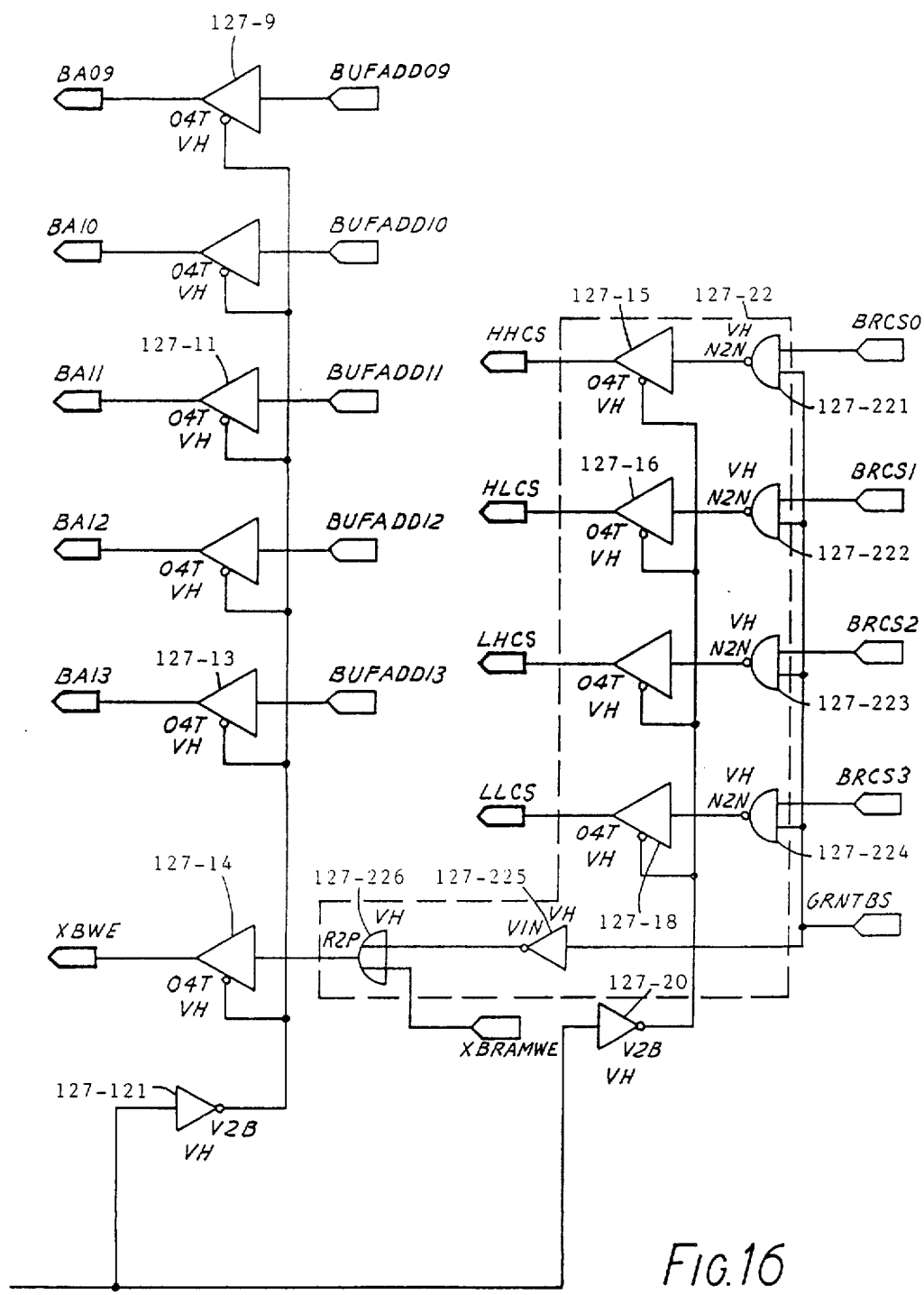

Referring now to FIG. 16 there is illustrated a schematic diagram of the details of the buffer RAM input/output interface section 127. This section includes a set of eighteen output buffers 127-1 through 127-18, three inverters labelled 127-19, 127-20 and 127-21, a logic section 127-22 which contains four 2-input NAND gates 127-221 through 127-224, an inverter 127-225 and a 2-input OR gate 127-226. The output buffers 127-1 through 127-18 are disabled during reset by the gates 127-19, 127-20 and 127-21 which are actually power inverters.

Figure 17:
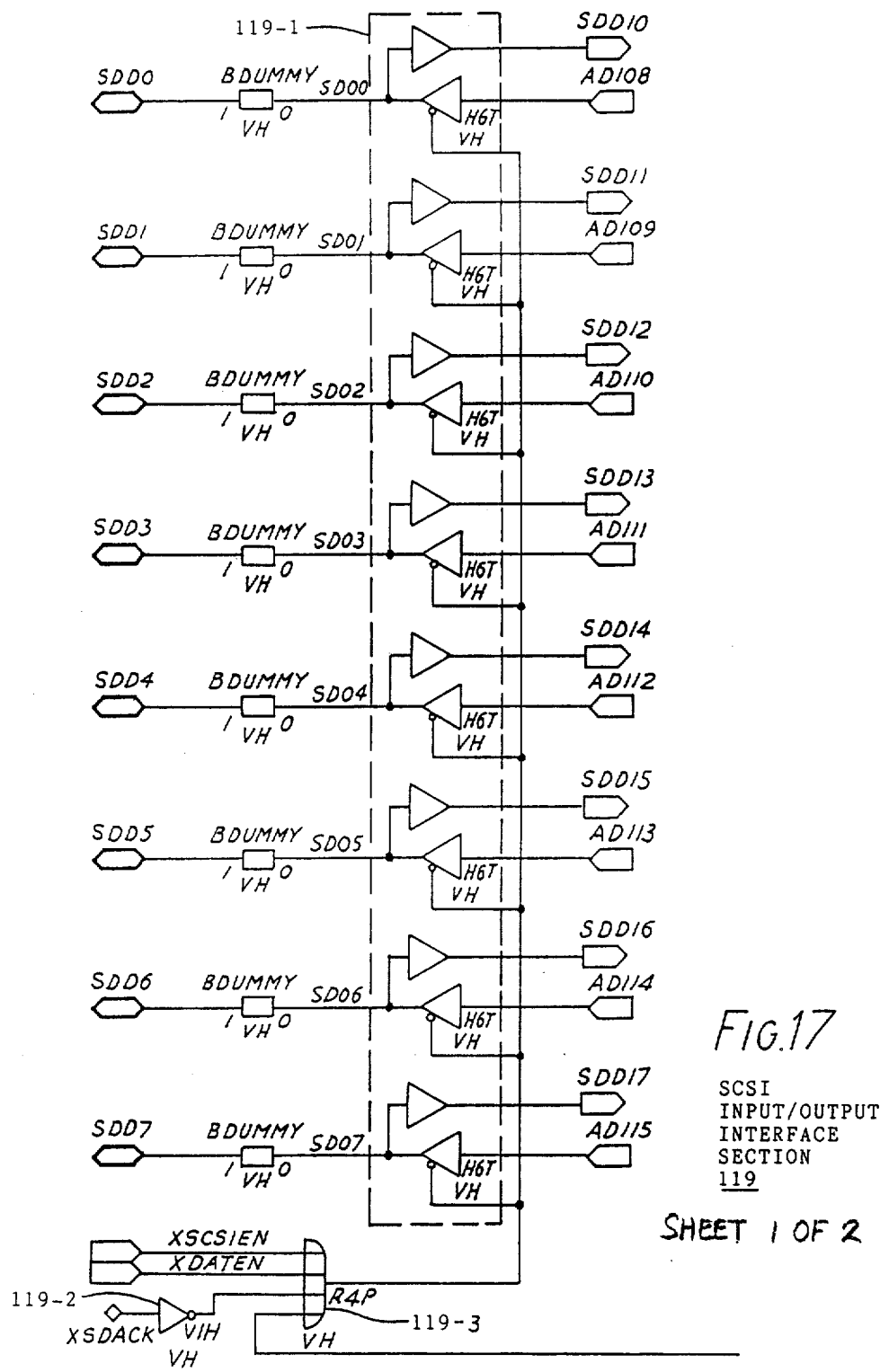
FIG. 17 is a schematic diagram of the details of the SCSI input/output interface section 119 shown in FIG. 3.
Figure 17:
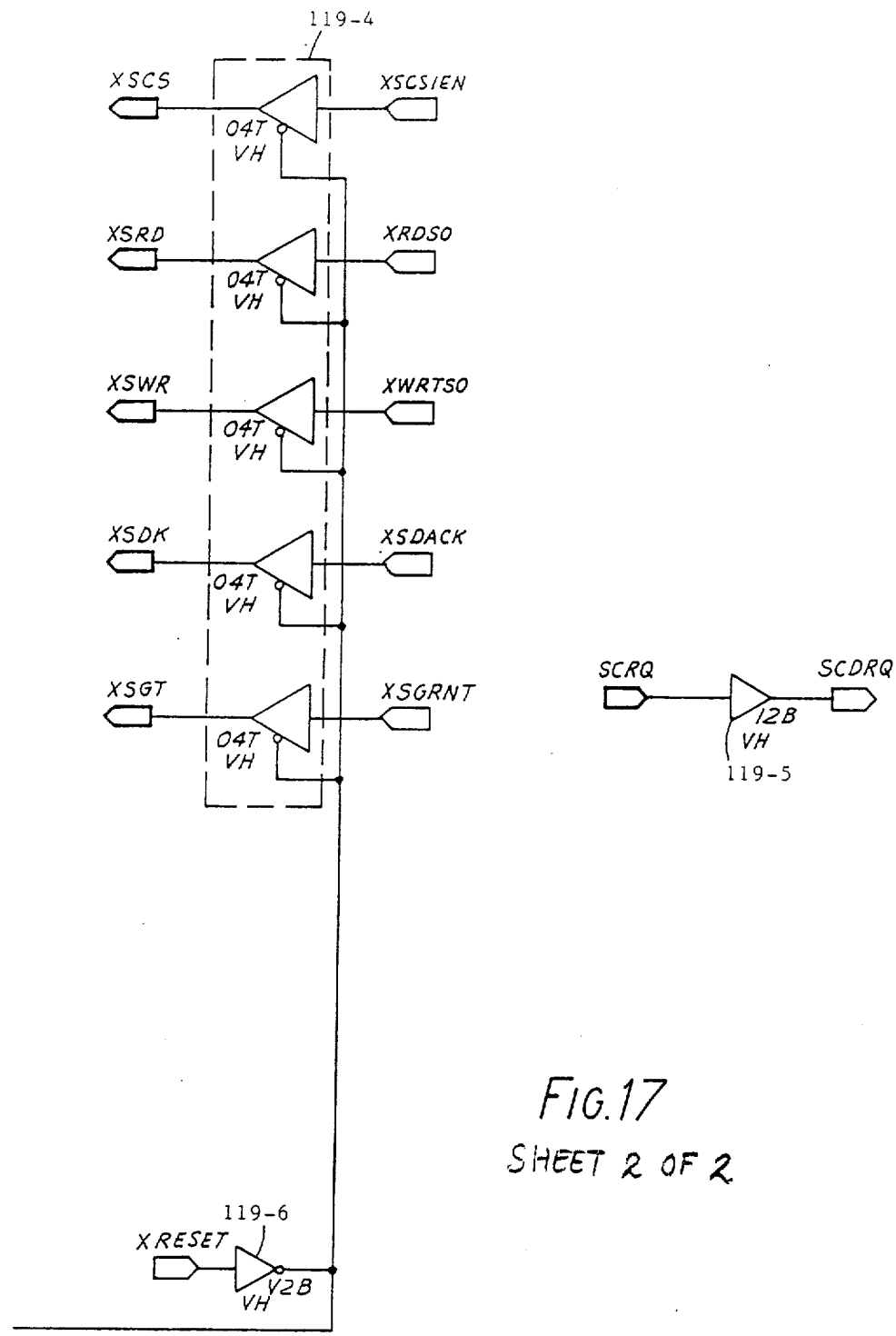

Referring now to FIG. 17, there is illustrated a schematic diagram of the details of the SCSI bus input/output interface section 119. This section includes a set of eight input/output buffers, collectively labelled 119-1, an inverter 119-2, a 4-input OR gate 119-3, a set of five output buffers, collectively labelled 119-4, an input buffer 119-5 and an inverter 119-6. Input/output buffers 119-1 function as a transceiver. They take inputs from pins SDDO through SDD7 and buffer them so that they can be used by internal logic and does the reverse of data to be transferred out of gate array 51 to the SCSI controller 43. Buffers 119-1 are enabled or disabled by OR gate 119-3. Output buffers 119-4 take internal control signals and drive them to the SCSI controller 43. Input buffer 119-5 takes the SCSI DMA request signal and buffers it so that it can be used internally. Inverter 119-6 takes the reset signal and buffers it to disable output buffers 119-4 during reset.

Figure 18:
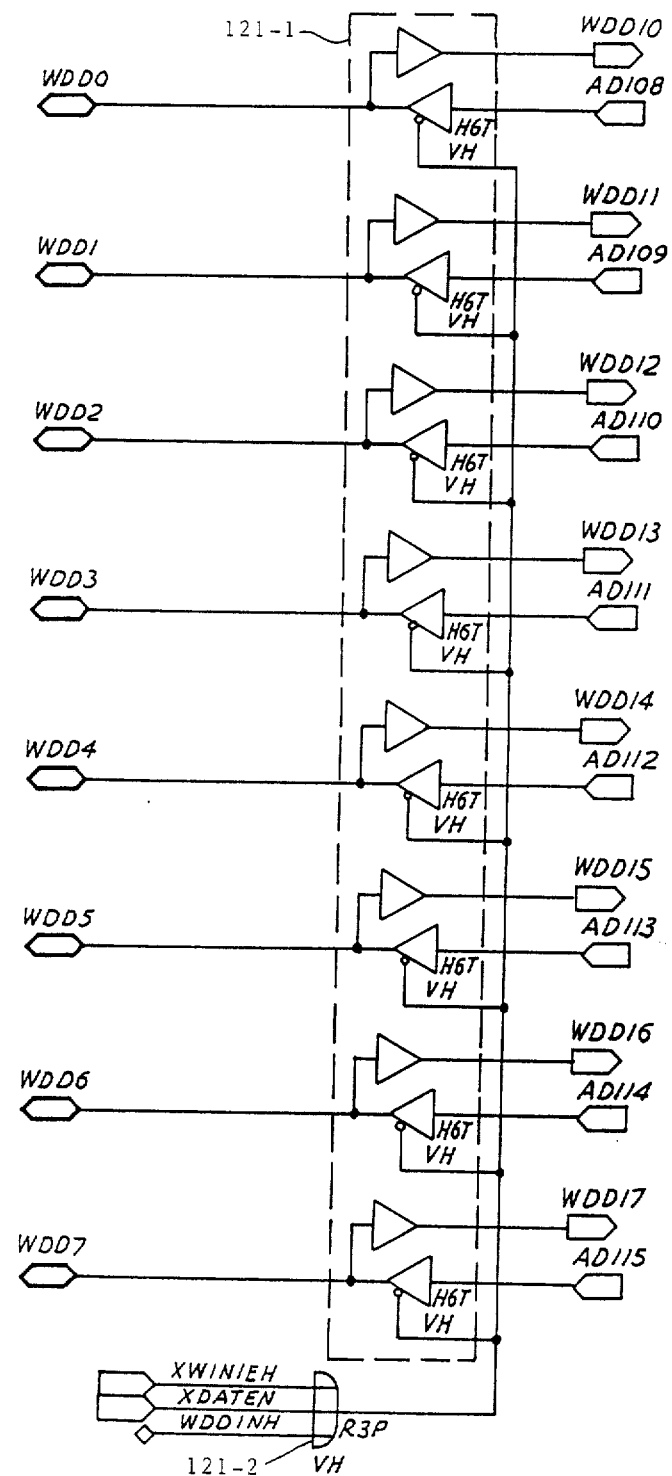
FIG. 18 is a schematic diagram of the details of the Winchester input/output interface section 121 shown as in FIG. 3.
Figure 18:
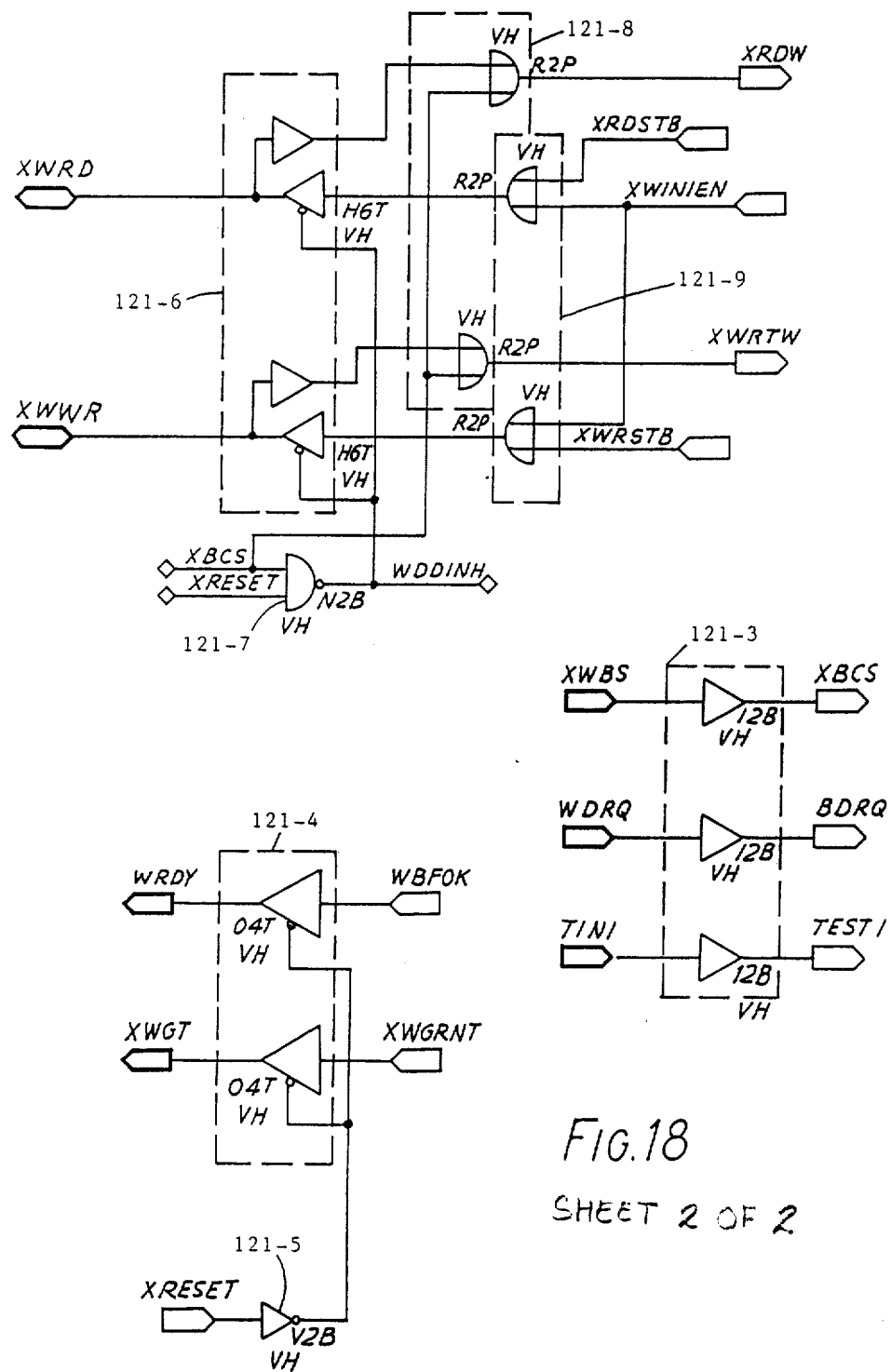

Referring now to FIG. 18, there illustrated a schematic diagram of the details of the WINCHESTER device input/output interface section 121. This section includes a set of eight input/output buffers, collectively labelled 121-1, a 3-input OR gate 121-2, a set of three input buffers 121-3, a set of two output buffers 121-4, a buffer (inverter) 121-5 a set of two input/output buffers, collectively labelled 121-6, a 2-input NAND gate 121-7, a pair of 2-input OR gates, collectively labelled 121-8, and a pair of 2-input OR gates 121-9.

Input/output buffers 121-1 buffer the data coming in at the data bus pins WDD0 through WDD7, which are the pins that are connected to the WINCHESTER controller 45. These buffers buffer the data so that it can be used internally by gate array 51. OR gate 121-2 enables or disables the input/output buffers 121-1 when data accesses are being conducted to the WINCHESTER controller 45. Input buffers 121-3 take control signals from WINI controller 45 and buffer them to be used internally by gate array 51. Output buffers 121-4 take internally generated control signals and drive them to the WINCHESTER controller 45 for use by that controller. Buffer (inverter) 121-5 takes a reset signal XRESET and drives it to the enable of output buffers 121-4. Input/output buffers 121-6 take read strobe and write strobe signals from the WINCHESTER controller 45 and buffers them. These buffers also take internally generated read and write strobe signals and drive them out to the WINCHESTER controller 45. NAND gate 121-7 disables buffers 121-6 at the proper time (i.e. when a direct memory access is not in progress). OR gates 121-8 buffer the read and write strobe signals for the buffers 121-6. OR gates 121-9 generate the read and write strobe signals that gate array 51 drives to contoller 45. These gates act as an enable so that the input signals to buffer 121-6 are only transferred during a WINCHESTER controller 45 direct memory access.

FIGS. 19, 20, 21, and 22 are all schematic diagrams of the details of the local bus control section 157.

Figure 19:
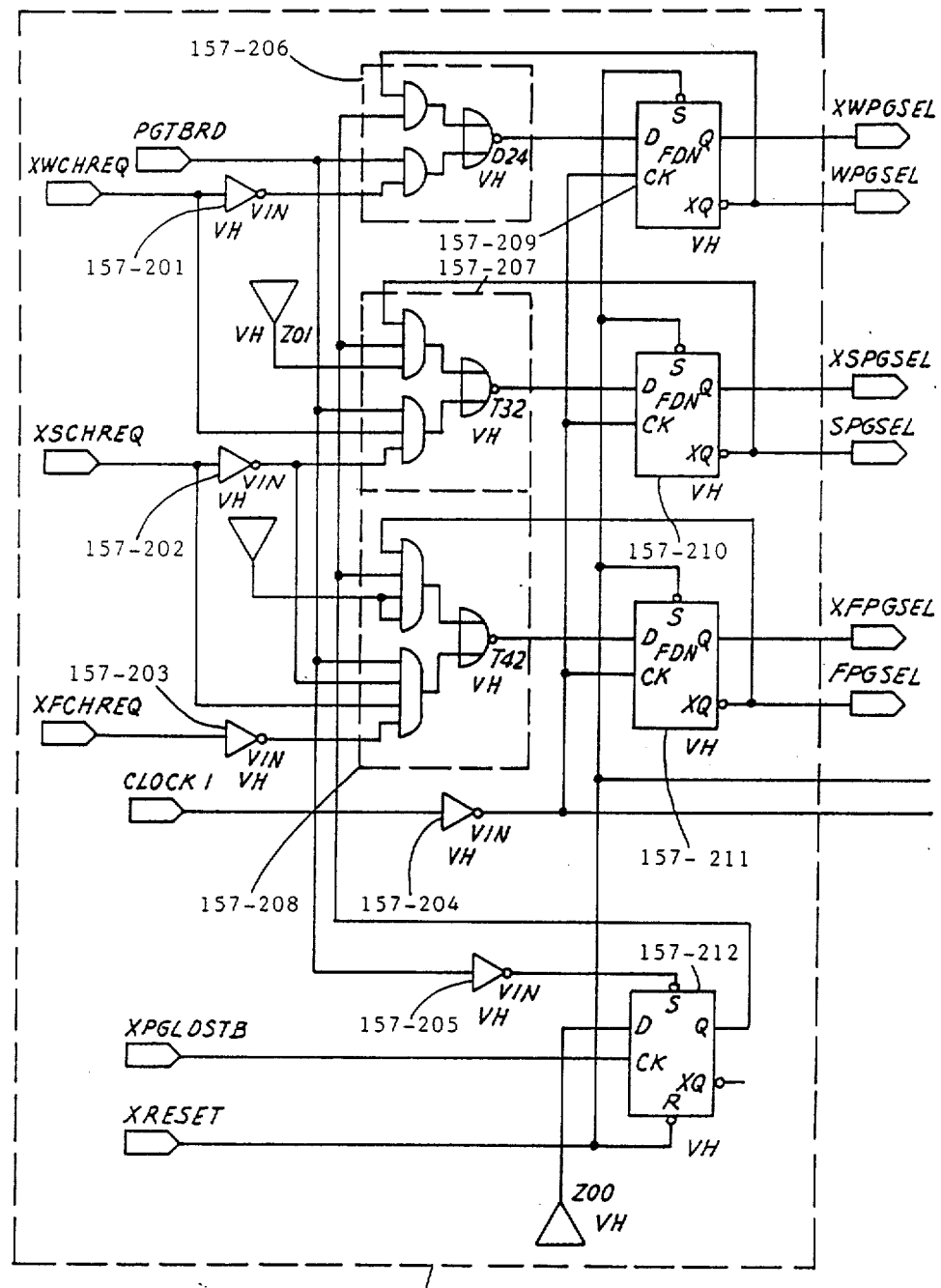
FIG. 19 is a schematic diagram of the details of a portion of the local bus control section 157 as shown in FIG. 3.
Figure 19:
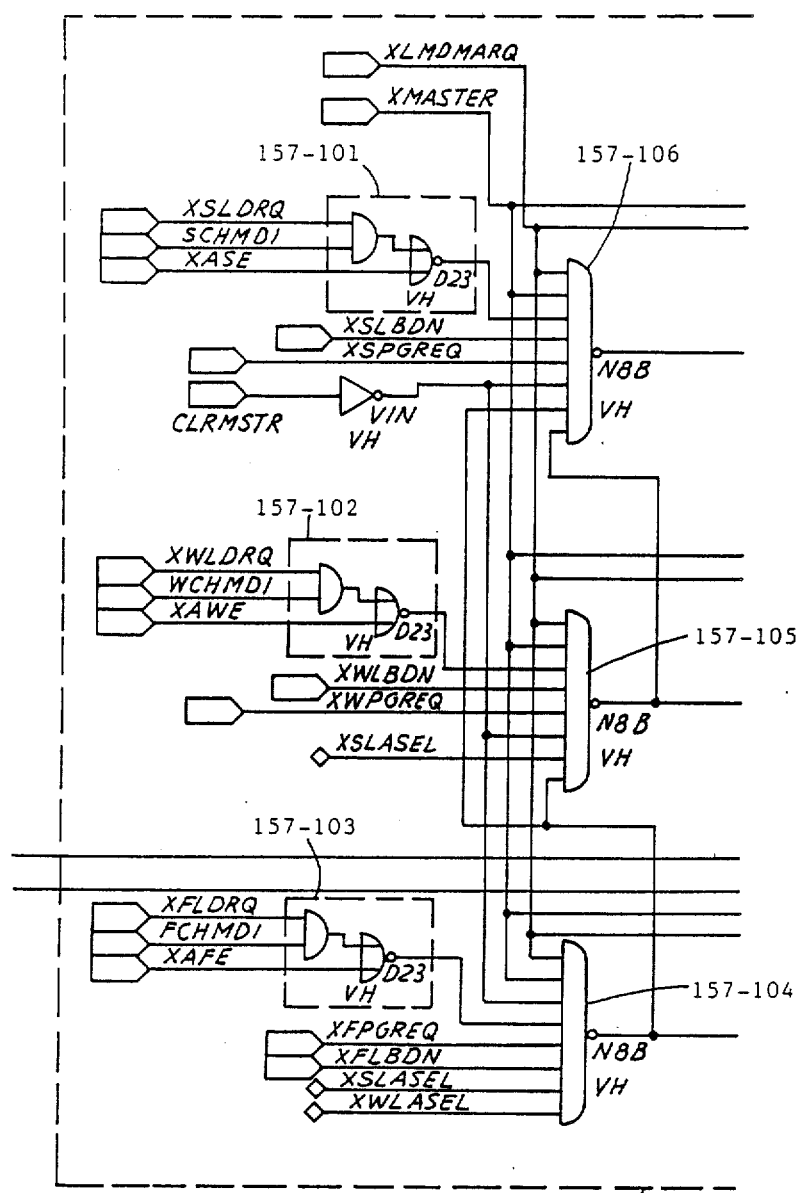
Figure 19:
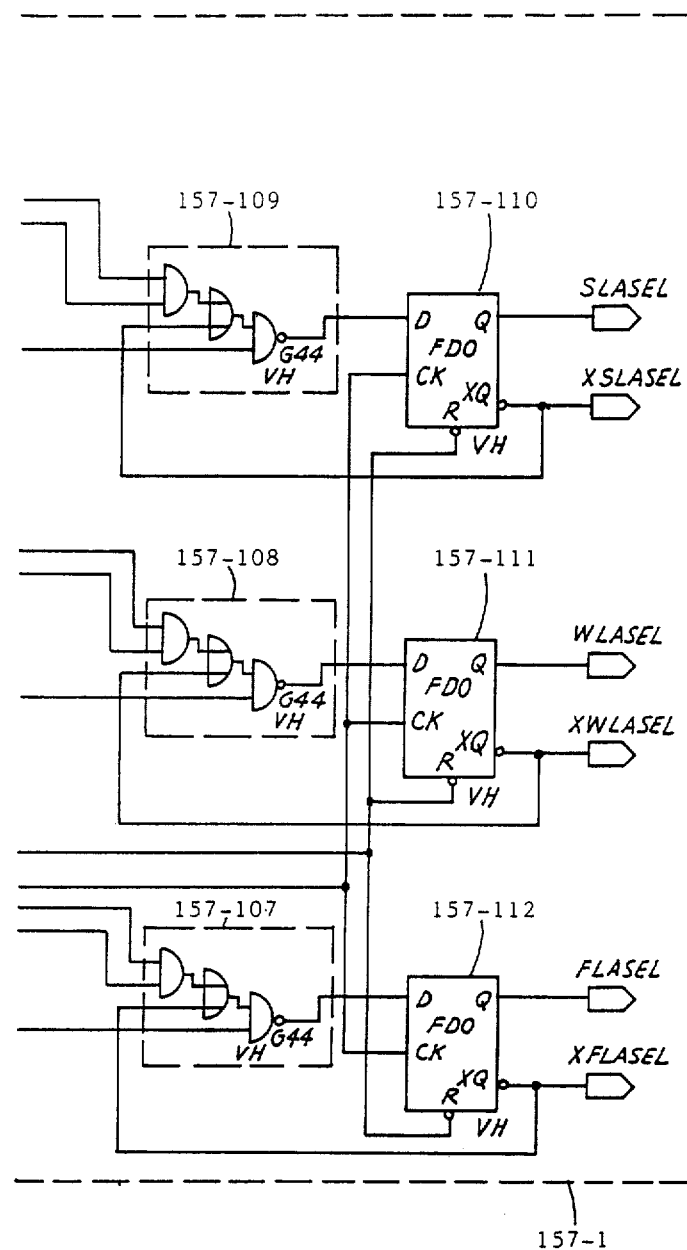

Referring first to FIG. 19 there is illustrated a portion of the local bus control section 157 which comprises two arbiter sections labelled 157-1 and 157-2. Section 157-1 is the section that determines which one of the three device controllers 41, 43 and 45 (see FIG. 2) should be handled first if all three device controllers request access to local memory bus 37 through gate array 51. The order of priority established by this section 157-1 is (1) WINCHESTER controller 45, then (2) floppy controller 41, and then (3) SCSI controller 43. Section 157-2 is the section that determines priority between the three controller devices when two or more of these controllers devices are requesting multiple page information. The order of priority in section 157-2 is (1) the floppy controller 41; then (2) the WINCHESTER controller 45, and then (3) the SCSI controller 43.

Section 157-1 includes a set of three AND-NOR gates labelled 157-101, 157-102 and 157-103, a set of three 8-input NAND gates, labelled 157-104, 157-105 and 157-106, a set of three AND-OR NAND gates labelled 157-107, 157-108 and 157-109 and a set of three D-type flip-flops with a reset input and labelled 157-110, 157-111 and 157-112. The combinational logic (i.e. gates 157-101 through 157-112) is fed by request inputs and status inputs and then processed to feed the three flip-flops 157-110 through 157-112. The three flip-flops store "state" and drive outputs to state which device has the highest priority.

Section 157-2 includes five inverters 157-201 through 157-205, a 2 wide 2-input AND OR invert cell 157-206, two 2 wide 4-input AND-OR invert cells 157-207 and 157-208 three D-type flip-flops with set input labelled 157-209, 157-210 and 157-211 and a D-type flip-flop with set and reset input labelled 157-212.

Figure 20:
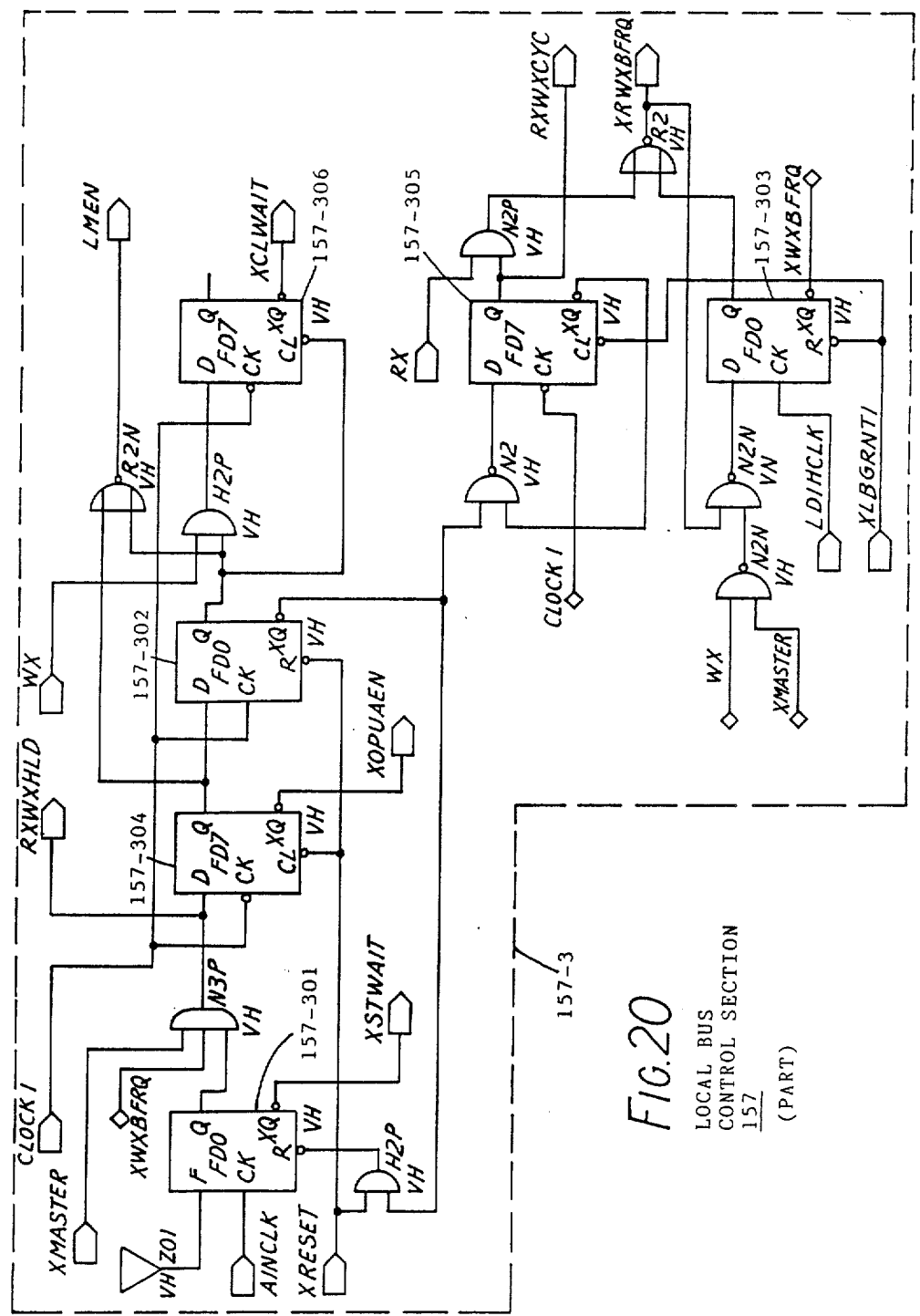
FIG. 20 is a schematic diagram of the details of another portion of the local bus control section 157 shown in FIG. 3.

FIG. 20 shows the logic 157-3 in section 157 which is called Read-X and Write-X and which are the local bus accesses that gate array 51 controls. The logic contained in FIG. 20 produces what is known as a state machine that produces outputs that sequence particular functions. The section includes three D type with reset flip-flops 157-301, 157-302 and 157-303, three D type with clear flip-flops 157-304, 157-305 and 157-306, and associated logic (gates) not numbered but identified by the Fujitsu unit cell name.

Figure 21:
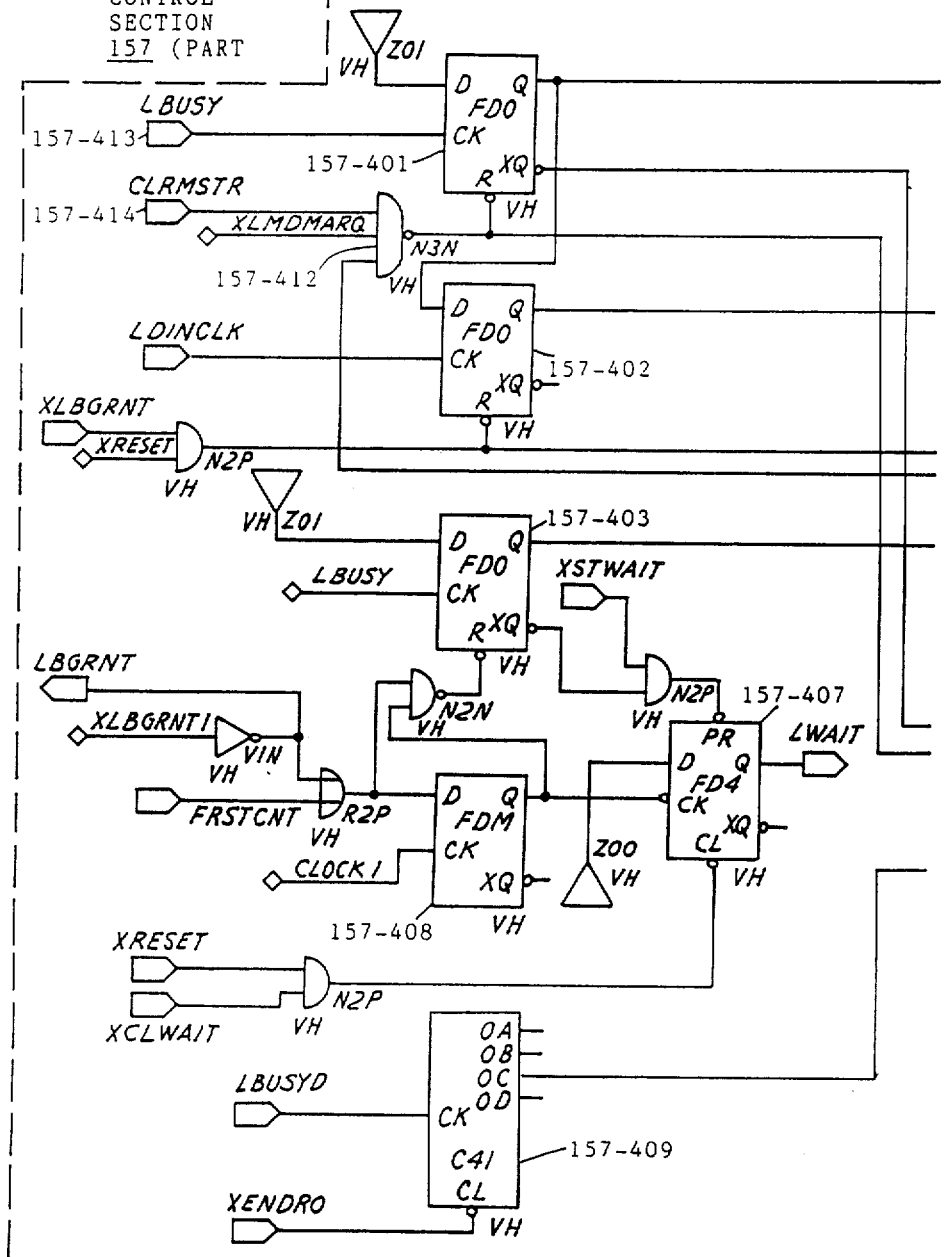
FIG. 21 is a schematic diagram of the details of another portion of the local bus control section 157 shown in FIG. 3.

FIG. 21 shows a grouping of logic 157-4 which serves as the local bus control signal sequencer. It is essentially a state machine that takes inputs from external local bus signals, processes the signals and provide a sequence of outputs to produce the desired result, namely, to perform a data transfer on bus 37. Section 157-4 includes four D type flip flops with reset labelled 157-401 through 157-404, two positive edge clock power JK with clear flip-flops labelled 157-405 and 157-406, a D type flip-flop with clear and preset 157-407, a D type flip-flop 157-408, an asynchronous 4-bit counter 157-409, a 6-input NOR gate 157-410, two 3-input NAND gates 157-411 and 157-412 and other associated logic unnumbered but identified with the Fujitsu unit cell designation. This section receives signals including a signal LBUSY over pin 157-413 that tells the section there is a valid address on bus 37 and to start sequencing and a signal LDINCLK over pin 157-414 which states that the data portion of the cycle is complete and that the data can be transferred to buffer RAM 47. The section outputs signals including a signal LWAIT over pin 157-415 which states to delay actions on bus 37 so that gate array 51 can complete its sequencing before another cycle starts and a signal LMDMARQ over pin 157-416 that tells external logic (to gate array 51) that local bus 37 is doing a direct memory access request or would like to do a direct memory access request.

Figure 22:
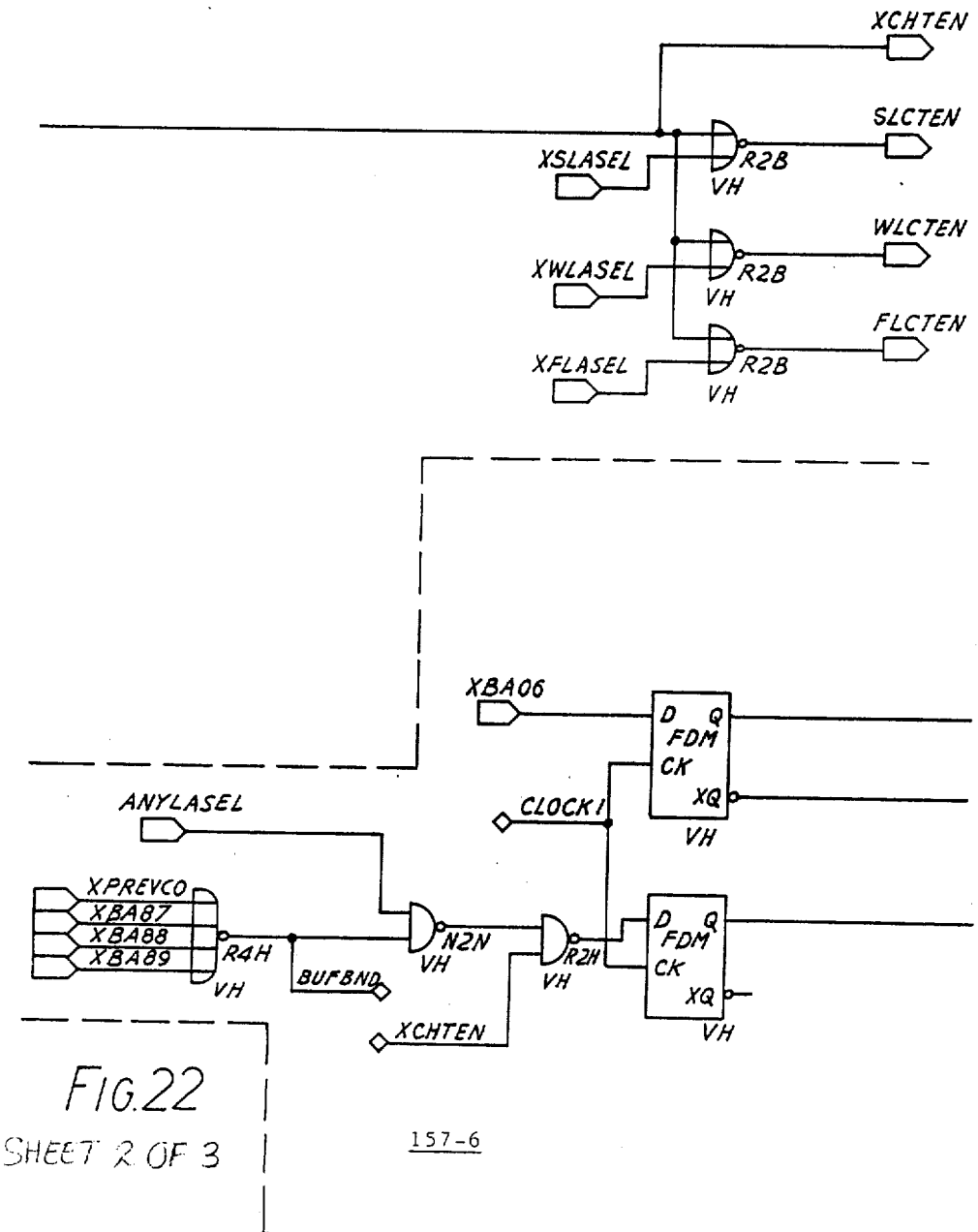
FIG. 22 is a schematic diagram of the details of another portion of the local bus control section 157 shown in FIG. 3.
Figure 22:
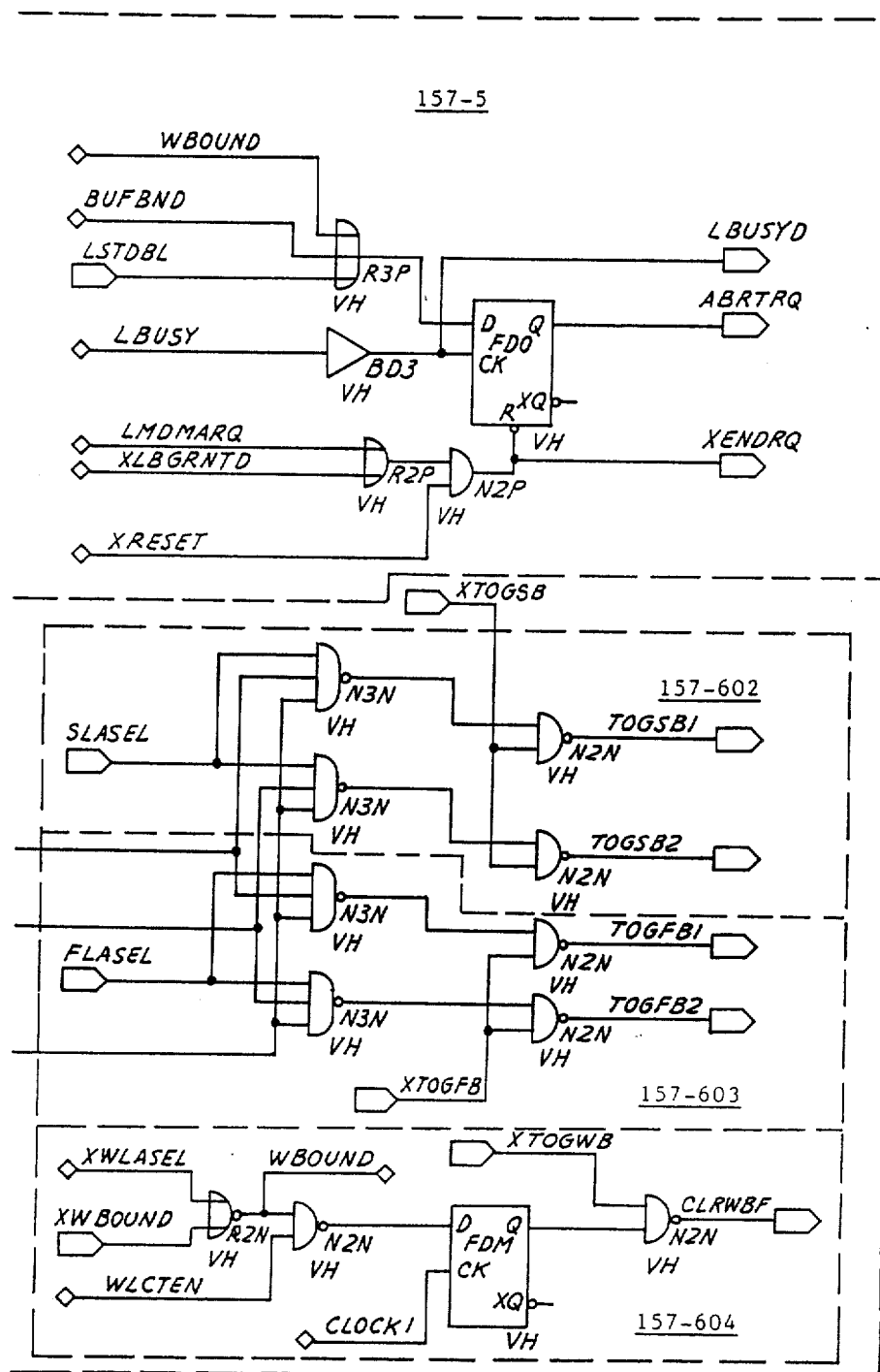

In FIG. 22 there is shown a section of logic which functions as a counter control and a buffer manager.

The counter control portion is labelled 157-5. It is essentially a state machine that holds the incrementing of the counters in sections (blocks) 139 through 149. It controls these counters by giving a count enable signal at the proper time. Section 157-5 includes two D-type flip-flops with resets 157-501 and 157-502, a D flip-flop with PRESET 157-503, a D-flip-flop 157-504, a D flip-flop witih a clear 157-505, a 3 wide, 3 inpput AND/OR invert gate 157-506, a D flip-flop with reset 157-507 and associated unnumbered but Fjuitsu identified logic. Flip-flop 157-507 and the logic associated with that flip-flop is the logic used to end a local bus cycle.

The buffer manager portion of the logic in FIG. 22 is labelled 157-6 and includes a portion of logic 157-601 dedicated to the WINCHESTER controller 45 and portions 157-602 and 157-603 which are pertinent to SCSI controller 43 and the floppy controller 41, respectively. The individual components in the sections are unnumbered but identified by the Fujitsu unit cell name.

Figure 23:
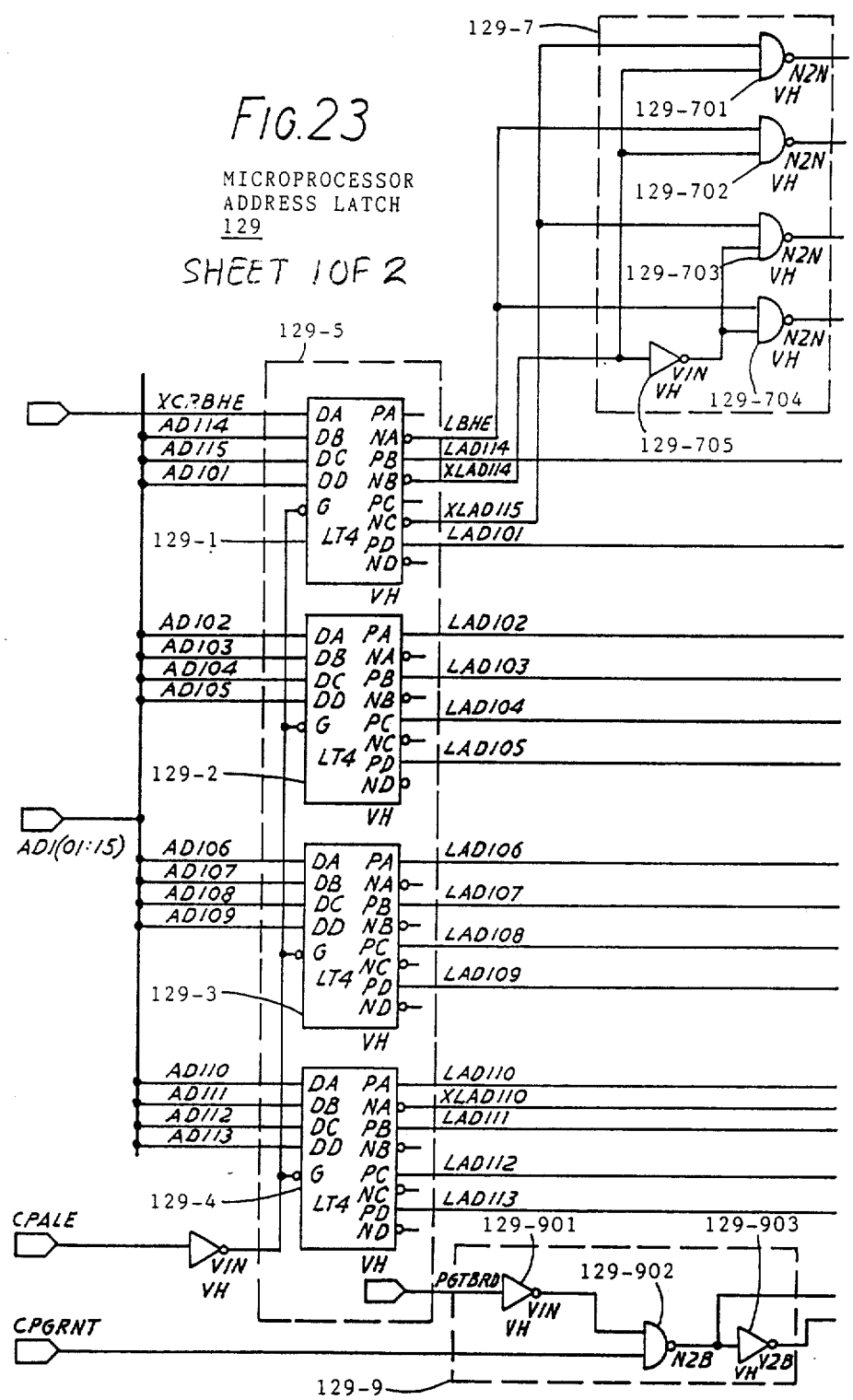
FIG. 23 is schematic diagram of the details of the microprocessor address register section 129 shown in FIG. 3.
Figure 23:
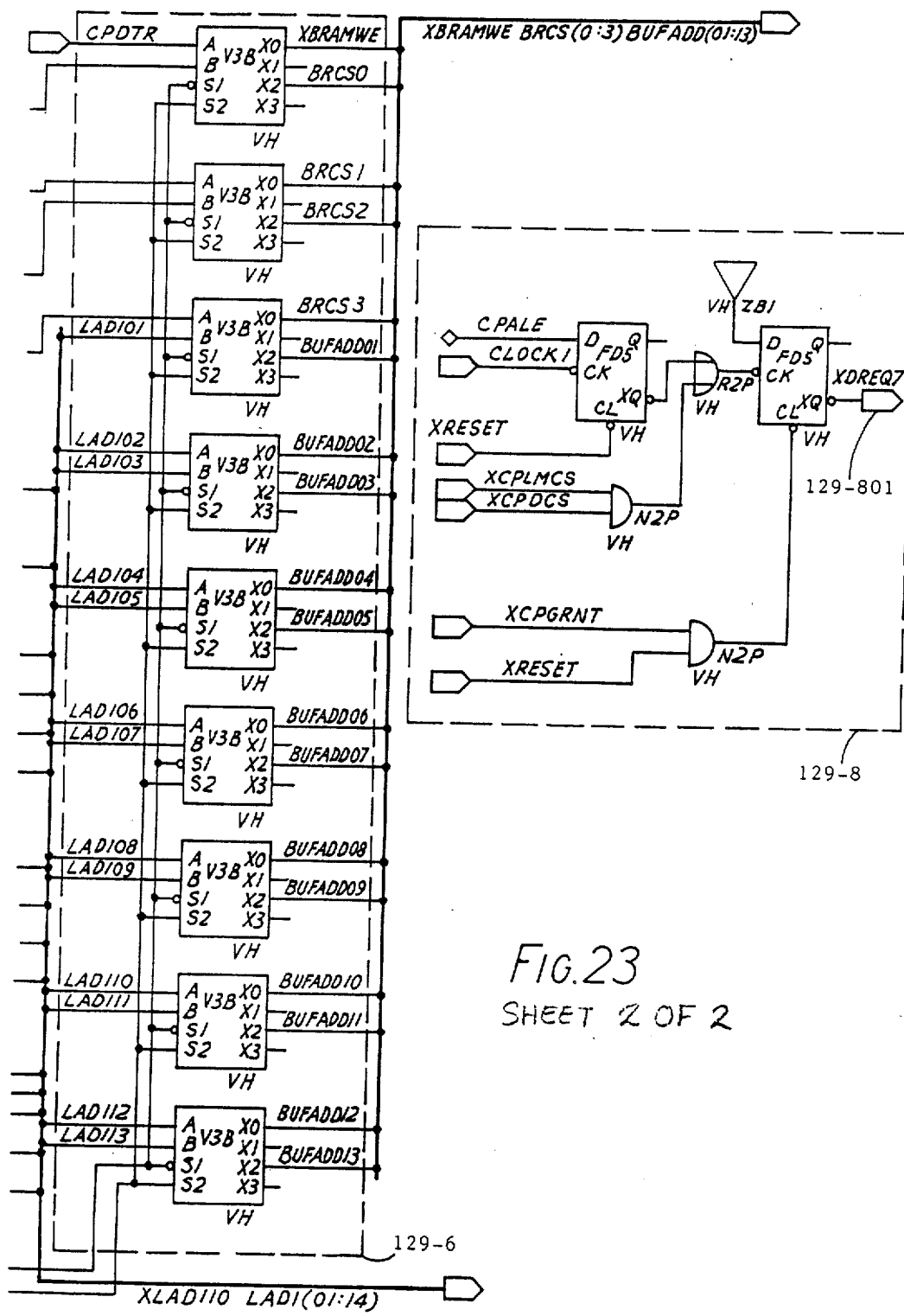

Referring now wto FIG. 23, there is illustrated a schematic diagram of the details of the microprocessor address latch section 129.

Section 129 includes four 4-bit data latches 129-1 through 129-4 which are connected together to create a 16-bit data latch 129-5, a set of nine transmission gates, collectively labelled 129-6, a set of logic 129-7 made up of four NAND gates 129-701 through 129-704 and a inverter 129-705, a conglomeration of logic 129-8 made up of a pair of D flip-flops with a clear 129-801 and 129-802 and associated unnumbered logic and a conglomeration of logic 129-9 made up of inverters 129-901 and 129-902 and a 2 input NAND gate 129-903.

Latch 129-5 gets address data from microprocessor 49 from input/output interface section 113 and holds that address so that gate array 51 can begin accessing buffer RAM 47. Transmission gates 129-6 are enabled anytime microprocessor 49 is attempting to access buffer RAM 47. Logic section 129-7 decodes a bit of address to determine if gate array 51 is doing a hi byte, a lo byte or a word access to buffer RAM 47. Logic section 129-8 determines when a microprocessor cycle is beginning and generates a request data signal on connector 129-801. Logic section 129-9 is active when microprocessor 49 is doing a transfer and provides the appropriate enable signal.

Figure 24:
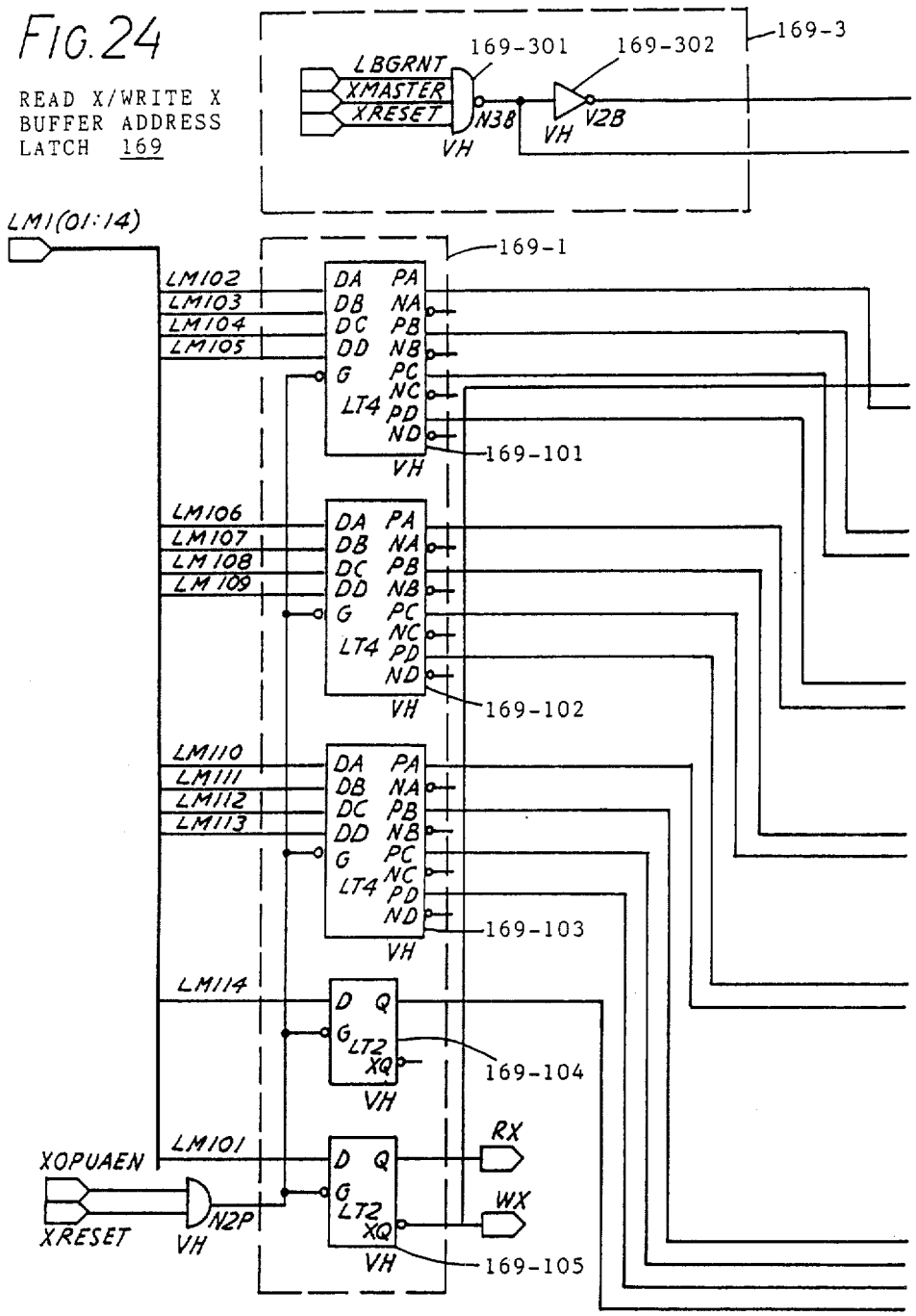
FIG. 24 is a schematic diagram of the details of the Read-X/Write-X buffer address latch section 169 shown in FIG. 3.
Figure 24:
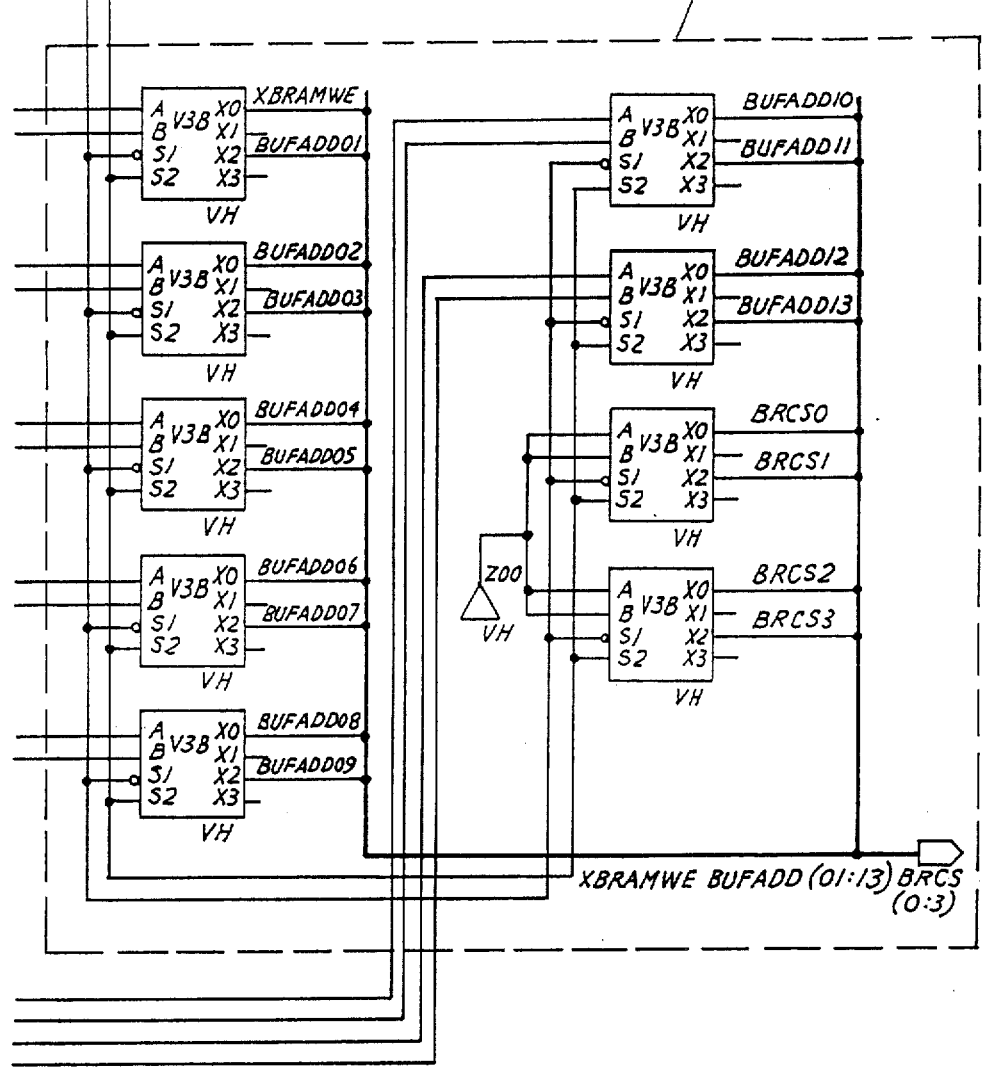

Referring now to FIG. 24 there is illustrated a circuit diagram of the details of Read X/Write X buffer address latch section 169.

This section includes a 14-bit data latch 169-1 made up of three 4-bit latches 169-101 though 169-103 and two 1-bit data latches 169-104 and 169-105, a set of nine transmission gates, collectively labelled 169-2 and a group of logic 169-3 made up of a 3-input NAND gate 169-301 and a inverter 169-302.

Data latch 169-1 gets an address from local memory bus 37 from local I/O interface section 125, latches it and hold it until buffer Ram 47 can be accessed. Gate section 169-2 enables or disables the Read X or Write X address onto bus 174. Logic section 169-3 tells when to enable transmission gates 169-3.

Figure 25:
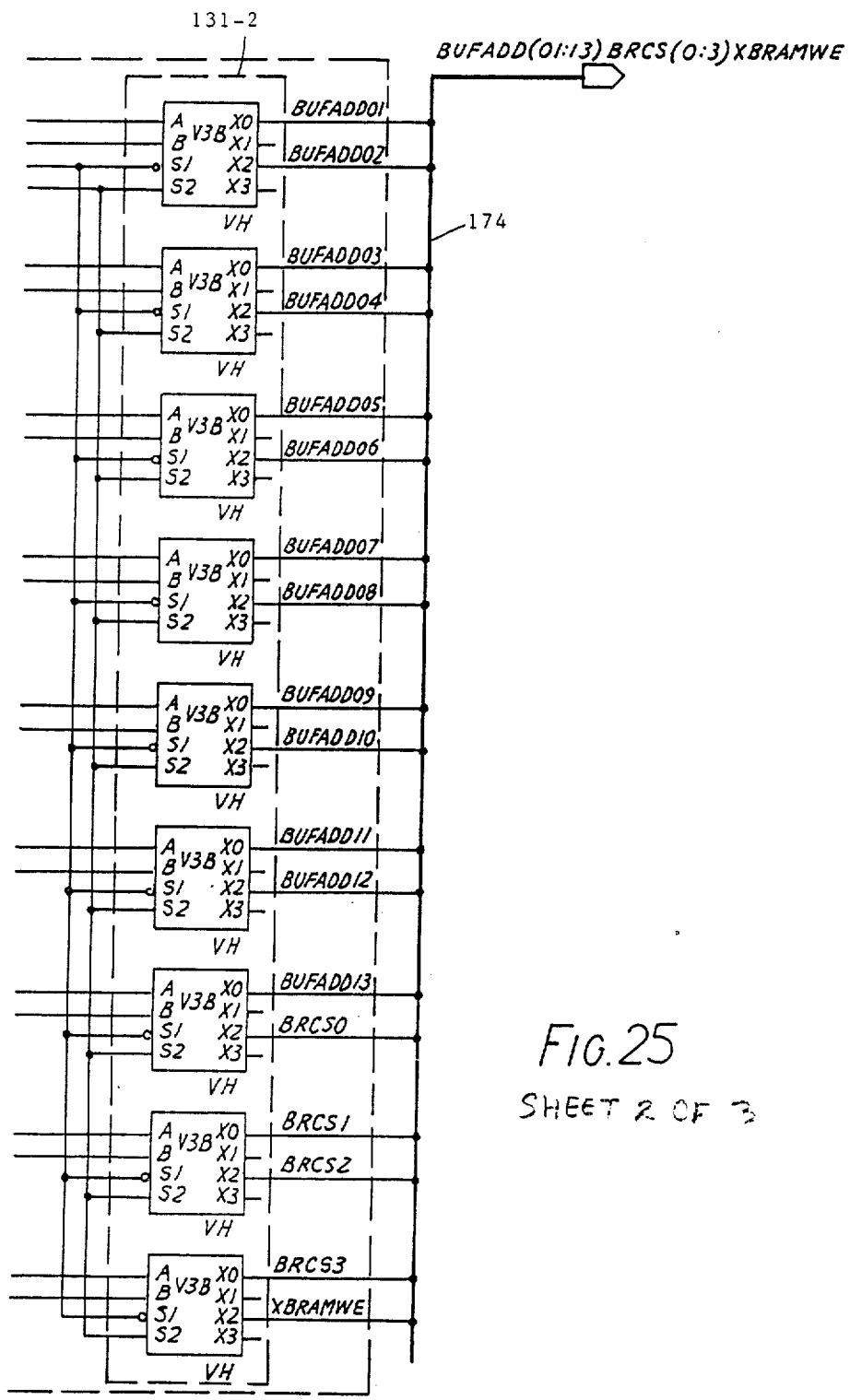
FIG. 25 is a schematic diagram of the microprocessor status register section 151 and the page address register section 131 shown in FIG. 3.
Figure 25:
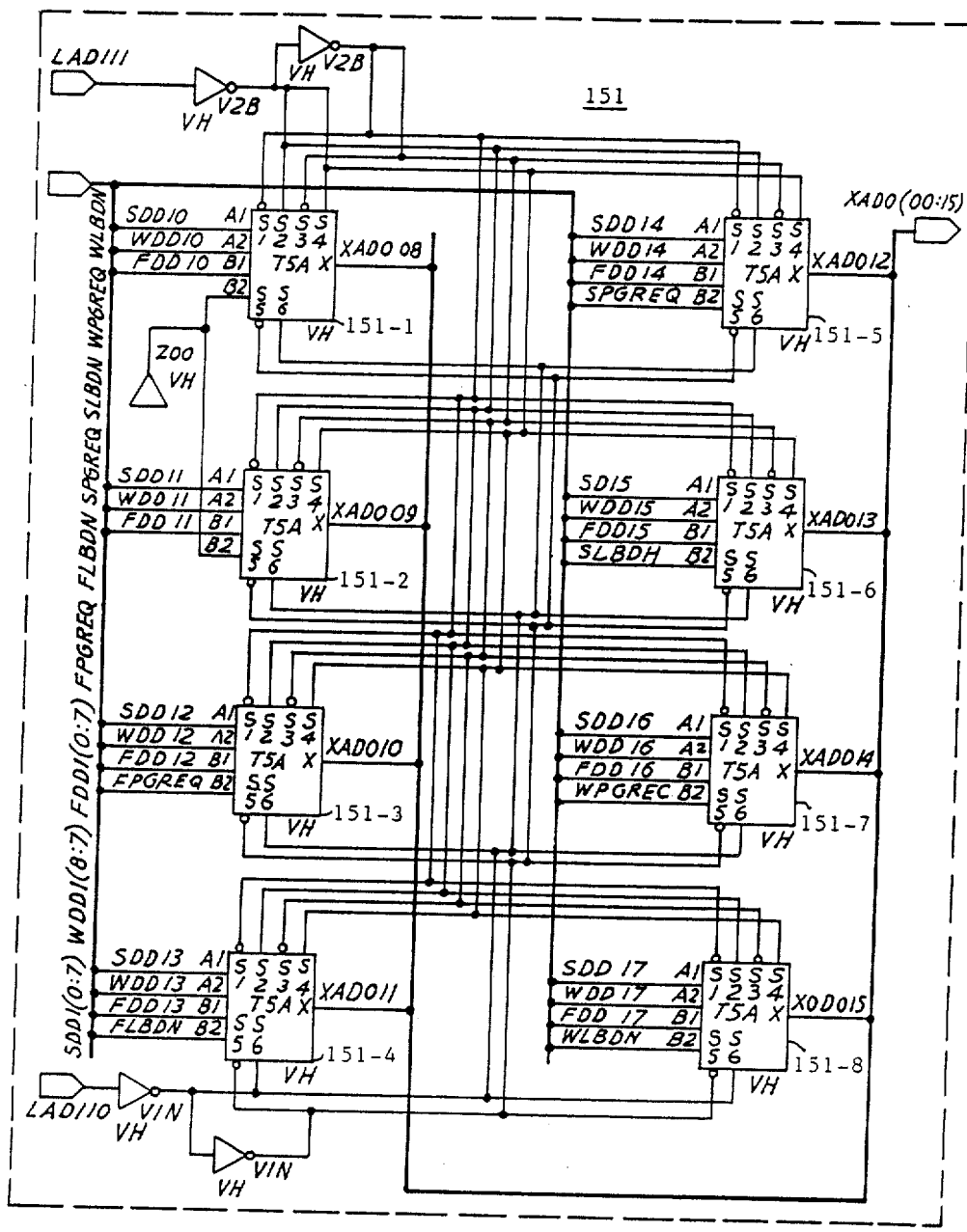

Referring now to FIG. 25, there is illustrated a schematic diagram of the details of 80186-status register section 151 and page printer address register section 131.

Page printer address register section 131 includes a 9-bit data latch 131-1 which receives an address provided by the microprocessor 49 and holds it for use in accessing buffer RAM 47 and a set of nine transmission gates (1:2 selectors) for driving the address to be used for buffer RAM 47 to access on to bus 71, collectively identified by reference numeral 131-2 and some associated unnumbered bit Fujitsu identified logic. 80186 status register section 151 includes eight 2:1 selectors labelled 151-1 through 151-8, a pair of inverters 151-9 and 151-10 and a pair of power inverters 151-11 and 151-12.

Figure 26:
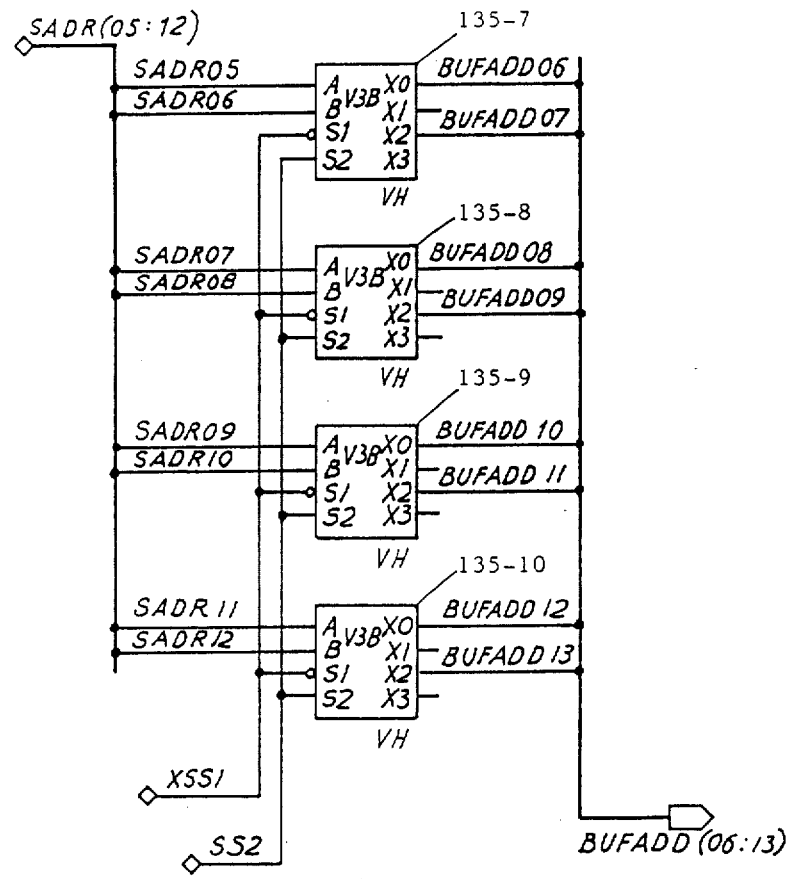
FIG. 26 is a schematic diagram of the SCSI device buffer address register section 135 shown in FIG. 3.

Referring now to FIG. 26, there is illustrated a schematic diagram of the details of the SCSI device buffer RAM address counter 135.

This section includes three 4-bit counters 135-1 through 135-3, a 2:4 decoder 135-4, a pair of transmission gates 135-5 and 135-6, a set of four transmission gates 135-7 through 135-10 a pair of inverter gates 135-11 and 135-12 and some associated unnumbered but Fujitsu identified logic. The three counters 135-1 through 135-3 generate the buffer RAM address for the SCSI device controller 43. Transmission gates 135-5 and 135-6 are used to drive the buffer RAM chip selects from the 2:4 decoder 135-4 to the external address bus of gate array 51. These gates are tri-state. When the enable is turned on the data passes from the inputs to the outputs. When the enable is off, the inputs do not pass to the output bus 174. Transmission gates 135-7 through 135-10 are similar to transmission gates 135-5 and 135-6. They take the remaining address signals generated by counters 135-1 through 135-3 and transmit them to the buffer RAM address bus 174 in a manner similar to that of transmission gates 135-5 and 135-6. Inverter gates 135-11 and 135-12 peform the selection for gates 135-5 through 135-10. They tell when the buffer RAM arbiter 159 has granted the SCSI controller 43 access to buffer RAM 47.

Figure 27:
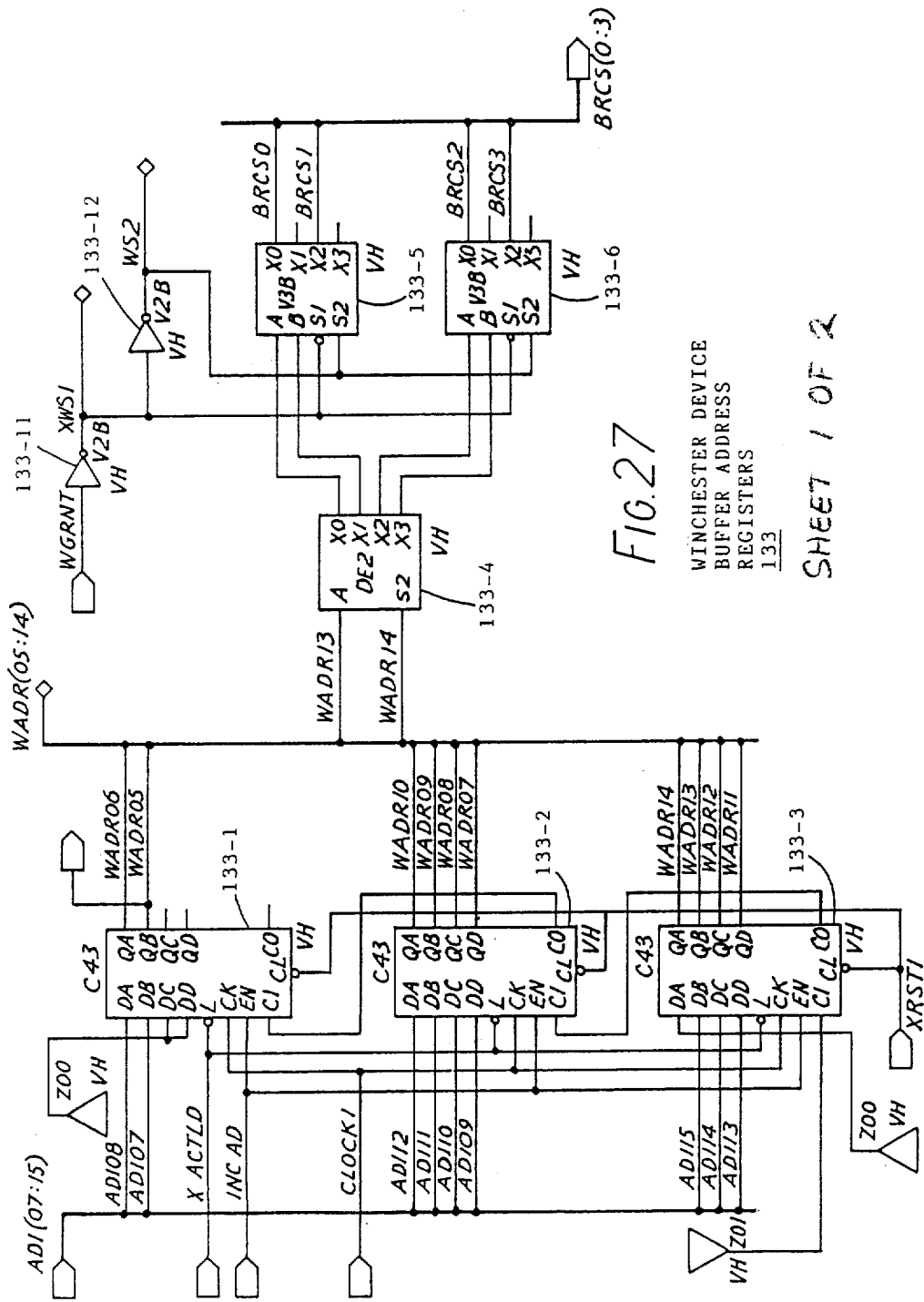
FIG. 27 is a schematic diagram of the Winchester device buffer address register section 133 shown in FIG. 3.
Figure 27:
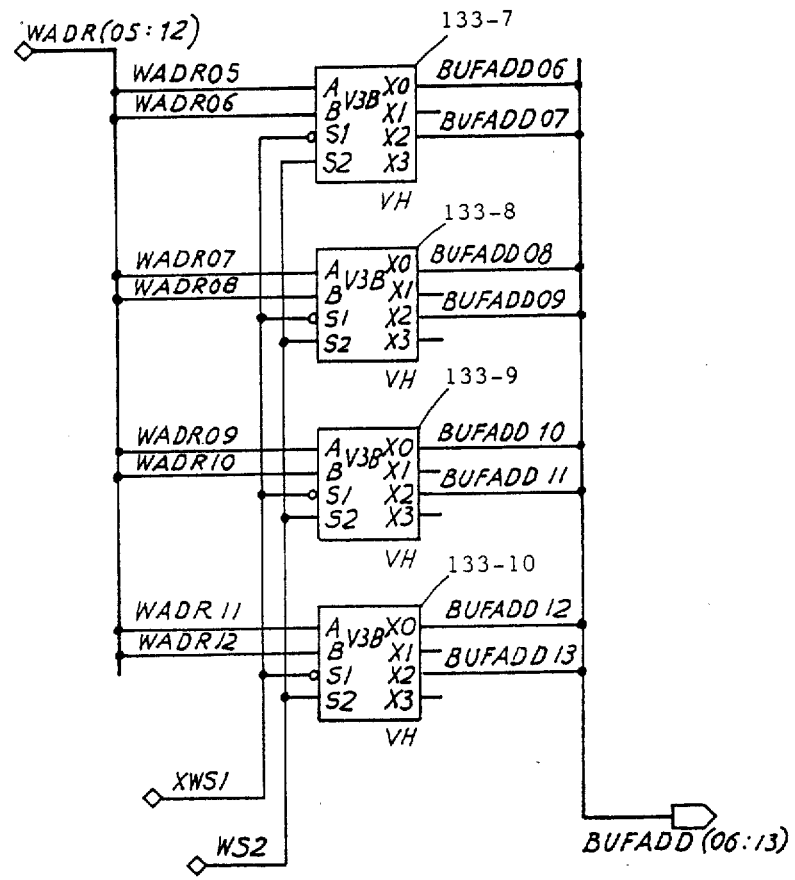
Figure 28:
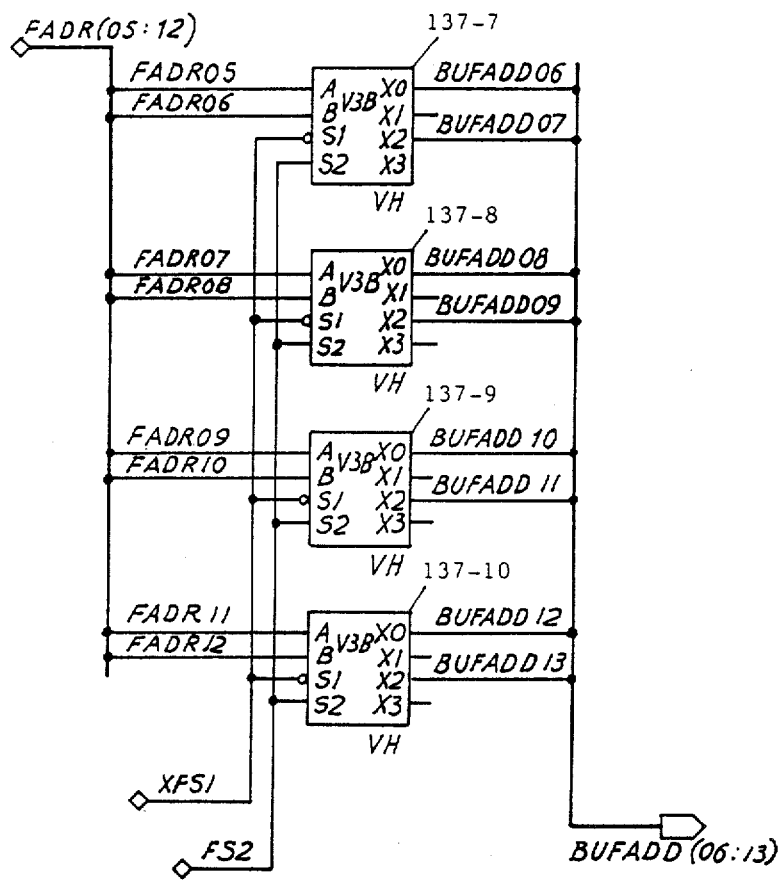
FIG. 28 is a schematic diagram of the floppy device buffer address register section 137 shown in FIG. 3.

FIG. 27 and 28 are circuit diagrams showing the details of the Winchester device buffer RAM address counter section 133 and the floppy device buffer RAM address counter section 137, respectively. These two sections are identical to section 135, the only difference being in the particular device the sections are arranged to handle. Thus, section 133 includes three counters 133-1 through 133-3, a decoder 133-4, a set of six transmission gates 133-5 through 133-10 and two inverters 133-11 and 133-12 which correspond to parts 135-1 through 135-12 in section 135, respectively. Section 137 includes logic components 137-1 through 137-12 which correspond to logic components 135-1 through 135-12, respectively.

Figure 29:
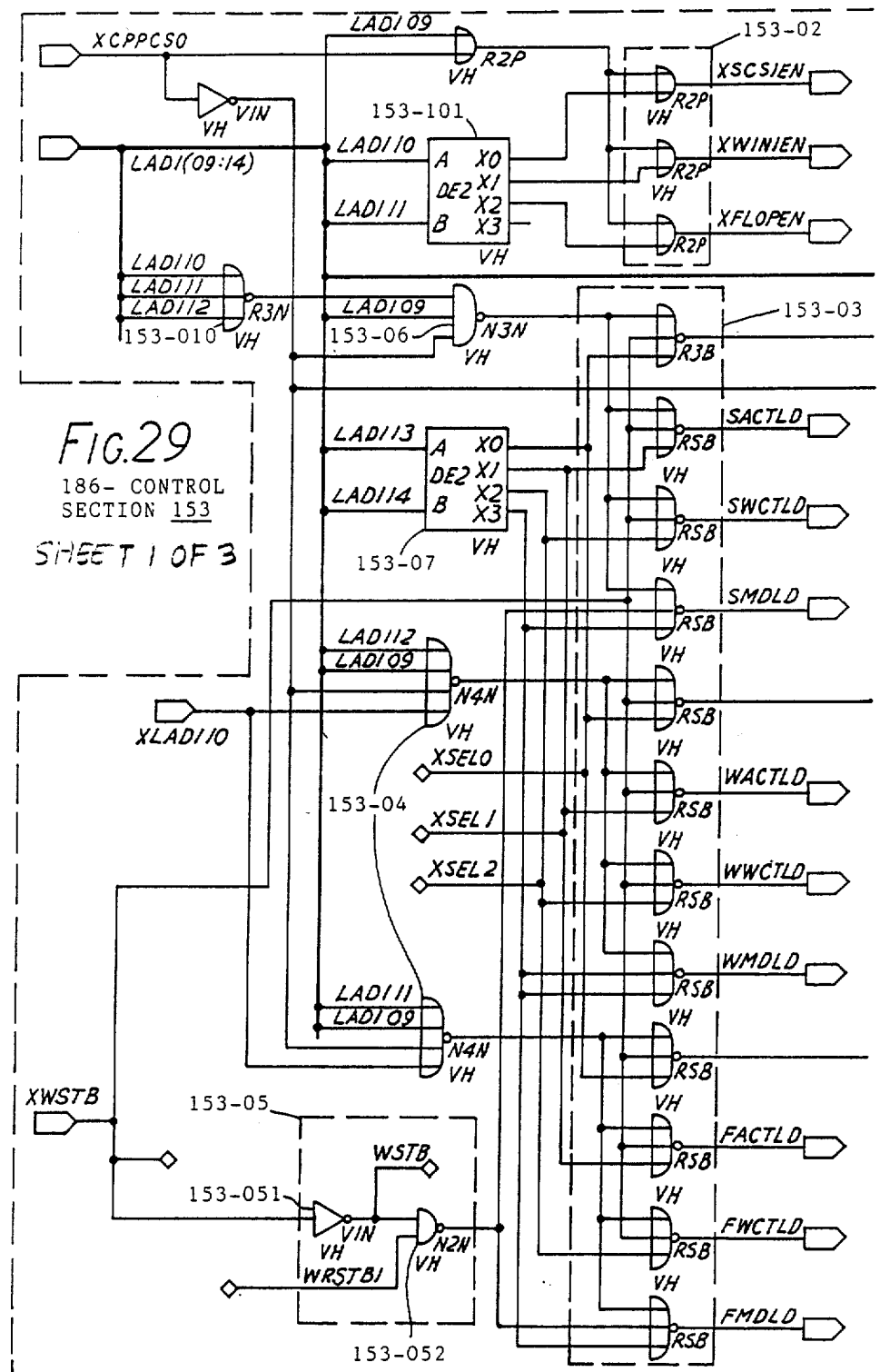
FIG. 29 is a schematic diagram of the 80186 control section 153 shown in FIG. 3.
Figure 29:
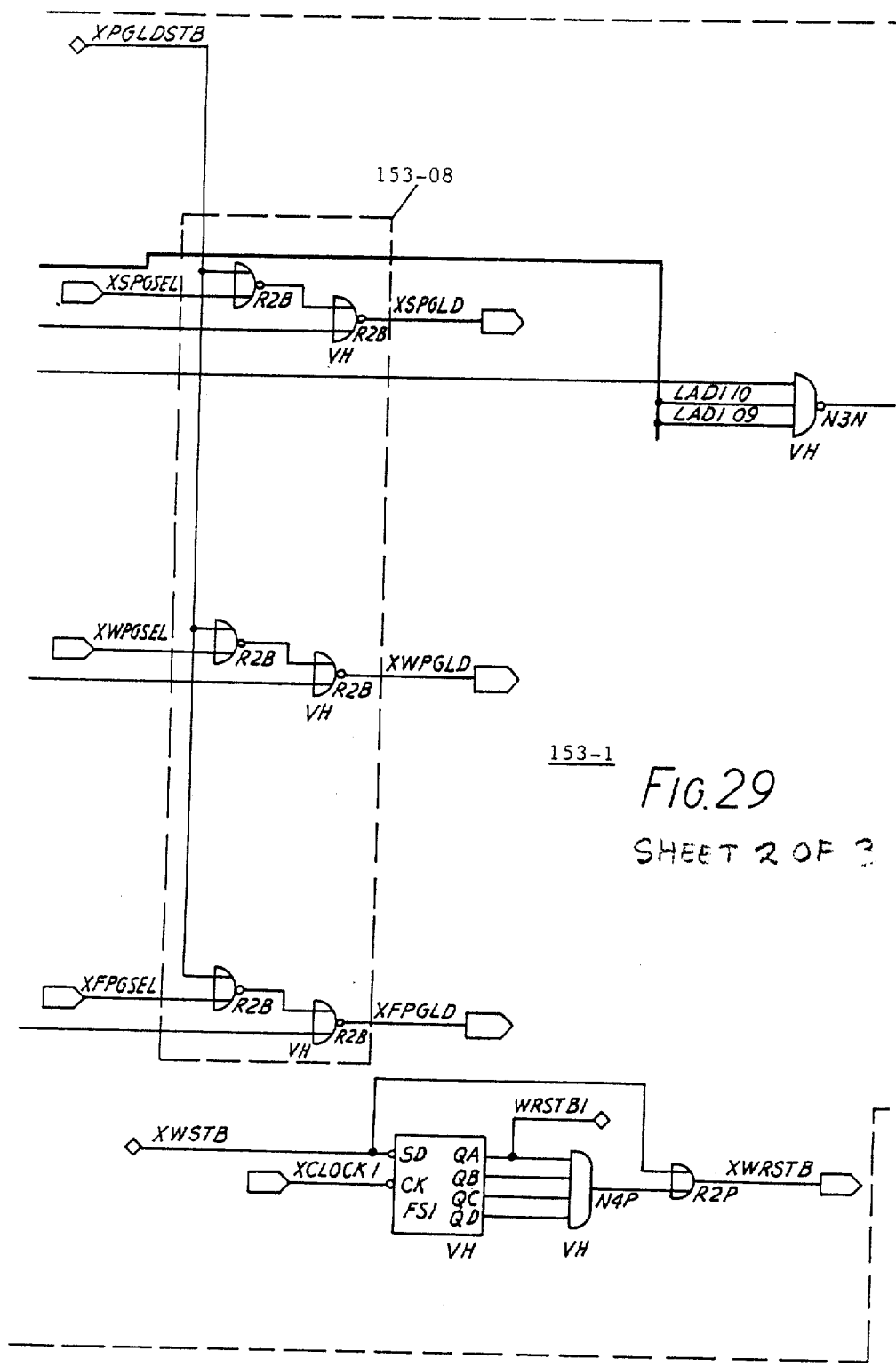
Figure 29:
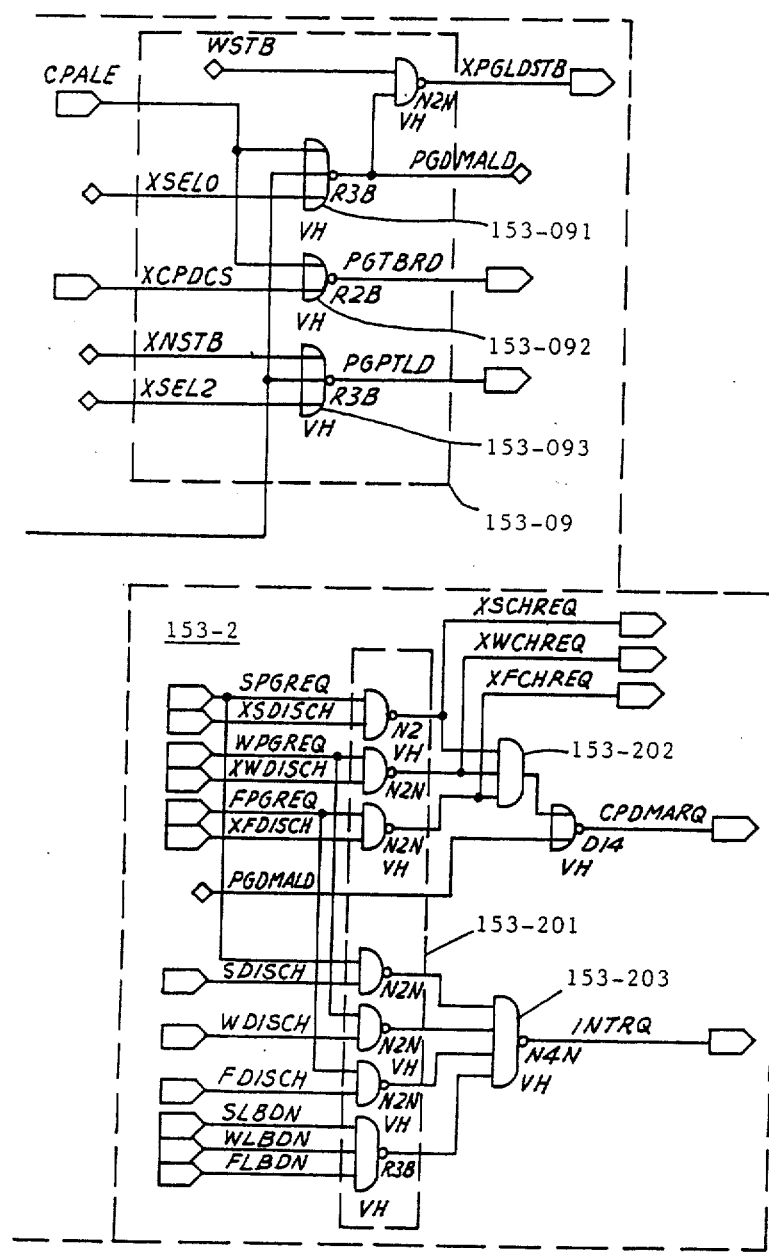

Referring now to FIG. 29 there is illustrated a schematic diagram of the details of 186 control section 153.

This section includes two sub-sections of logic labelled 153-1 and 153-2. Sub-section 153-1 contains a conglomeration of gates which decode addresses from microprocessor 49 and generate signals therefrom to allow loading of internal counters and internal registers of gate array 51. Sub-section 153-2 takes inputs from the pins shown in the Figure and determines if a DMA request has to be made to microprocessor 49 or if an interrupt request has to be made to the microprocessor 49.

Section 153-1 includes a 2-bit to 4-bit decoder 153-01, a set of three 2-input OR gates, collectively labelled 153-02, a set of twelve 3-input NOR gates, collectively labelled 153-03, a pair of 4-input NAND gates 153-04, a set of logic 153-05 made up of an inverter 153-051 and a 2-input NAND gate 153-052, a 3 input NAND gate 153-06, a 2-input 4-output decoder 153-07, a set of six 2-input NOR gates, collectively labelled 153-08, a decoder 153-09 made up of two 3-input NOR gate 153-091 and 153-092 a 2-input NOR gate 153-093 and a 2-input NAND gate 153-094 and associated unnumbered bit Fujitsu identified logic.

Decoder 153-01 takes address inputs and generates three output signals which determine which one of controllers 41, 43 and 45 microprocessor 49 wishes to access. These output signals go through gates 153-02 which generate the three enable signals XSCSIEN, XWINIEN and XFLOPE. Gates 153-03 drive the enable signals for the registers which are to be loaded. NAND gates 153-04 are used to do address decoding. Logic section 153-05 conditions the WRITE signal properly for use by section 153. NAND gate 153-06 is used to decode an address. Decoder 153-07 is used for address decoding. Gates 153-08 are used to generate the proper load signals for the page registers. Decoder 153-09 is used for page loading or page reading.

Sub-section 153-2 includes six 2-input NAND gates, collectively labelled 153-201, and one 3-input NOR gate 153-202, a 4-input NAND gate 153-203 and a 3-input AND/NOR gate 153-204.

Figure 30:
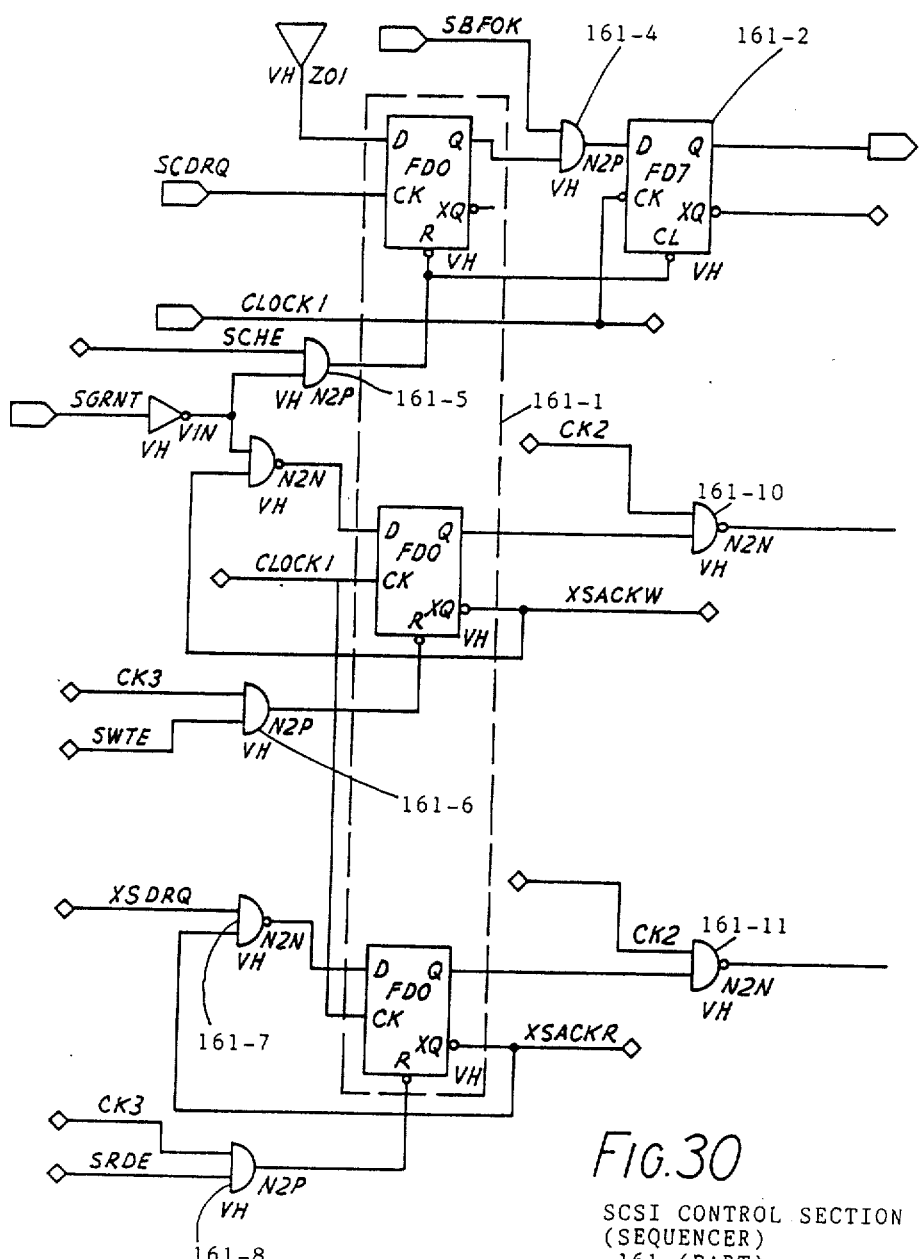
FIG. 30 is a schematic diagram of a part of the SCSI control section 161 sequencer shown in FIG. 3.
Figure 31:
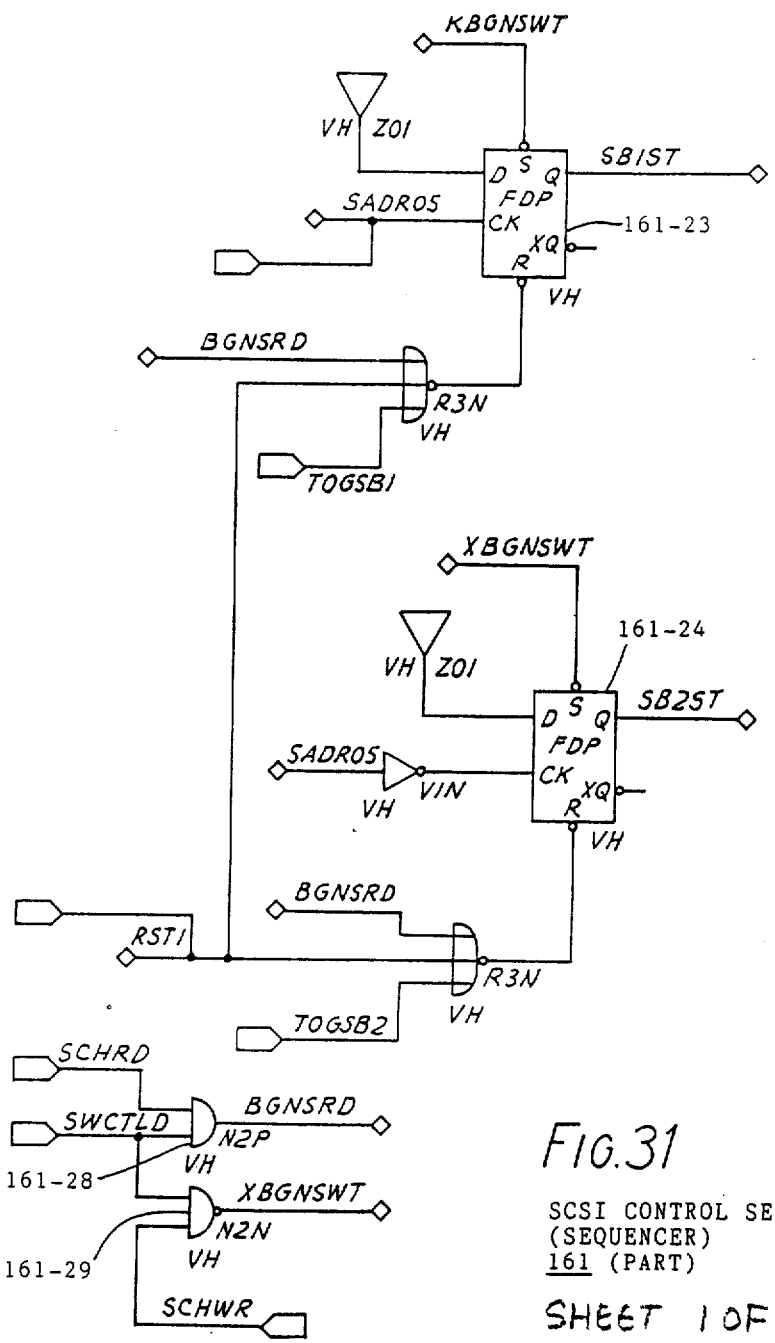
FIG. 31 is a schematic diagram of the details of another part of the SCSI control section 161 (sequencer) shown in FIG. 3.

Referring now to FIGS. 30 and 31 there are shown schematic diagrams of the details of the sequencer 161 for the SCSI controller 43.

Looking first at FIG. 30, there is a set of three D flip-flops, collectively labelled 161-1, a negative edge triggered flip-flop 161-2, a negative edge clock 4-bit shift register 161-3, a 2-input AND gate 161-4, a 2-input AND gate 161-5, a 2-input AND gate 161-6, a 2-input NAND gate 161-9, two 2-input NAND gate 161-10 and 161-13, a 3-input NOR gate 161-14, a pair of 2-input NOR gates 161-15 and 161-16 and a 3-input NOR gate 161-17, a set of four 2-input AND gates 161-18, 161-19, 161-20 and 161-21 and an inverter 161-22.

Looking now at FIG. 31, there is shown a pair of D type flip-flops with set and reset 161-23 and 161-24, a D type flip-flop with a clear 161-25, a pair of D type flip-flops with reset 161-26 and 161-27, a 2-input AND gate 161-28, a 2-input NAND gate 161-29, a 2-input NAND gate 161-30, a 2-input OR gate 161-31.

Referring now to FIG. 32 there is shown a schematic diagram of the details of the buffer RAM arbiter section 159.

This section includes a quad D negative edge triggered flip-flop 159-1 which synchronizes four asynchronous signal inputs, a set of four gates, namely a 2 input NAND gate 159-2, a 3-input NAND gate 159-3, a 4-input NAND gate 159-4 and a 5-input NAND gate 159-5 which together do the actual prioritization, a pair of flip-flops, namely a quad D negative edge triggered flip-flops 159-6 and a negative edge D type flip-flop with a clear 159-7 which together form a 5-bit holding register, a six input NAND gate 159-8 and some associated unnumbered bit Fujitsu identified logic.

Referring now to FIG. 33 there is illustrated a schematic diagram of the details of a part of the sequencer 165 for the floppy controller 41. This diagram is identical to the schematic diagram in FIG. 31, except that the signals and connections are for the floppy controller 41 rather than the SCSI controller 43. The logic includes five flip-flops 165-1 through 165-5 corresponding to flip-flops 161-23 through 161-27 and some corresponding associated logic.

Figure 34:
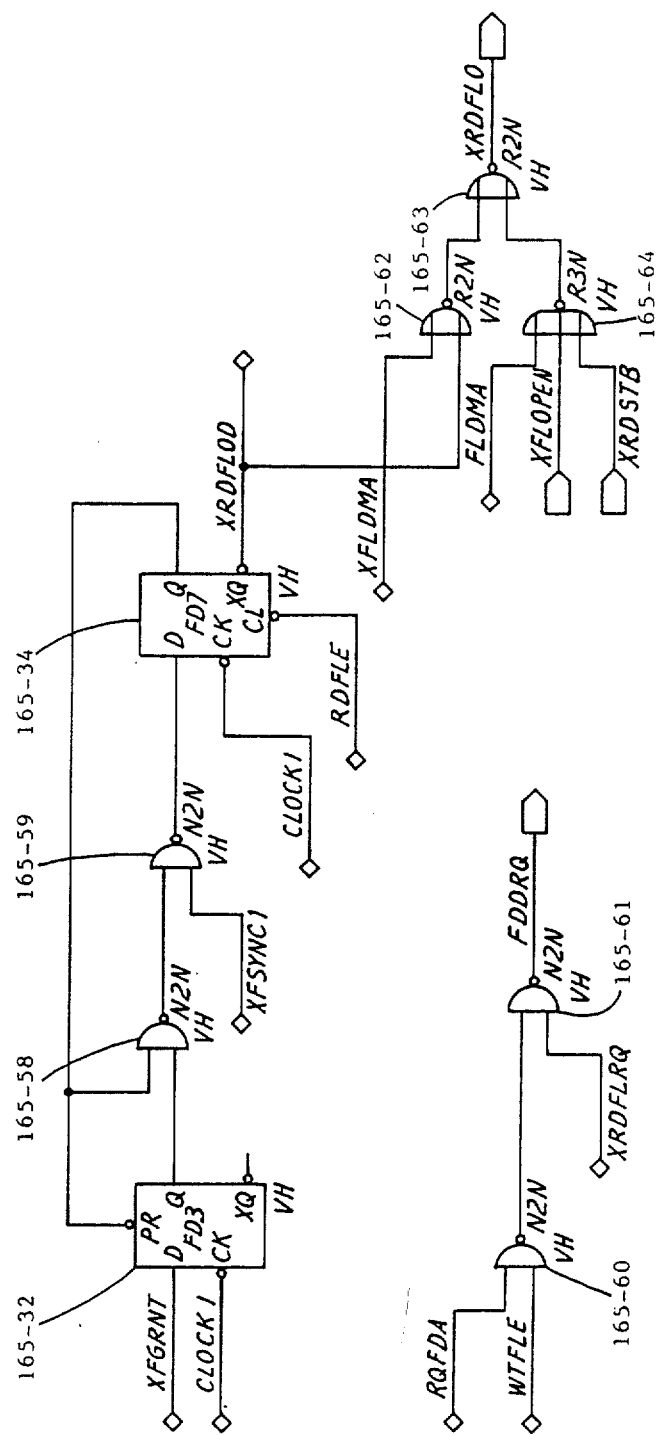
FIG. 34 is a schematic diagram of the details of another portion of the floppy control section 165 (sequencer) shown in FIG. 3.

Referring now to FIG. 34, there is shown a schematic diagram of the details of other parts of the sequencer 165 for the floppy controller 41.

The logic includes four rising edge D-type flip-flops with reset 165-28 through 165-31, a D type flip-flop with present 165-32, three folling edge D type flip-flops with clear 165-33 through 165-35, a negative edge triggered 4-bit shift register 165-36, a pair of delay gates 165-37 and 165-38 that provide delay between 5 and 18 nanoseconds.

There is also a number of other gates, including a 3-input NAND gate 165-39, an inverter 165-40, a 2 input OR gate 165-41, a 2-input NOR gate 165-42, a 2-input NAND gate 165-43, a 2-input NOR gate 165-44, a pair of 2-input NAND gates 165-45 and 165-46, a pair of 2-input NAND gates 165-47 and 165-48, a pair of inverters 165-49 and 165-50, a 2 input NAND gate 165-51, a 2-input AND gate 165-52, a 2-input AND gate 165-53, a 2 input NOR gates 165-54, a 3-input NOR gate 165-55, a pair of 2-input OR gates 165-56 and 165-57, a pair of 2-input NAND gates 165-58 and 165-59, a pair of 2-input NAND gates 165-60 and 165-61, a pair of 2-input NOR gates 165-62 and 165-63 and a 3-input NOR gate 165-64.

Figure 35:
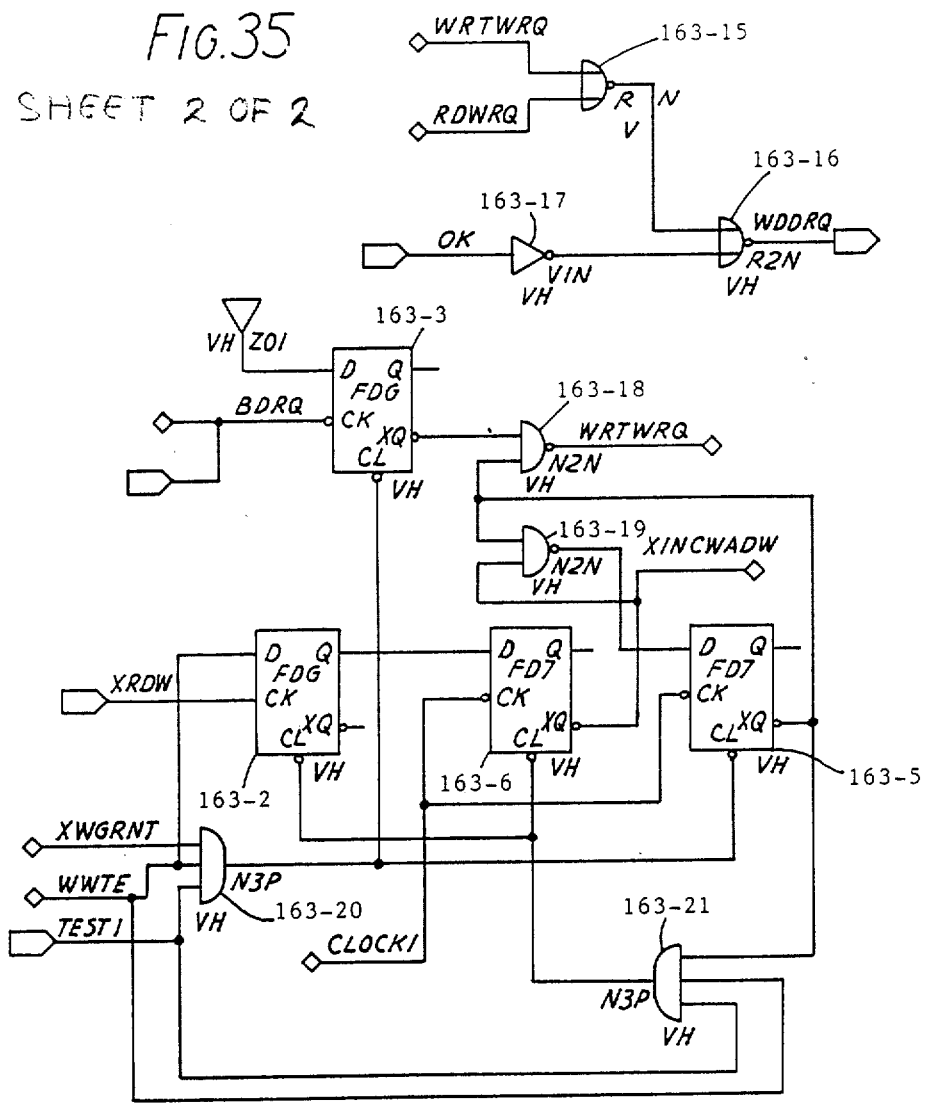
FIG. 35 is a schematic diagram of the details of a portion of the Winchester control section 163 (sequencer) shown in FIG. 3.
Figure 36:
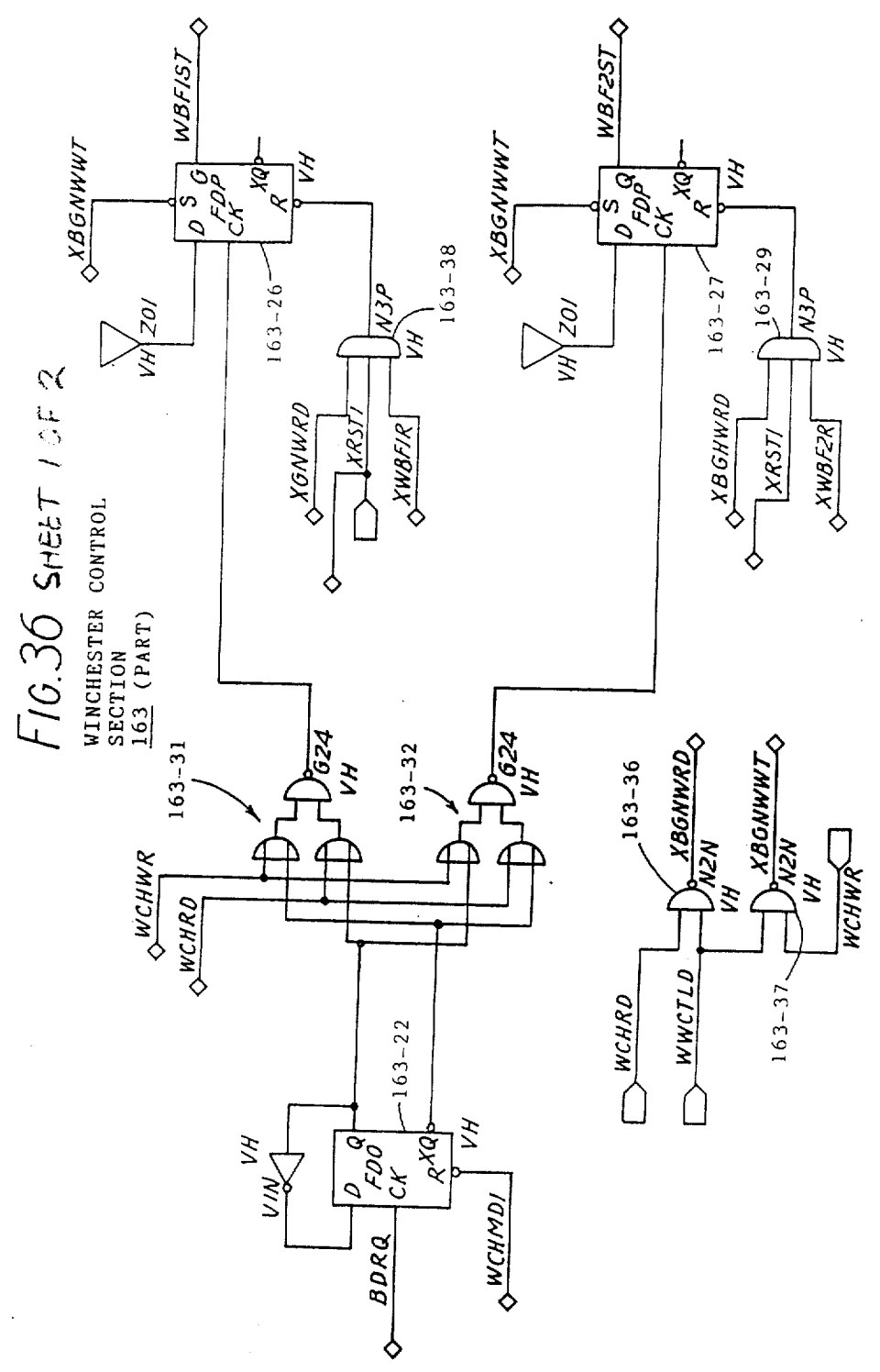

Referring now to FIGS. 35 and 36, there is shown two schematic diagrams illustrating the logic in the control section 163 (sequencer) for the Winchester controller 45. The logic is essentially a sequential state machine that takes data request inputs from the WINCHESTER controller 45 and generates output signals in a sequential fashion to allow a data access to occur between the WINCHESTER controller 45 and the buffer RAM 47 in either a read or write direction.

Turning first to FIG. 35, there are three rising edge triggered flip-flops with a reset 163-1 through 163-3, three negative edge triggered D flip-flops wiwth clears 163-4 through 163-6, an inverter 163-7, a 2-input NOR gate 163-8, a 3-input NAND gate 163-9, a 2-input AND gate 163-10, a 2 input NAND 163-11, and a 2-input AND gate 163-12. There is also an inverter 163-13, a 2-input NAND gate 163-14, a pair of 2-input NOR gates 165-15 and 165-16, a inverter 163-17, a pair of 2-input NAND gates 163-17 and 163-18 and a pair of 3 input NAND gates 163-19 and 163-20.

Turning now to FIG. 36, there are four D type flip-flops with clears 163-22 through 163-25, a pair of rising edge D type flip-flops with set and reset 163-26 and 163-27, a negative edge D flip-flop with a clear 163-28, a rising edge D type flip-flop with a set input 163-29, a delay gate 163-30, a pair of 2 wide 2-input OR NAND gates 163-31 and 163-32 an inverter 163-33, a pair of 2 input NAND gates 163-36 and 163-37, a pair of 3 input AND gate 163-38 and 163-39, a 3-input AND gate 163-40, a 2AND gate 163-38 and 163-39, a 3-input AND gate 163-400, a 2-input NAND gate 163-41, a 2-input AND gate 163-42, a 2-input NOR gate 163-43, and a 2 input AND gate 163-44.

The embodiment of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A data processing system comprising:
   a. a local memory bus,
   b. a central processing unit connected to said local memory bus,
   c. a main memory section connected to said local memory bus, and
   d. a subsystem for connecting said data processing system to a plurality of input/output devices, said subsystem comprising:
      i. a plurality of input/output device controllers,
      ii. a single microprocessor for controlling the operations of said subsystem,
      iii. a buffer RAM for storing a program for operating said single microprocessor,
      iv. a gate array for interfacing said input/output device controllers to said main memory section and managing the flow of data between said input/output device controllers, said microprocessor, said main memory section and said buffer RAM, subsystem further includes:
      v. a host microcode data transceiver for transmitting data between the subsystem and the CPU,
      vi. a buffer RAM data transceiver for transmitting data between the buffer RAM and the microprocessor section,
      vii. a power up PROM for holding an initialization program for the subsystem,
      viii. an address latch for holding the valid address for accessing the host microcode data transceiver, and
      ix. a pair of buffer RAMS.

2. The data processing system of claim 1 and wherein said subsystem further includes:
   a. a plurality of DMA transceivers, each transceiver transferring data between the buffer RAM and a particular input/output device,
   b. a buffer RAM address register for holding a valid buffer RAM address,
   c. a buffer RAM local bus data transceiver for transferring data between the local bus and the buffer RAM, and,
   d. a local bus address/command latching transceiver for holding addresses and local bus command bits for data transfer between the local bus and the buffer RAM.

* * * * *